United States Patent [19]
Matsuoka et al.

[11] Patent Number: 6,018,696
[45] Date of Patent: Jan. 25, 2000

[54] LEARNING TYPE POSITION DETERMINING DEVICE

[75] Inventors: Masahiro Matsuoka; Shinya Hosogi; Yoshiharu Maeda, all of Kawasaki, Japan

[73] Assignee: Fujitsu Limited, Kawasaki, Japan

[21] Appl. No.: 08/909,945

[22] Filed: Aug. 12, 1997

[30] Foreign Application Priority Data

Dec. 26, 1996 [JP] Japan ................................. 8-347705

[51] Int. Cl.[7] ................................................. G06F 15/50
[52] U.S. Cl. ......................... 701/207; 701/13; 701/213
[58] Field of Search ........................... 701/207, 13, 213

[56] References Cited

U.S. PATENT DOCUMENTS 5,381,338   1/1995   Wysocki et al. ..................... 701/207
5,548,512   8/1996   Quraishi ............................... 701/207

OTHER PUBLICATIONS

D. S. Touretzky et al., "Neural Representation of Space Using Sinusoidal Arrays," *Neural Computation*, vol. 5, 1993, pp. 869–884.

*Robot Engineering Handbook*, ed. by The Japan Robot Academy, Corona, 1990, pp. 365–369 (with English translation).

T. Kohonen, "The Self–Organizing Map", *Proceedings of the IEEE*, vol. 78, No. 9, 1990, pp. 1464–1480.

T.M. Martinetz et al., "'Neural–Gas' Network for Vector Quantization and its Application to Time–Series Prediction," *IEEE Trans. on Neural Networks*, vol. 4, No. 4, 1993, pp. 559–568.

B. Fritzke, "Growing Cell Structures—A Self–Organizing Network for Unsupervised and Supervised Learning", *Neural Networks*, vol. 7, No. 9, 1994, pp. 1441–1460.

M. T. Musavi et al., "On the Training of Radial Basis Function Classifiers", *Neural Networks*, vol. 5, 1992, pp. 595–603.

*Primary Examiner*—William A. Cuchlinski, Jr.
*Assistant Examiner*—Olga Hernandez
*Attorney, Agent, or Firm*—Staas & Halsey, LLP

[57] ABSTRACT

The present invention relates to a neural network system for determining a position of a mobile object such as a robot, automobile, etc., which comprises a return information processing unit for generating return information corresponding to a relative position of the mobile object from the origin in a move space according to first sensor signal from the first sensor; a sense information processing unit for generating sense information corresponding to an environment state surrounding the moblie object at the relative position according to a second sensor signal from the second sensor; and an information integrating unit for inferring return information corresponding to sense information output from the sense information processing unit after learning a correlation between the return information and the sense information, and integrating the two items of information.

14 Claims, 38 Drawing Sheets

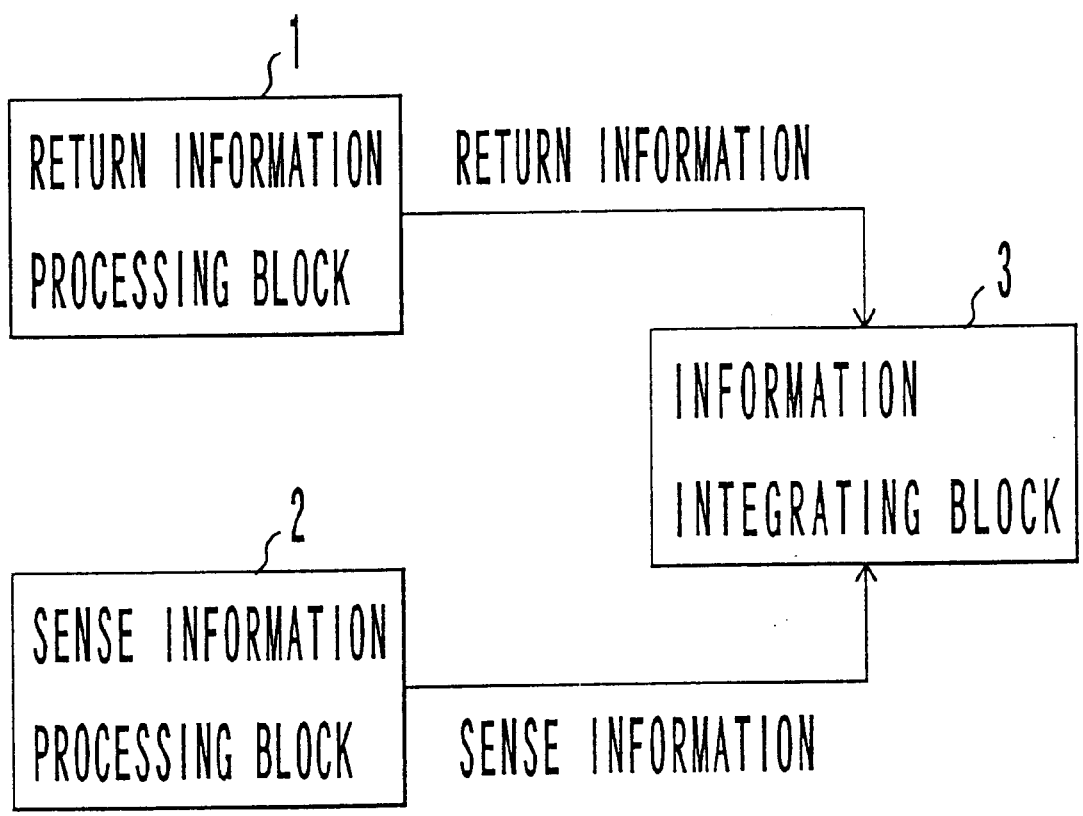
F I G. 1

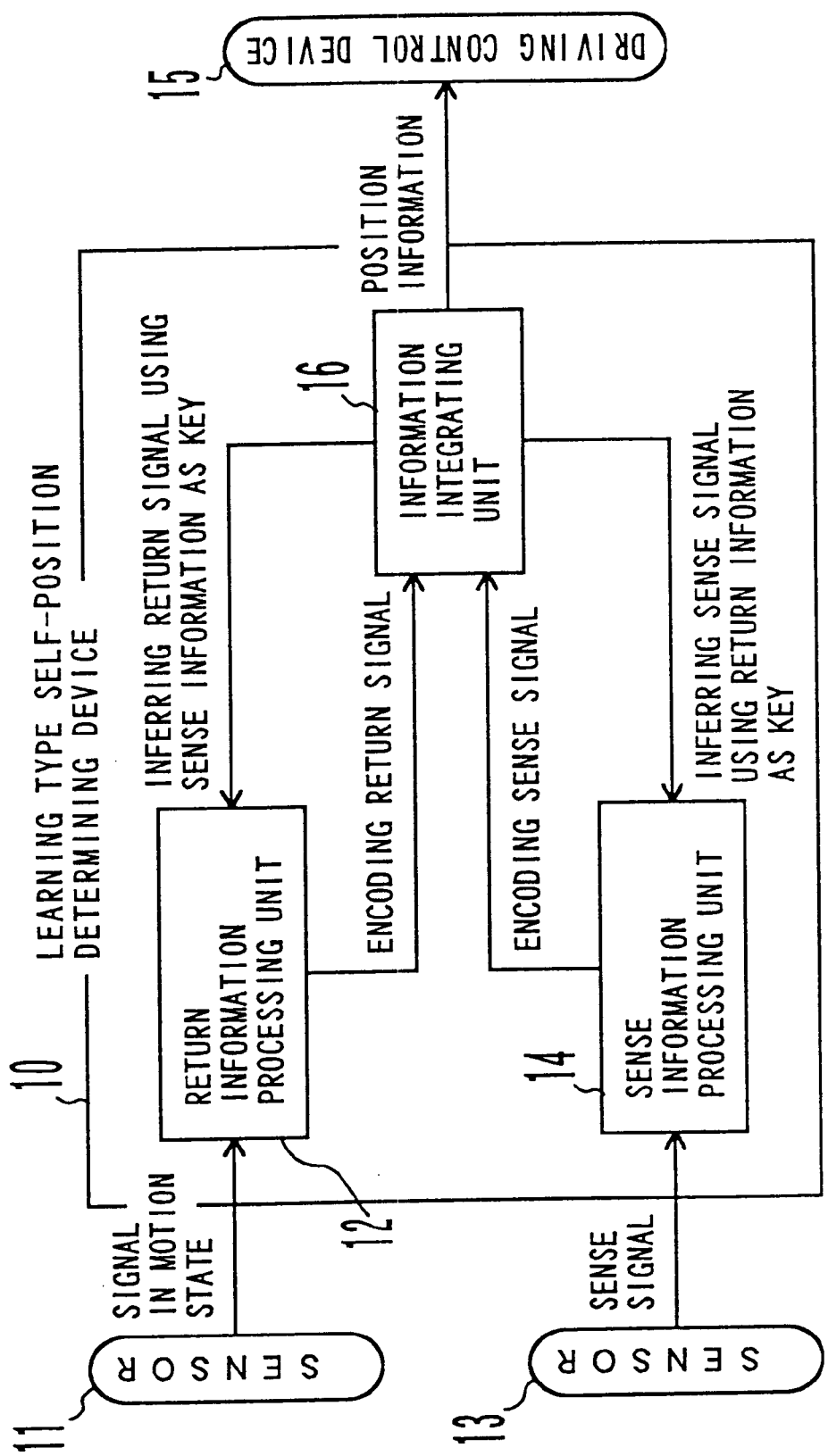
F I G. 2

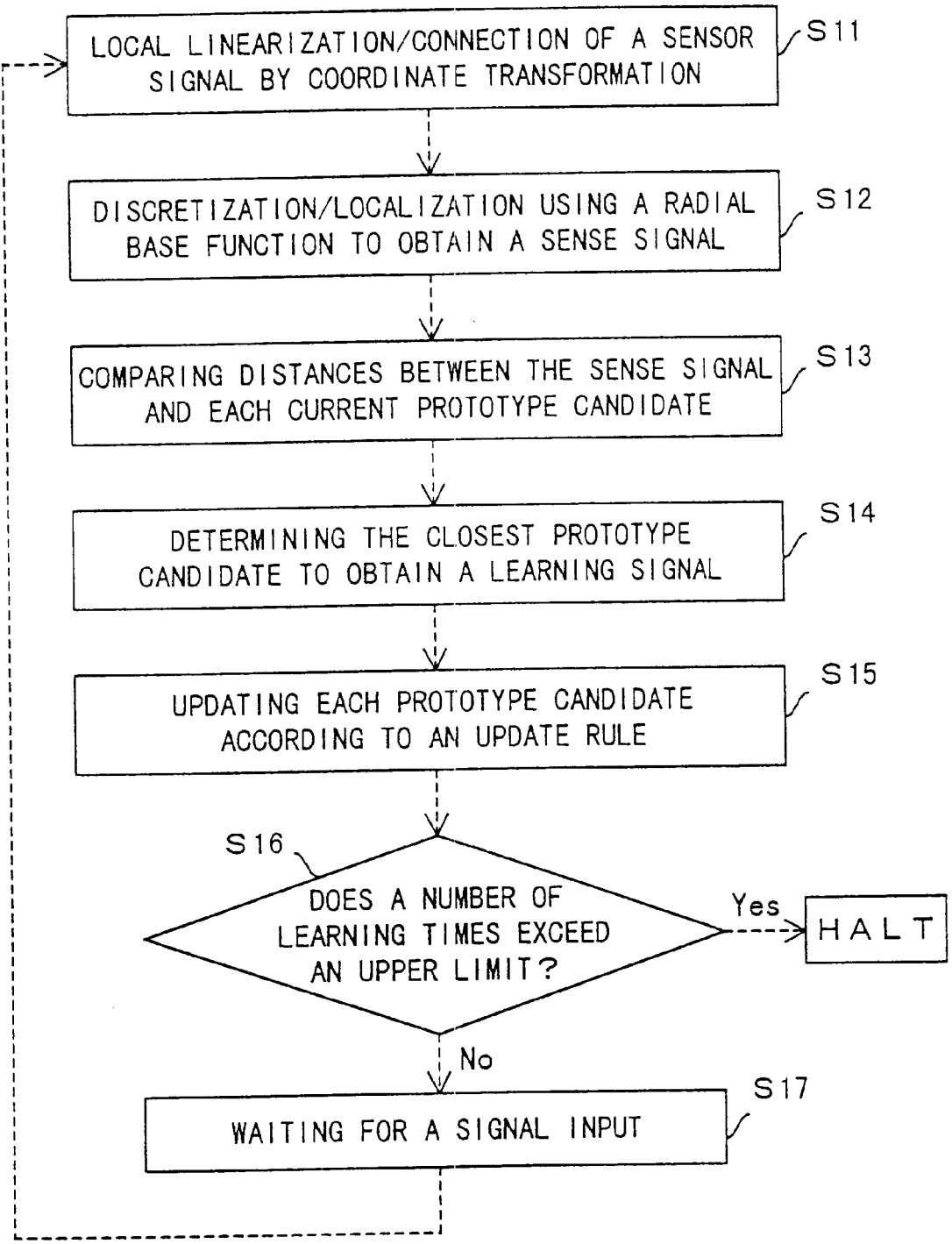
F I G. 1 1

FIG. 12

| SENSOR SIGNAL OUTPUT | FILTER OUTPUT SIGNAL (CODE) |
|---|---|
| 0 m ≦ DISTANCE < 1.5 m | (1, 0, 0) |
| 1.5 m ≦ DISTANCE < 3 m | (0, 1, 0) |
| 3 m ≦ DISTANCE | (0, 0, 1) |

| SENSOR | POSITION OF OBSTACLE (m) | WEIGHT 0.5 (m) | WEIGHT 1.5 (m) | WEIGHT 2.5 (m) |
|---|---|---|---|---|
| s1 | 2.1 | x1:0.0060 | x2:0.4868 | x3:0.7261 |
| s2 | 2.6 | x4:0.0001 | x5:0.0889 | x6:0.9802 |
| s3 | 3.0 | x7:0.0000 | x8:0.0111 | x9:0.6065 |
| s4 | 2.8 | x10:0.0000 | x11:0.0340 | x12:0.8353 |

FIG. 17

RELATIONSHIP BETWEEN SIGNAL CURVED SURFACE AND DISTANCE

FIG. 20A

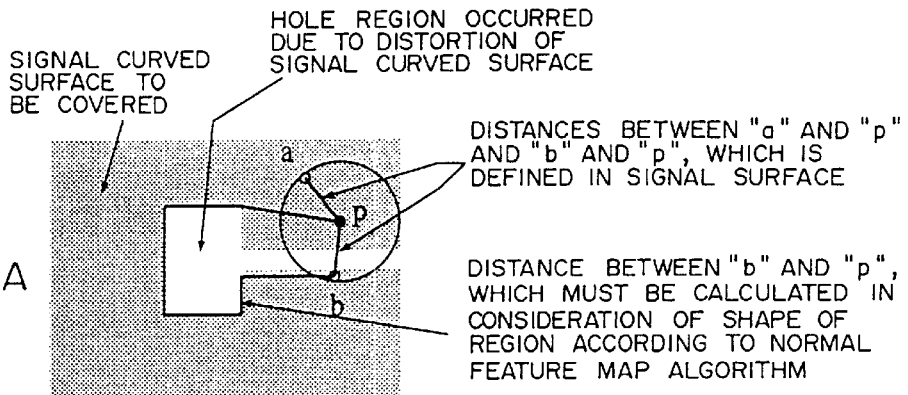

SIGNAL CURVED SURFACE TO BE COVERED

HOLE REGION OCCURRED DUE TO DISTORTION OF SIGNAL CURVED SURFACE

DISTANCES BETWEEN "a" AND "p" AND "b" AND "p", WHICH IS DEFINED IN SIGNAL SURFACE

DISTANCE BETWEEN "b" AND "p", WHICH MUST BE CALCULATED IN CONSIDERATION OF SHAPE OF REGION ACCORDING TO NORMAL FEATURE MAP ALGORITHM

COVERING ACCORDING TO NORMAL FEATURE MAP ALGORITHM

FIG. 20B

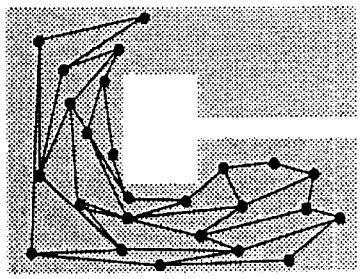

COVERING BY 5 × 5 PROTOTYPES

BECAUSE SIGNAL SURFACE IS DISTORTED, MAP IS DISTORTED IF GENERATION OF PROTOTYPES AND BUILDING OF ADJACENT RELATIONSHIP ARE SIMULTANEOUSLY PERFORMED

SURFACE CANNOT BE ENTIRELY COVERED

COVERING ACCORDING TO NEURAL GAS ALGORITHM

FIG. 20C

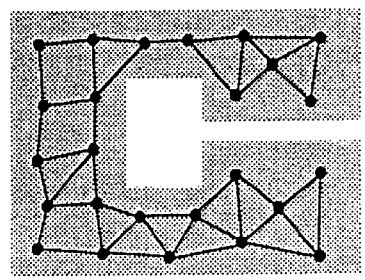

COVERING USING 25 PROTOTYPES

ENTIRE SURFACE IS PROPERLY COVERED IF SIGNAL SURFACE IS DISTORTED

BECAUSE ADJACENT RELATIONSHIP IS EMBEDED AFTER PROTOTYPES ARE GENERATED, MAP IS NOT DISTORTED

LEARNING TYPE POSITION DETERMINING DEVICE

BACKGROUND OF THE INVENTION

1. Field of the Invention

The present invention relates to a system for determining a position of a mobile object such as an autonomous robot, automobile, etc., and more particularly to a learning type self-position determining device for autonomously determining a position at which the mobile object itself exists in a mobile space by learning.

2. Description of the Prior Art

How to determine the position of a mobile object has been studied as a fundamental technology for achieving autonomy of a motion of a robot, automobile, etc. Normally, the position of a mobile object is calculated according to the information about a motion of the mobile object or the information about the relative position of a clue which helps to locate the absolute position. The following document 1 refers to this technology, which is outlined as follows.

Document 1: Edited by Japanese Robot Society: Robot Engineering Handbook Published by Corona Co. Ltd.

The first technology is a method called dead reckoning, which infers the relative position of a mobile object according to the information about the contact between the mobile object and the surface on which the mobile object moves. A straight move of a mobile object is measured by using a rotary encoder on the wheels, a wheel speed sensor, odometer, etc., while a change of a move direction of the mobile object is measured by performing rotation calculation of a differential wheel, or by using a compass, etc. Accumulation of such measurement results allows the distance between the mobile object and the origin and the direction of the mobile object from the origin to be obtained.

The second technology is a method using inertial navigation. With this method, both of an accelerometer and an angular velocity sensor which can measure a motion in an inertial coordinate system, are used in order to infer a position. The position can be inferred with high accuracy by using a gyro compass which can accurately find the absolute azimuth instead of the angular velocity sensor.

The third technology is a method using triangulation in a beacon system. With this method, the position of a mobile object in a coordinate system of landmarks is calculated according to the distance from each of the landmarks arranged in a move space to the mobile object, the relative angle between the landmarks within which the mobile object is centered, and the position information of a landmark.

The above described three methods have various advantages and disadvantages depending on the information used for determining a position. For the present invention, how to determine a position is explained by classifying the information for determining a position into return information and sense information. The return information is information about a motion of a mobile object. It can be obtained by processing a signal of a sensor which measures a motion state of the mobile object. The sense information is information about an environment of the mobile object. It can be obtained by, for example, processing a signal of a sensor which measures the distance between the mobile object and a landmark or the relative angle between the landmarks, or of a sensor which detects the absolute azimuth.

The dead reckoning as the first method is a method using the return information. Its advantages are that system cost is low, and an error when a position is determined becomes smaller if a motion path is in good condition in which slippage, etc. does not occur. Its disadvantage is that correction must be made depending on a road state because errors due to slippage of a wheel are accumulated.

According to the inertial navigation as the second method, there is the case in which only the return information is used, that is, the case in which the relative azimuth is detected using a mechanical gyro, and the case in which both of the return information and sense information are used, that is, the case in which the absolute azimuth is detected using a gyro compass.

The advantage of the first case in which only the return information is used is that errors due to slippage between a wheel of a mobile object and a surface on which the wheel contacts can be prevented from being accumulated. This is because the return information is generated by measuring a motion state using an angular velocity sensor and an accelerometer according to the inertial navigation. The disadvantage is that slight errors of signals of a sensor which measures a motion state are accumulated, and especially, the accuracy of the angle information is a problem. Use of an optical fiber gyro rather than a mechanical gyro provides a higher accuracy and its size is smaller.

The advantages when both the return and sense information are used are that errors due to slippage between a wheel of a mobile object and a contact surface can be prevented from being accumulated, and accurate angle information can be obtained using the absolute azimuth, thereby significantly improving the performance of determining a position. The disadvantages are that an extremely precise device, which is expensive, is required, a time constant of a response is normally long, and this implementation is unsuitable for a system of a small size.

The method using triangulation as the third method employs the sense information. Its advantage is that errors are not accumulated. Its disadvantage is that the information of an environment such as a map, beacon, landmark (a map which clearly shows the position information of such landmarks) must be provided when a system is designed, and the accuracy of the position determination is determined depending on the precision of the map.

Any of the above described methods cannot be selected and used alone when the position of an autonomous robot is to be determined. The first and second methods basically integrate a path using the return information. Accordingly, if a mobile object is carried to an arbitrary point not using a proper move method, for example, if an automobile is carried to an arbitrary point by a trailer, the position information is lost and its position cannot be determined. When the method for integrating a path is used, a straight line distance to the origin and its azimuth can be maintained as the information as long as the path is continuous. However, if the path becomes discontinuous, such information cannot be maintained.

Even if a gyro compass can be used for the second method, the position information cannot be modified because the absolute azimuth is isotropic information at each point. That is, if the north direction is indicated as the absolute azimuth, the position information cannot be modified only with that information. Similarly, the accumulation of an error included in a signal in a motion state cannot be modified.

For the triangulation method using the sense information as the third method, a system designer or a user must provide the map information of an environment in which a robot is positioned, in advance. Additionally, if the environment is dynamically changed, the map information must be modified. This means that the position cannot be autonomously determined, and even that the position cannot be identified at all in the state in which a landmark cannot be detected.

SUMMARY OF THE INVENTION

An object of the present invention is to provide a learning type position determining device using return and sense information, that is, to provide a learning type position determining device which can autonomously determine the position of a mobile object by inferring the return information corresponding to the sense information, based on the sense information corresponding to an environment state of the mobile object at an arbitrary position in a move space, after the return and sense information are integrated by learning.

The learning type position determining device according to the present invention comprises a return information processing block, sense information processing block, and an information integrating block.

The return information processing block is intended to obtain the return information indicating a relative position from the origin of a mobile object such as a robot in a move space. The return information is generated by sequentially accumulating, for example, a motion signal indicating a motion state of a mobile object, for example, a move distance of the mobile object in a unit time interval and a signal indicating an amount of a change of a move direction.

The sense information processing block is intended to generate the sense information corresponding to an environment state surrounding the mobile object. The sense information is generated as a value corresponding to the distance between a sense signal generated based on the result of an observation of an environment of the mobile object, and a representative point in each partitioned domain in a quantized sense signal space.

The information integrating block is intended to infer and output the return information corresponding to the sense information output from the sense information processing block when a mobile object is present at an arbitrary point, after the information integrating block learns the correlation between the return information output from the return information processing block and the sense information output from the sense information processing block, and integrates these items of information. With this process, the return information indicating the relative position from the origin of the mobile object is obtained, so that the position of the mobile object can be autonomously determined.

Additionally, the information integrating block can infer and output the sense information corresponding to the return information output from the return information processing block when a mobile object is at an arbitrary point, after it learns the correlation between the return information and sense information, and integrates these items of information. With this process, it becomes possible to perform the motion control for avoiding an obstacle beforehand, for example, by inferring the information of the obstacle according to the relative position of a robot from the origin.

BRIEF DESCRIPTION OF THE DRAWINGS

FIG. 1 is a block diagram showing the principle of a learning type position determining device according to the present invention;

FIG. 2 is a block diagram showing the entire configuration of the learning type position determining device according to the present invention;

FIG. 11 is a flowchart showing a process of a sense information processing unit in a learning mode;

FIG. 12 is a table showing encoded output signals of a filter;

FIG. 17 is a table showing the distance to an obstacle corresponding to each sensor and an output intensity of each neuron;

FIG. 20A is a schematic diagram showing the relationship between a signal curved surface and a distance when a weight is modified;

FIG. 20B is a schematic diagram showing a covering using a normal feature map algorithm when the weight is modified;

FIG. 20C is a schematic diagram showing a covering using a neural gas algorithm when the weight is modified using the total order;

DESCRIPTION OF THE PREFERRED EMBODIMENTS

Figure 3A:
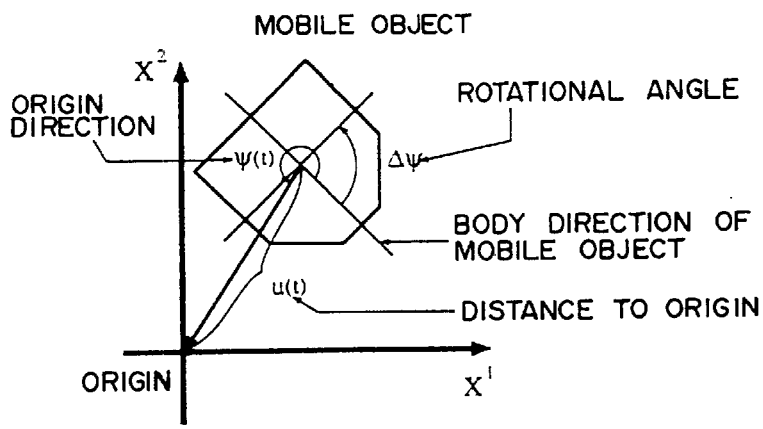
FIG. 3A is a schematic diagram explaining an update of an origin direction due to a rotation at a time "t" in a process for updating return information using a relative azimuth.

FIG. 1 is a block diagram showing the principle of the present invention. This figure is the block diagram showing a learning type position determining device which internally generates a coordinate system for a mobile object in a move space, and autonomously locates its position in the move space, so that the mobile object such as a robot determines its own position in the move space.

In FIG. 1, a return information processing block 1 is, for example, a return information processing unit, and is intended to obtain return information indicating the relative position from the origin of a mobile object such as a robot in a move space. A sense information processing block 2 is intended to generate sense information corresponding to an environment of the mobile object at the relative position. The information integrating block 3 is intended to learn a correlation between the return information output from the return information processing block 1 and the sense information output from the sense information processing block 2, integrate these two items of information, and infer and output the return information corresponding to the sense information output from the sense information processing block 2, when the navigation by which the mobile object returns from an arbitrary position in the move space to the origin is executed.

The return information processing block 1 obtains the return information on a path of the mobile object by sequentially accumulating a motion signal indicating a motion state of the mobile object, for example, a move distance of the mobile object in a unit time interval, and a signal indicating an amount of a change of a move direction, and outputs its result to the information integrating block 3.

The sense information processing block 2 outputs sense information to the information integrating block 3. The sense information is generated as a value corresponding to the distance between a sense signal generated based on the result of an observation of an environment surrounding a mobile object at an arbitrary point in a move space, and a representative point in each domain partitioned in a quantized sense signal space. Furthermore, the sense signal is generated as a result of discretizing and localizing a signal indicating the distance between the mobile object and a plurality of landmarks, for example, a signal input from a sensor.

The information integrating block 3 learns the value of the return information corresponding to an arbitrary point, as a weight of a connection to which the maximum value among respective values corresponding to the distances to representative points in respective domains is input, among the connections of a network in the information integrating block 3, for example, in correspondence with an input of the value corresponding to the distance between the sense signal at the arbitrary point, and a representative point in each domain, during learning. The information integrating block 3 infers the return information corresponding to the arbitrary point with interpolation by using the value of the return information at each point in a move space, which corresponds to the representative point in each domain, in correspondence with the above described input of the value corresponding to the distance during execution.

According to the present invention, the position of a mobile object is autonomously determined by integrating the return information generated by path accumulation and the sense information generated by using a sense signal space, that is, a sense signal map, as described above. These items of information are integrated so that they can be mutually referenced/inferred. With the calculation method of the position information of a mobile object using the information integration according to the present invention, a space is encoded by the sense information, a phase of each code, that is, the distance between points in a move space, which correspond to each code is determined by the return information. This does not mean that the same information is not processed twice with different methods. Accordingly, it becomes possible to solve the problem of the autonomous position determination of a mobile object such as an autonomous robot.

FIG. 2 is a block diagram showing the entire configuration of a learning type position determining device according to the present invention. In this figure, the learning type position determining device 10 comprises a return information processing unit 12 for obtaining a return information, that is, a return signal encoded according to a signal indicating a motion state input from a sensor 11; sense information processing unit 14 for generating a sense information, that is, a sense signal encoded according to an input of a signal indicating an environment from the sensor 13; and an information integrating unit 16 for integrating an encoded return signal input from the return information processing unit 12, that is, the return information, and an encoded sense signal output from the sense information processing unit 14, that is, the sense information, and outputting the return information corresponding to the sense information when a mobile object is present at an arbitrary position, to a driving control device 15 of the mobile object such as a robot, as the position information, that is, a return vector to be described later. The information integrating unit 16 can infer the return information using the sense information as a key, or infer the sense information using the return information as a key.

In FIG. 2, the return information processing unit 12 constantly calculates the relative distance between the origin and the current position of a mobile object, (according to the first sensor signal from the first sensor), and its azimuth, by encoding the first signal indicating a motion state provided by the first sensor 11 into a motion signal, and accumulating a move distance and an amount of a change of the direction in a unit time interval. The return information processing unit 12 then transforms the relative distance and the azimuth into the return information as a suitable expression, and outputs it to the information integrating unit 16.

The sense information processing unit 14 encodes a second signal from the second sensor 13 so that it corresponds to a point in a sense signal space generates the prototype of the sense signal corresponding to the representative point in the sense signal space in correspondence with a plurality of representative points in a move space of a robot; generates the sense information as an expression unique to a sense signal encoded from the second sensor signal corresponding to an arbitrary point in a move space based on the generated prototype; and outputs the sense information to the information integrating unit 16.

The information integrating unit 16 integrates outputs from the return information processing unit 12 and the sense information processing unit 14 so that they can mutually infer, by learning. The position information at an arbitrary point in a move space can be inferred as the return information using the sense information output from the sense information processing unit 14 after the completion of the learning. The inferred return information, the return vector to be described later, is provided to the driving control device 15 of a mobile object such as a robot.

As described above, the return information processing unit 12 shown in FIG. 2 constantly calculates a straight line distance "u", for example, from the current position of a mobile object such as a robot to the origin, and the information corresponding to the direction "φ", by accumulating signals in a motion state, which are obtained along a move path of the mobile object; and stores the result of the calculation. This information will be called return information "h (u,φ)" with which the robot returns from the current position to the origin. The return information is represented by the following equation using phasor coding employing a trigonometric function instead of a normal vector.

$$h(u, \phi) = u \cos(\omega k + \phi) \quad (1)$$

where "ω" is a frequency used for the coding. The following document refers to such a use of the phasor coding in order to represent the return information.

Document 2: S. Hosogi, M. Matsuoka and Y. Maeda: Learning-type Vector Calculating Device (TOKUGANHEI 8-197556)

Document 3: D. S. Touretzky et al.: Neural Representation of Space Using Sinusoidal Arrays, Neural Computation, Vol.5, pp.869–884 (1992).

Document 2 is the prior application of the present applicant, and discloses the technology for accumulating the return information using the phasor coding. Such a method can implement a straight motion and a rotational motion with simple operations in comparison with the case in which the return information is directly represented using a vector. Additionally, it can configure an accumulator with high accuracy using a simple circuit, that is, an adder. Since localized representation can be made by performing discretization, an encoder or an accumulator can be configured with simpler circuits.

There are two methods respectively using the absolute azimuth and the relative azimuth for the direction of a robot, that is, the method for representing an azimuth. The relative azimuth indicates an azimuth in coordinates (inertial coordinate system) attached to a robot whose reference is, for example, a proceeding direction of a robot. The absolute azimuth indicates an azimuth on a move surface whose reference is, for example, the north. If the absolute azimuth can be used for representation of the sense information, the return information can be represented in a more compact form.

Provided first is the explanation about an accumulation of the return information using the absolute azimuth. If the information of the absolute azimuth is used, the return information at a time "t" is represented by the following equation.

$$h(u(t),\phi(t)) = u(t) \cos(\omega k + \phi(t)) \quad (2)$$

Here, the amount of modification of the return information when a robot moved in a direction Δφ on the absolute azimuth basis by a distance Δu in a unit time interval is represented as follows.

$$\Delta h(u(t),\phi(t)) = \Delta u \cos(\omega k + \Delta\phi) \quad (3)$$

As a result, the return information at a time "t+1" is represented by the following equations (4) through (6), and the distance and azimuth at the time "t+1" is represented by the following equations (7) and (8).

$$h(u(t+1), \phi(t+1)) = h(u(t), \phi(t)) + \Delta h(u(t), \phi(t)) \quad (4)$$

$$= u(t)\cos(\omega k + \phi(t)) + \Delta u \cdot \cos(\omega k + \Delta\phi) \quad (5)$$

$$= u(t+1)\cos(\omega k + \phi(t+1)), \quad (6)$$

$$u(t+1) = \sqrt{u(t)^2 + \Delta u^2 + 2u(t)\Delta u \cdot \cos(\phi(t) - \Delta\phi)}, \quad (7)$$

$$\phi(t+1) = \tan^{-1}\left(\frac{u(t)\sin(\phi(t)) + \Delta u \cdot \sin(\Delta\phi)}{u(t)\cos(\phi(t)) + \Delta u \cdot \cos(\Delta\phi)}\right), \quad (8)$$

The return information processing unit 12 constantly makes the above described calculations, and stores the return information as the results of the calculations.

To efficiently accumulate the return information, there is a method for transforming a phasor code into an N-dimensional cosine vector (here, a "sinusoidal array" is called a "cosine vector"), and performing accumulation operations. The representation of the return information using the N-dimensional cosine vector which uniquely corresponds to a phasor code, can be obtained by discretizing the phasor code and transforming it into the cosine vector. The operations for updating the return information, which are performed by the return information processing unit 12, are performed according to the following steps (1) through (5).

(1) Calculating the move direction $\Delta\phi$ and the move distance $\Delta\phi$ at a unit time interval based on a signal regarding a move state of a robot, which is transmitted from a sensor.

(2) Obtaining the amount of modification of the return information corresponding to the unit time interval as an N-dimensional cosine vector according to the following equation.

$$\Delta h_{u(t),\phi(t)}(i) = \Delta u \cdot \cos\left(\frac{2\pi i}{N} + \Delta\phi\right) \quad (i = 1, \ldots, N) \qquad (9)$$

(3) Reading the return information at the time "t", which is stored as the cosine vector.

$$h_{u(t),\phi(t)}(i)$$

(4) Calculating the following equation for each of elements (i=1, ..., N) of the cosine vector in order to obtain the return information at the time "t+1".

$$h_{u(t+1),\phi(t+1)}(i) = h_{u(t),\phi(t)}(i) + \Delta h_{u(t),\phi(t)}(i) \qquad (10)$$

$$= u(t)\cos\left(\frac{2\pi i}{N} + \phi(t)\right) + \Delta u \cdot \cos\left(\frac{2\pi i}{N} + \Delta\phi\right) \qquad (11)$$

(5) Updating the stored return information at the time "t" to the one at the time "t+1".

Provided below is the explanation about the calculations of the move direction $\Delta\phi$ and the move distance $\Delta u$ in the step (1). As an azimuth meter for obtaining a move angle of a mobile object (body) such as a robot, a system using a magnetic sensor is employed. The north direction is assumed to be the reference direction (reference axis), and the degrees of a rotation angle (0 to 360 degrees) of a body are measured in a clockwise direction in units of 360/1024 degrees. An output from the azimuth meter is a 9-bit positive integer. The absolute azimuth of the body can be obtained with this azimuth meter.

The angle of the absolute direction (move direction) $\Delta\phi$ is obtained as an angle formed by the body and the reference axis. $\Delta\phi$ is calculated using an output $\alpha(t)$ at the time "t" of the azimuth meter By according to the following equation.

$$\Delta\phi = \frac{2\pi}{360}\alpha(t)$$

The move distance $\Delta u$ of the body is obtained by using a speed "V" of the body. The speed "V" is calculated from speeds "$v_l$" and "$v_r$" of a left side and a right side driving wheel, respectively, according to the following equation.

$$v=(v_l+v_r)/2$$

The speeds of the left side and right side driving wheels are calculated using angular velocities "$\omega_l$" and "$\omega_r$" of the left side and right side driving wheels, which are detected, for example, every 1/32 seconds, according to the following equation.

$$v_l=a\omega_l, v_r=a\omega_r$$

where "a" is a radius of the driving wheels. The wheels are, for example, of radius 2.5 centimeters.

The speeds are represented, for example, in signed 8 bits. The move distance au is calculated according to the following equation by using the unit time interval as "$\tau$"

$$\Delta u = v\tau$$

Provided next is the explanation about a process for updating the return information using the relative azimuth. The principle in this case is the same as that in the case where the absolute azimuth is used. However, a sine function is paired with a cosine function, and used in order to represent the return information. This is because the information regarding the rotation of the robot are required. For the accumulation on the relative azimuth basis, a motion of the robot is resolved into a rotation and a translation in a short time, and the return information is updated depending on this motion.

For the accumulation on the relative azimuth basis, the return information is represented as "h (u(t), $\psi$(t))" in a polar coordinate system assigned to the body of the robot.

This way of representing the return information is explained by referring to FIG. 3. Assume that the azimuth "$\psi$" is represented by an angle which the proceeding direction of the mobile object (the direction which is perpendicular to the front surface of the mobile object, and passes through the center of gravity of the mobile object body) forms with a segment from the origin to the center of gravity of the mobile object body in the range from "0" to "$2\pi$" in a counterclockwise direction. The angle may be represented in the range from "0" to "$\pi$" in the counterclockwise direction, or in the clockwise direction. If cases are classified depending on the representations of an angle, the following explanation will be basically satisfied. The distance between the center of gravity of the mobile object and the origin is represented as "u(t)".

The return information at the time "t" is represented by the following equation.

$$h(u(t),\Psi(t))=(u(t)\cos(\omega k+\Psi(t)), u(t)\sin(\omega k+\Psi(t))) \qquad (12)$$

FIG. 3A is a schematic diagram explaining the process for updating the direction $\psi$ due to a rotation at the time "t". If the body is rotated by $\Delta\psi$ at the time "t" as shown in this figure, the azimuth will be "$\psi'$", and the return information is obtained according to the following equation.

$$u(t)\cos(\omega k+\Psi'(t))=u(t)\cos(\omega k+\Psi(t)-\Delta\Psi) \qquad (13)$$

$$u(t)\sin(\omega k+\Psi'(t))=u(t)\sin(\omega k+\Psi(t)-\Delta\Psi) \qquad (14)$$

For the sake of convenience, the time "t" is not updated to "t+1" for the rotation here. The time "t" is updated for motions including a translation, to be explained next.

If the equations (13) and (14) are rewritten using matrices, the following equation can be obtained.

$$\begin{pmatrix} u(t)\cos(\omega k + \psi'(t)) \\ u(t)\sin(\omega k + \psi'(t)) \end{pmatrix} = \begin{pmatrix} \cos(\Delta\psi) & \sin(\Delta\psi) \\ \sin(\Delta\psi) & -\cos(\Delta\psi) \end{pmatrix} \begin{pmatrix} u(t)\cos(\omega k + \psi(t)) \\ u(t)\sin(\omega k + \psi(t)) \end{pmatrix}. \qquad (15)$$

Figure 3B:
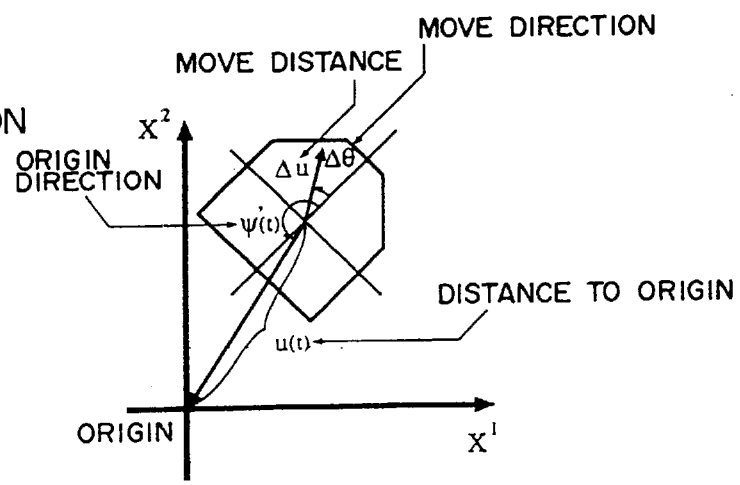
FIG. 3B is a schematic diagram showing an update of position information due to a translation at the time "t" in the process for updating the return information using the relative azimuth.

The process for updating the position information due to the translation at the time "t" is explained by referring to FIG. 3B.

Assuming that the mobile object moves in the direction $\Delta\theta$ by the distance $\Delta u$ from the direction of the body after the mobile object rotates by $\Delta\psi$, the return information at the time "t+1" is generated according to the following equation.

$$\begin{pmatrix} u(t+1)\cos(\omega k + \psi(t+1)) \\ u(t+1)\sin(\omega k + \psi(t+1)) \end{pmatrix} = \qquad (16)$$

-continued $$\begin{pmatrix} u(t)\cos(\omega k + \psi'(t)) \\ u(t)\sin(\omega k + \psi'(t)) \end{pmatrix} - \begin{pmatrix} \Delta u \cdot \cos(\omega k + \Delta\theta) \\ \Delta u \cdot \sin(\omega k + \Delta\theta) \end{pmatrix}$$

Figure 3C:
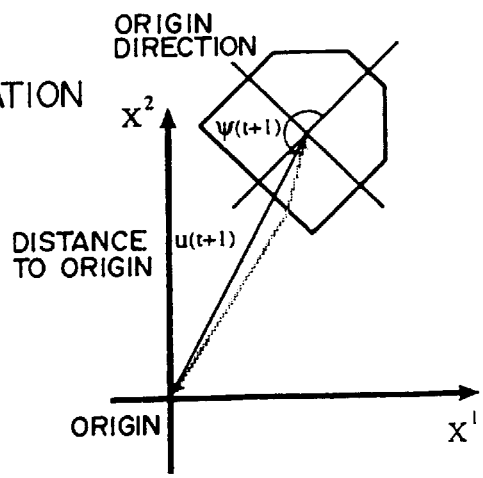
FIG. 3C is a schematic diagram showing position information at a time "t+1" in an update of the return information using the relative azimuth.

FIG. 3C shows the position of the mobile object at the time "t+1" after this move.

Also in the case in which the relative azimuth is used, phasor code is discretized, so that N-dimensional cosine and sine vectors which uniquely correspond to the phasor code are obtained as the representation of the return information. The process for updating the return information is performed according to the following steps (1) through (6) in this case.

(1) Calculating the rotational angle $\Delta\psi$, move direction $\Delta\theta$, and the move distance $\Delta u$ in a unit time interval, based on a movement signal of a robot transmitted from a sensor, in a similar manner as in the case in which the absolute azimuth is used. The rotational angle $\Delta\psi$ is calculated based on an output of an azimuth meter in a similar manner as in the case in which the absolute azimuth is used. Assuming that the angles formed by the body and the reference axis at the times "t" and "t+1" are respectively $\alpha(t)$ and $\alpha(t+1)$, $\Delta t$ is obtained according to the following equation.

$$\Delta\Psi = \frac{2\pi}{360}\{\alpha(t) - \alpha(t+1)\}$$

Generating a matrix indicating the rotation and N-dimensional cosine and sine vectors required for the modification due to a translation, according to the following equations.

$$\begin{pmatrix} \cos(\Delta\psi) & \sin(\Delta\psi) \\ \sin(\Delta\psi) & -\cos(\Delta\psi) \end{pmatrix}, \quad (17)$$

$$\Delta h_{u(t),\psi(t),c}(i) = \Delta u \cdot \cos\left(\frac{2\pi i}{N} + \Delta\theta\right), \quad (18)$$

$$\Delta h_{u(t),\psi(t),s}(i) = \Delta u \cdot \sin\left(\frac{2\pi i}{N} + \Delta\theta\right) \quad (i = 1, \ldots, N). \quad (19)$$

(3) Reading the N-dimensional cosine and sine vectors which represent the return information at the time "t".

$$h_{u(t),\psi(t),c}(i) = u(t)\cos\left(\frac{2\pi i}{N} + \psi(t)\right), \quad (20)$$

$$h_{u(t),\psi(t),s}(i) = u(t)\sin\left(\frac{2\pi i}{N} + \psi(t)\right), \quad (i = 1, \ldots, N) \quad (21)$$

(4) Calculating the following equation for each of elements (i=1, . . . , N) of the cosine and sine vectors as the modification of the return information due to the rotation $\Delta\Psi$ of the body.

$$\begin{pmatrix} h_{u(t),\psi'(t),c}(i) \\ h_{u(t),\psi'(t),s}(i) \end{pmatrix} = \begin{pmatrix} \cos(\Delta\psi) & \sin(\Delta\psi) \\ \sin(\Delta\psi) & -\cos(\Delta\psi) \end{pmatrix} \begin{pmatrix} u(t)\cos\left(\frac{2\pi i}{N} + \psi(t)\right) \\ u(t)\sin\left(\frac{2\pi i}{N} + \psi(t)\right) \end{pmatrix} \quad (22)$$

(5) Making a modification due to the translation for each of the elements of the cosine and sine vectors to which the modification due to the rotation is made, according to the following equations.

$$\begin{pmatrix} h_{u(t+1),\psi(t+1),c}(i) \\ h_{u(t+1),\psi(t+1),s}(i) \end{pmatrix} = \begin{pmatrix} h_{u(t),\psi'(t),c}(i) \\ h_{u(t),\psi'(t),s}(i) \end{pmatrix} - \begin{pmatrix} \Delta h_{u(t),\psi(t),c}(i) \\ \Delta h_{u(t),\psi(t),s}(i) \end{pmatrix} \quad (23)$$

$$= \begin{pmatrix} u(t)\cos\left(\frac{2\pi i}{N} + \psi'(t)\right) \\ u(t)\sin\left(\frac{2\pi i}{N} + \psi'(t)\right) \end{pmatrix} - \begin{pmatrix} \Delta u \cdot \cos\left(\frac{2\pi i}{N} + \Delta\theta\right) \\ \Delta u \cdot \sin\left(\frac{2\pi i}{N} + \Delta\theta\right) \end{pmatrix} \quad (24)$$

(6) Updating the return information at the time "t" to that at the time "t+1".

Figure 4:
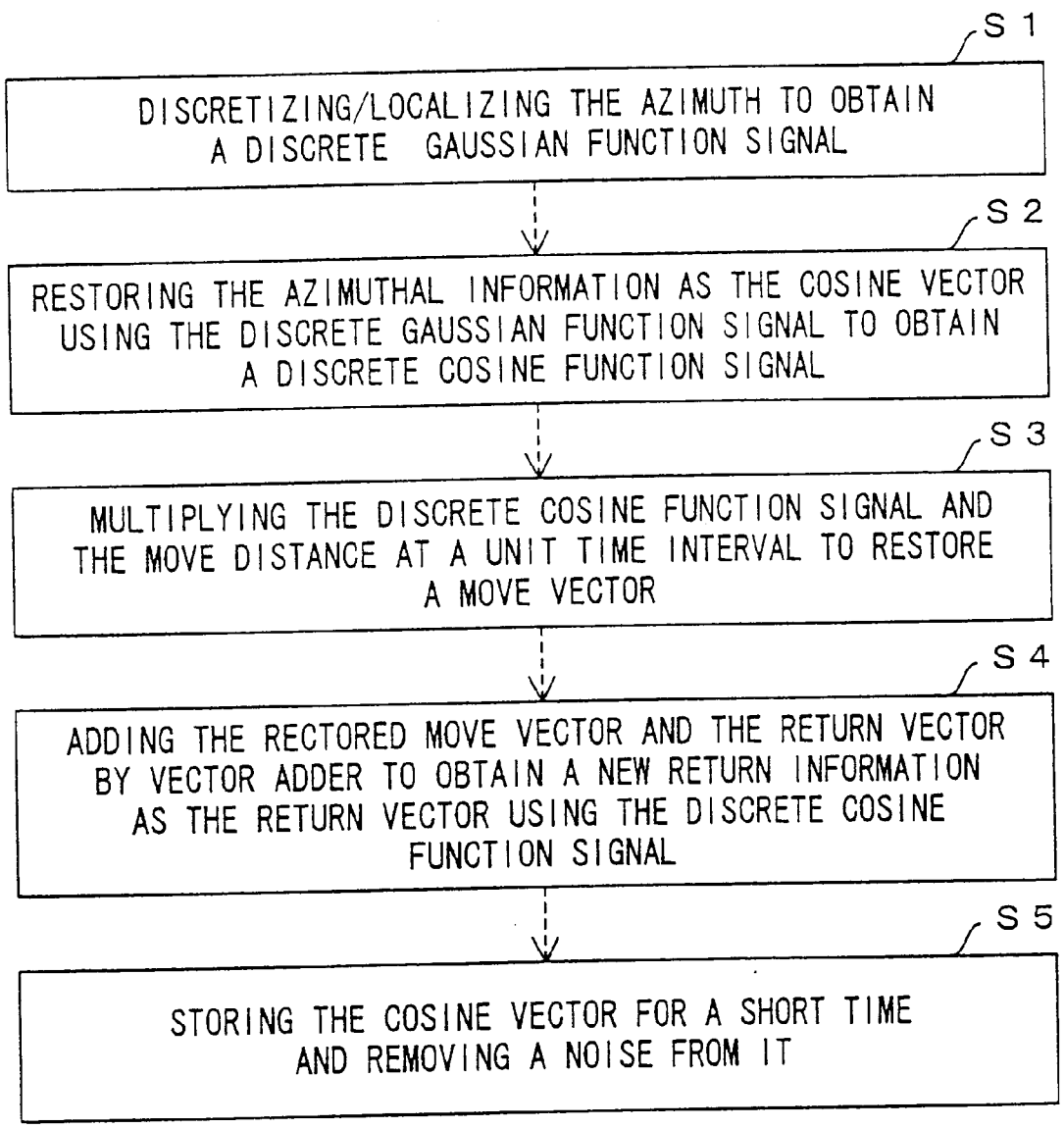
FIG. 4 is a flowchart showing a process performed by a return information processing unit.

Provided next is the explanation about the process performed by the return information processing unit 12, by referring to FIG. 4. In this figure, the azimuth obtained by a sensor is discretized and localized using a Gaussian filter, so that a discrete Gaussian function signal is obtained in step S1. The details of how to obtain the Gaussian function signal will be described later.

In step S2, the azimuthal information as the cosine vector is restored using the discrete Gaussian function signal, so that a discrete cosine function signal is obtained. In step S3, the discrete cosine function signal and the move distance at a unit time interval are multiplied, so that a move vector is restored. The multiplication of the move distance at the unit time interval by the discrete cosine function corresponds to, for example, the product of $\Delta u$ and the cosine function in the equation (9).

After the move vector at the unit time interval is restored in step S3, its result is added to the return vector at the preceding unit time interval, that is, the cosine vector, by a vector adder in step S4. As a result, the return vector is updated, and new return information is obtained as the return vector using the discrete cosine function signal. The return information is temporarily stored for the addition by the vector adder at the succeeding unit time interval in step S5, and, for example, noise is removed.

Figure 5:
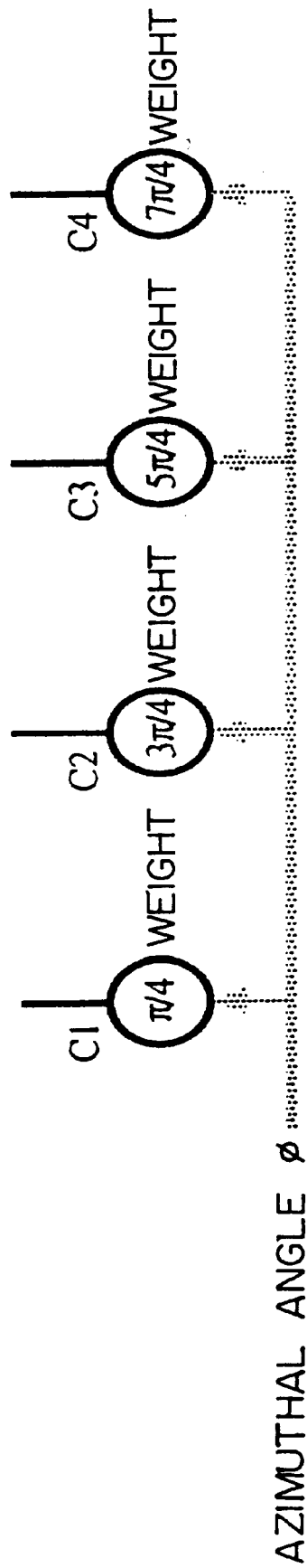
FIG. 5 exemplifies a neural network for transforming an azimuthal angle into a discrete Gaussian signal.

Provided below is the explanation about the operations performed in step S1 among the processes shown in FIG. 4, that is, the process for discretizing and localizing an azimuth using a Gaussian filter, by referring to FIGS. 5 through 9. FIG. 5 exemplifies a neural network for transforming an azimuthal angle into a discrete Gaussian function signal. This neural network transforms the azimuthal angle $\phi$ into an output intensity of a neuron in the range from 0 to $2\pi$, and performs spatial encoding as an output pattern of the neural network. Each of neurons C1 through C4 makes a comparison between a weight and an input, and determines an output based on the result of the comparison. In FIG. 5, the azimuthal angle $\phi$ as a one-dimensional signal is transformed into a four-dimensional signal as the outputs of the four neurons, and the dimension of the sensor signal is extended.

Figure 6:
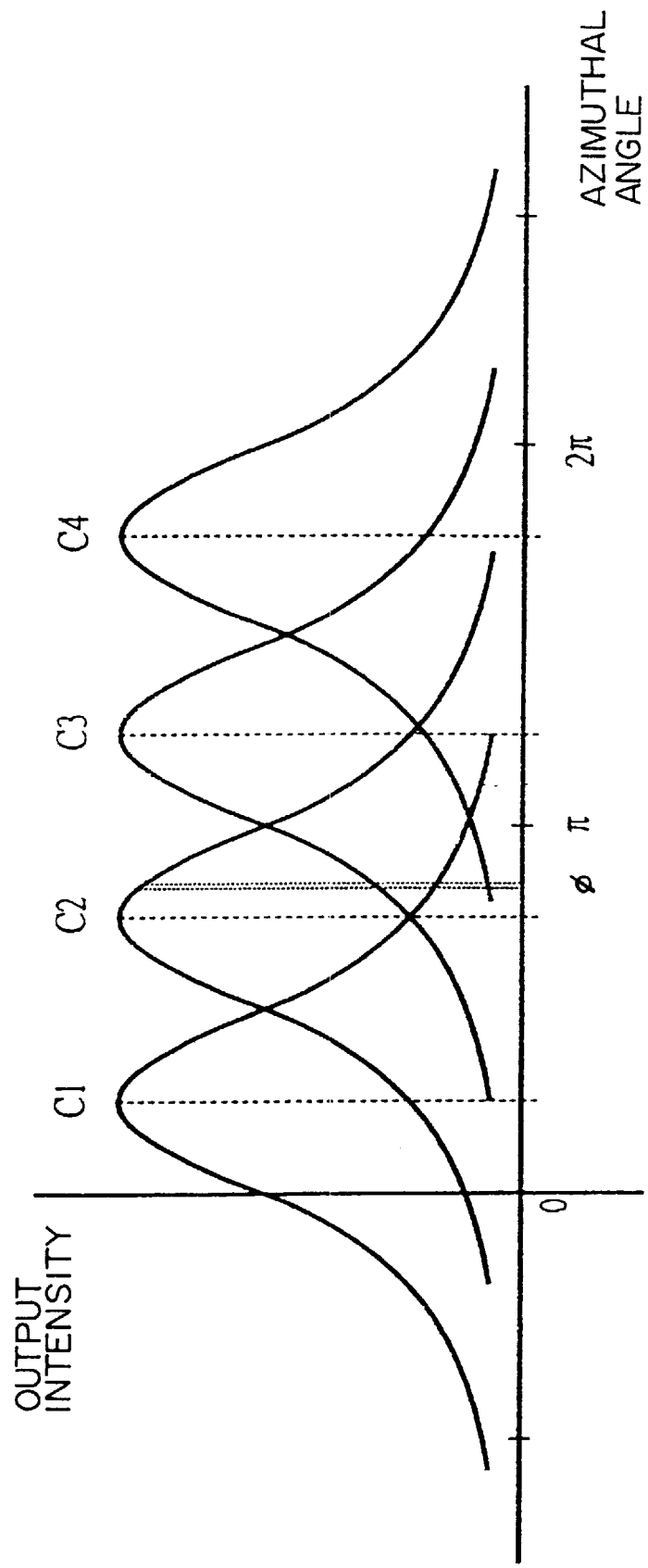
FIG. 6 is a schematic diagram showing outputs of four neurons in the neural network shown in FIG. 5.

FIG. 6 shows an output intensity of each of the four neurons C1 through C4. As shown in this figure, the four neurons have respective four Gaussian receptive fields depending on the respectively given weights, and provide outputs depending on an input azimuthal angle. The weights $m_i$ (i=1, 2, 3, 4) of the neurons C1, C2, C3, and C4 are respectively set to $\pi/4$, $3\pi/4$, $5\pi/4$, and $7\pi/4$. The output function $f_i$ (i=1, 2, 3, 4) for determining a receptive field is obtained by the following equation.

$$f_i = \exp[0.5(\phi - m_i)^2] \quad (i=1,2,3,4) \quad (25)$$

Additionally, the value of the variance which determines the form of the output function is selected so that the information of the azimuthal angle is left unchanged as much as possible. Here, it is set to 1 radian.

Figure 7:
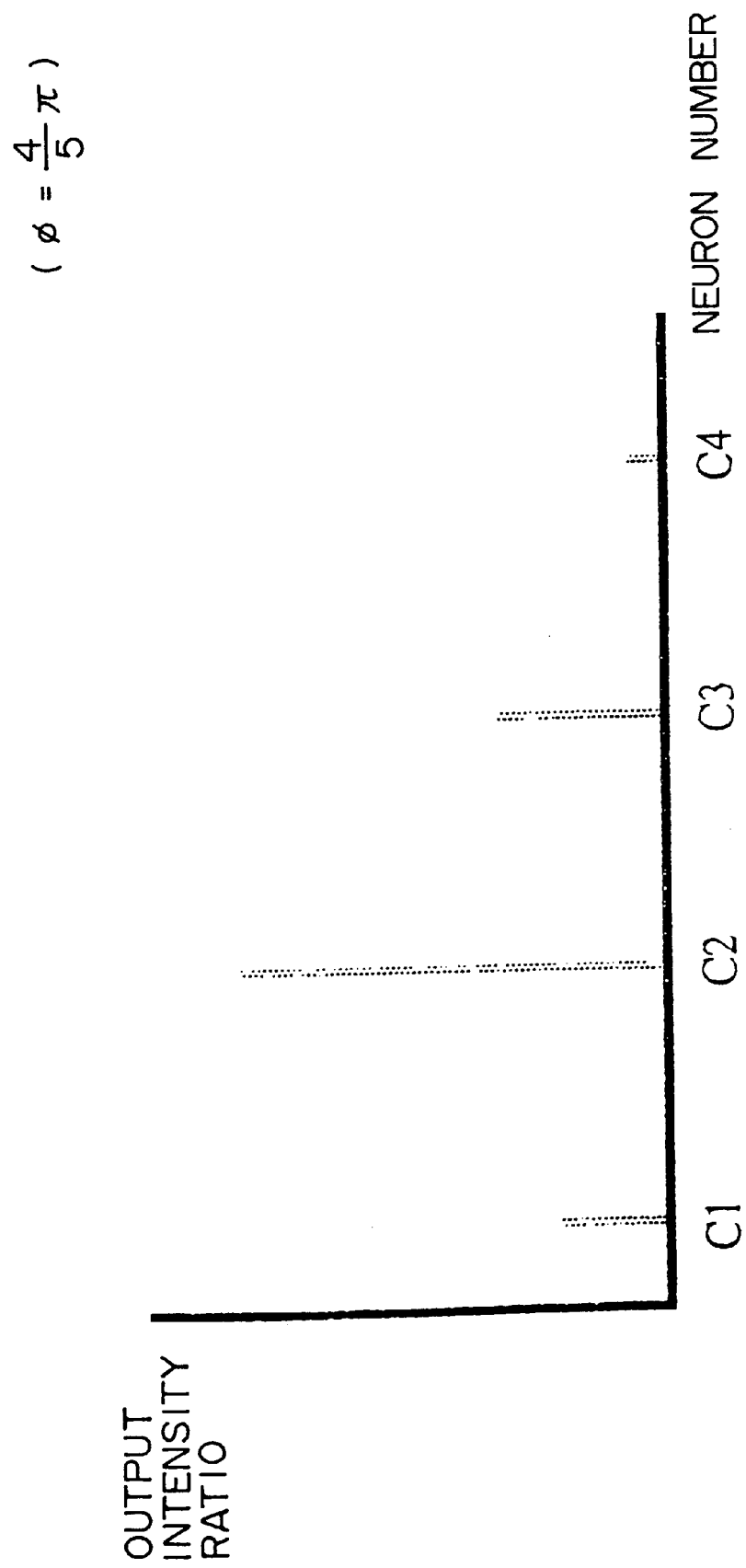
FIG. 7 is a schematic diagram ($\phi=4\pi/5$) showing output intensity ratios of the four neurons.

FIG. 7 shows an output intensity ratio of each of the neurons when φ=4π/5 is input as the azimuthal angle. The output intensity ratio "$q_i$"(i=1, 2, 3, 4) is obtained by standardizing each of the outputs of the neurons by the total of the entire output. The output ratio of each of the neurons will be as follows. The neuron which strongly responds to the input azimuthal angle is C2.

$$(q_1, q_2, q_3, q_4) = (0.14115, 0.620338, 0.231205, 0.0073078)$$

Figure 8:
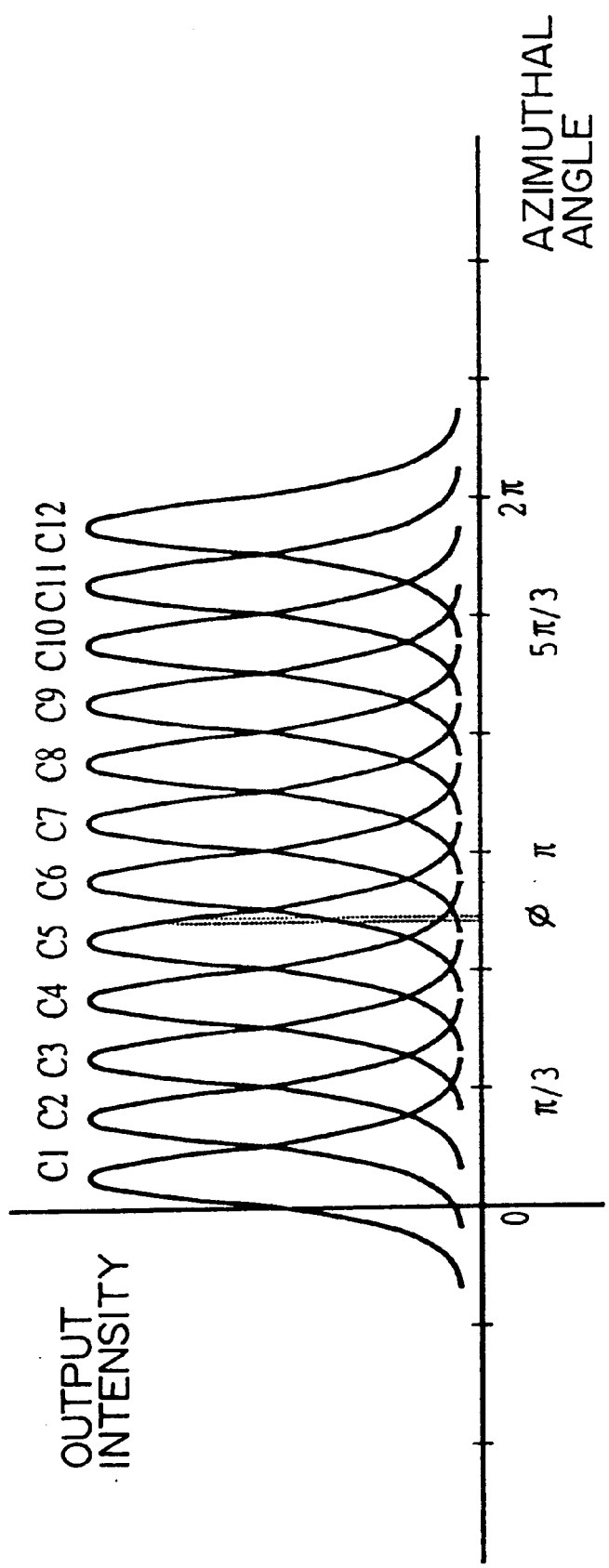
FIG. 8 is a schematic diagram showing neuron outputs obtained by dividing the range of an azimuthal angle by twelve neurons.

FIG. 8 shows an output intensity when the number of neurons is made larger than that of FIG. 5, and the range of the azimuthal angle 0 to 2π is divided by twelve neurons. The receptive field of each of the neurons becomes smaller, and an output function of each of the neurons is obtained by the following equation.

$$f_i = \exp\left[0.5\left(\frac{\phi - 2\pi i/13}{\pi/13}\right)^2\right] \quad (i = 1, 2, \ldots, 12) \tag{26}$$

Figure 9:
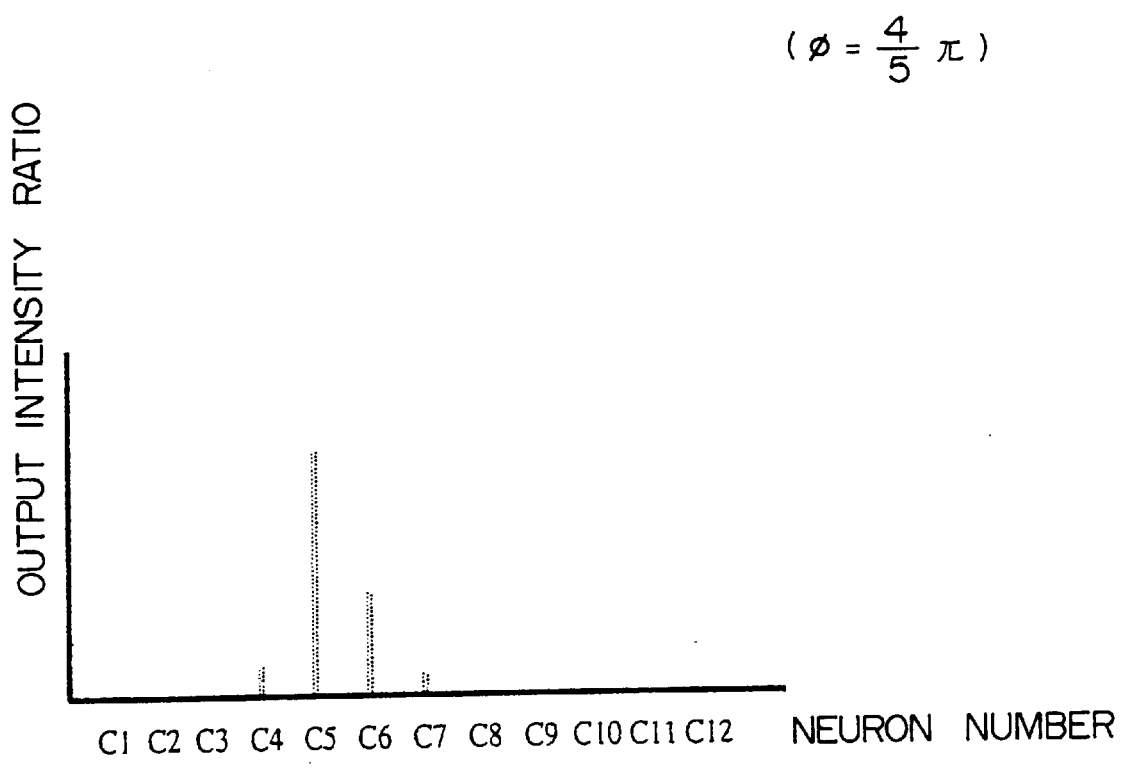
FIG. 9 is a schematic diagram ($\phi=4\pi/5$) showing output intensity ratios of the neurons shown in FIG. 8.

FIG. 9 shows an output intensity ratio in response to the input "φ=4π/5" as the azimuthal angle, when the twelve neurons are used as shown in FIG. 8. The output intensity ratio of each of the neurons will be as follows.

$$(q_1, q_2, q_3, q_4, q_5, q_6, q_7, q_8, q_9, q_{10}, q_{11}, q_{12}) =$$
$$(0.0000, 0.0000, 0.0000, 0.0446, 0.7333, 0.2209,$$
$$0.0012, 0.0000, 0.0000, 0.0000, 0.0000, 0.0000)$$

The neuron which strongly responds to the input azimuthal angle is limited to a small region in the entire network, and the information of the input azimuthal angle is spatially localized.

Figure 10:
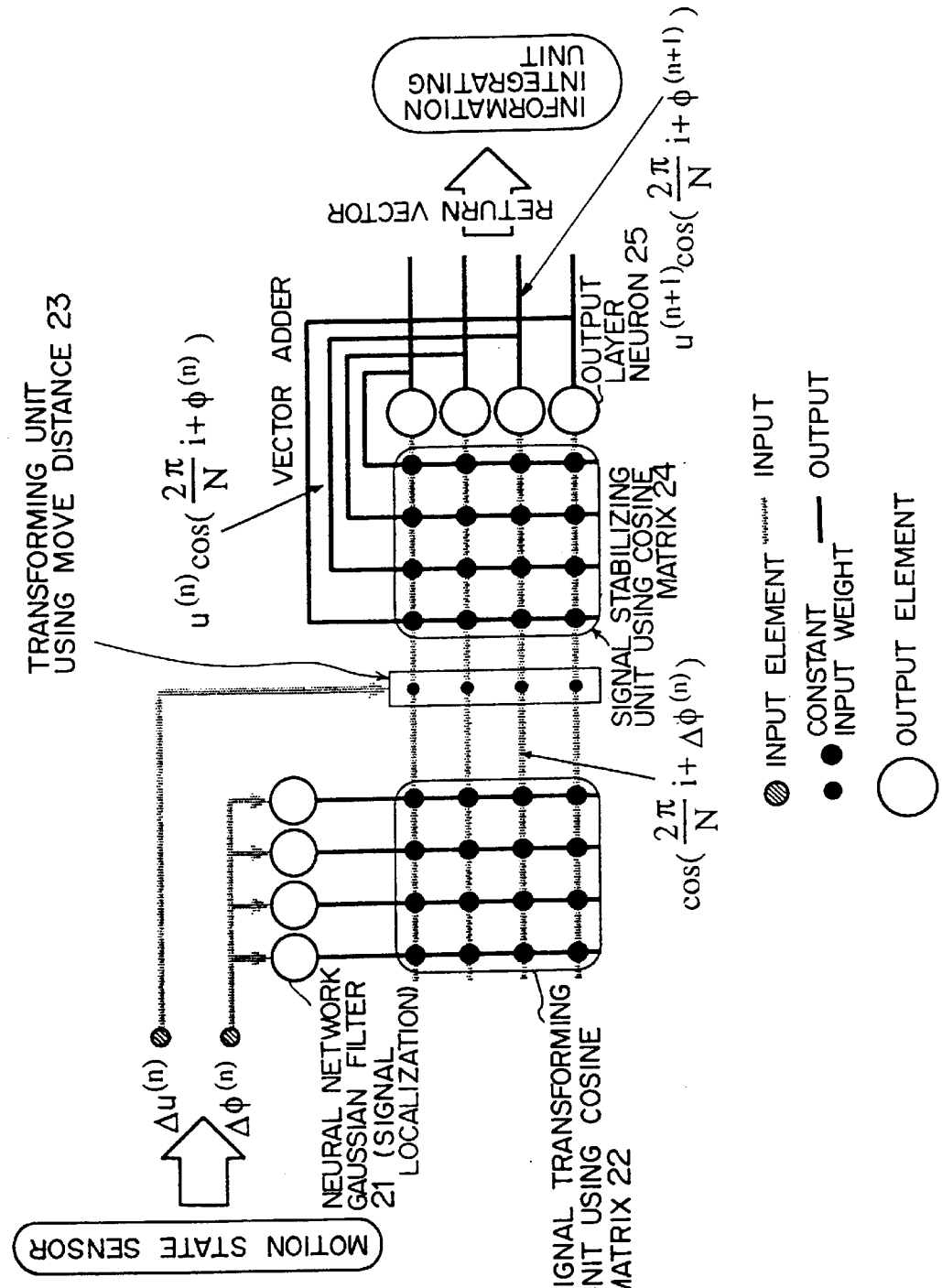
FIG. 10 is a schematic diagram showing an implementation of a return information processing unit using a neural network.

Provided next is the explanation about the implementation of the return information processing unit. FIG. 10 shows an implementation of the return information processing unit 12 using a neural network. This neural network performs the same operations as those of the vector operation device 40 disclosed in document 2. These operations are briefly explained below. First of all, an amount of a change of an azimuthal angle $\Delta\phi^{(n)}$ input from a motion state sensor is provided to a signal transforming unit 22 which performs the operations using a cosine matrix, after a signal is localized by a neural network 21 serving as a Gaussian filter which discretizes and localizes a signal, as described above.

The signal transforming unit 22 is intended to provide an input weight corresponding to a neuron of an output layer 25, and provides an input weight of a neural network which operates using a neuron of the neural network as the Gaussian filter, as an input layer.

Assume that the number of neurons structuring the input layer 21, that is, the neurons of the neural network as the Gaussian filter here, is "M", and the number of neurons of the output layer 25 is "N". Also assume that "M" is normally much larger than "N". Each of the neurons of the input layer 21 has a Gaussian receptive field, whose size is very small. An element of the output layer 25 is intended to linearly output the sum of the products of input and weight.

The signal transforming unit 22 which performs its operations using a cosine matrix is intended to spatially encode an azimuthal angle. The azimuthal angle must be transformed into a representation using a cosine function for the calculation of a return vector. The indices of the neurons of the input layer 21 are assumed to be j=1, 2, . . . , M, while the indices of the neurons of the output layer 25 are assumed to be i=1, 2, . . . , N. The connection weights from the neurons of the input layer to those of the output layer, that is, the connection weight $S_{ij}$ structuring a cosine matrix in the signal transforming unit 22, are set according to the following equation.

$$S_{ij} = \cos\left(\frac{2\pi}{M}i + \frac{2\pi}{N}j\right) \tag{27}$$

Assume that the output of an input layer neuron is $Y_j$, and the output of the corresponding output layer neuron is $h_i$. The neuron "k" which strongly responds to the amount of a change of the azimuthal angle $\Delta\phi_{(n)}$ exists among the neurons of the input layer 21 as described above. Its output will be "1", while the outputs of the other neurons will be "0", that is, other neurons do not respond to that amount of change of the azimuth angle. If there is only one neuron which makes a strong response, it means that $\Delta\phi_{(n)} \sim (2\pi/M)$ k. The signal of the amount of an azimuthal change operates by the amount indicated by the following equation for the "i" neuron of the output layer.

$$\sum_{j=1}^{M} Y_j \cos\left(\frac{2\pi}{N}i + \frac{2\pi}{M}j\right) = \cos\left(\frac{2\pi}{N}i + \frac{2\pi}{M}k\right) \tag{28}$$

Accordingly, the influence on the output of the output layer neuron by the input signal regarding the azimuthal angle is obtained according to the following equation.

$$\cos\left(\frac{2\pi}{N}i + \Delta\phi^{(n)}\right) \quad (i = 1, 2, \ldots, M) \tag{29}$$

For the amount of the influence on the output, a transforming unit using move distance 23 performs an operation called "modification of information using a synapse combination" according to the input signal $\Delta u^{(n)}$ regarding the mobile distance. The amount of this influence is transformed according to the following equation.

$$\Delta u^{(n)} \cos\left(\frac{2\pi}{N}i + \Delta\phi^{(n)}\right) \quad (i = 1, 2, \ldots, M) \tag{30}$$

With this process, the change of the return vector in a short time is encoded according to the equation (30), and used for addition by the output layer neuron 25.

Provided next is the explanation about a signal stabilizing unit 24 which performs the operations using a cosine matrix. The signal stabilizing unit 24 is intended to generate a return vector at a time "n+1" by adding the amount of a change of the return vector in a short time to a return vector at a time "n". The value of the output of each of the neurons of the output layer 25 at the time "n+1" is obtained according to the following equation.

$$h_i^{(n+1)} = h_i^{(n)} + \Delta u^{(n)} \cos\left(\frac{2\pi}{N}i + \Delta\phi^{(n)}\right) \quad (i = 1, 2, \ldots, M) \tag{31}$$

To perform this calculation, a short time storage for temporarily storing the return vector at the time "n" is required. The short time storage is implemented by the weight of the recurrent connection, that is, the weight "$T_{ik}$" of the connection indicated by a black circle inside the signal stabilizing unit 24 which performs the operations using a cosine matrix.

The weight "$T_{ik}$" is set so that the following equation is satisfied.

$$h_i^{(n)} = \sum_{k=1}^{N} T_{ik} h_k^{(n)} = \sum_{k=1}^{N} T_{ik} u^{(n)} \cos\left(\frac{2\pi}{N}k + \phi^{(n)}\right) \quad (32)$$

As the evident connection weight, Kronecker's delta $\delta_{ik}$ can be used. The use of this $\delta_{ik}$ allows $T_{ik}$ to be obtained by the following equation.

$$T_{ik}=1 (i=k), T_{ik}=0 (i \neq k) \quad (33)$$

As the connection weight other than this self-evident weight, the connection weight provided by the following equation is raised.

$$T_{ik} = \frac{2}{N}\cos\left(\frac{2\pi}{N}(i-k)\right) \quad (34)$$

Provided below are explanation of the implementation of the short time storage using this connection weight, and the correct extraction of the value of the return vector at the time "n", by removing a bias "b" if it exists in the output layer. That is, it is proved that the following equation is satisfied.

$$h_i = \sum_{K=1}^{N} \frac{2}{N}\cos\left(\frac{2\pi}{N}(i-k)\right)\left(u^{(n)}\cos\left(\frac{2\pi k}{N} + \phi^{(n)}\right) + b\right) \quad (35)$$

To prove the equation (35), the following equations are first examined.

$$\sum_{K=1}^{N} \cos(xk) = \sin\left(\frac{N}{2}x\right)\cos\left(\frac{N+1}{2}x\right) / \left(\sin\frac{x}{2}\right), \quad [1]$$

$$\sum_{K=1}^{N} \sin(xk) = \sin\left(\frac{N}{2}x\right)\sin\left(\frac{N+1}{2}x\right) / \sin\left(\frac{N}{2}\right), \quad [2]$$

Normally, the following relationship can be found.

$$e^{\pm jxk} = \cos(xk) \pm j\sin(xk).$$

$$\cos(xk) = \frac{e^{jxk} + e^{-jxk}}{2}.$$

$$\sin(xk) = \frac{e^{jxk} - e^{-jxk}}{2}.$$

where "j" is an imaginary number.
As a result, the following equation can be satisfied.

$$\sum_{k=1}^{N} e^{jxk} = \sum_{k=1}^{N} \cos(xk) + j\sum_{k=1}^{N}\sin(xk), \quad [3]$$

Accordingly, if $$\sum_{k=1}^{N} e^{jxk}$$

is obtained, its real part will be the value corresponding to $$\sum_{k=1}^{N} \cos(xk).$$

Its imaginary part will be the value corresponding to $$\sum_{k=1}^{N} \sin(xk).$$

Because $$\sum_{k=1}^{N} e^{jxk}$$

is a sum of finite terms in geometric series of geometric ratio $e^{jx}$, it will be given as follows.

$$\sum_{k=1}^{N} e^{jxk} = e^{jx}1 - \frac{e^{jxN}}{1 - e^{jx}} \quad [4]$$

$$= e^{jx(N+1)/Z}e^{jx(N)/Z} - \frac{e^{-jx(N)/Z}}{e^{jx(N+1)/Z} - e^{-jx/Z}}$$

$$= e^{jx(N+1)/Z}\frac{\sin(xN/2)}{\sin(x/2)}$$

$$= \sin\left(\frac{N}{2}x\right)\cos\left(\frac{N+1}{2}x\right) / \sin\left(\frac{x}{2}\right) +$$

$$j\sin\left(\frac{N}{2}x\right)\sin\left(\frac{N+1}{x}\right) / \sin\left(\frac{x}{2}\right),$$

In this transformation process, the second row is obtained by multiplying "$e^{jx}$" of the first row by "$e^{jx(N-1)/2}$", and multiplying the denominator of the obtained fractional expression of the first row by "$-e^{-jx/2}$", and multiplying the numerator by "$-e_{-jx\ N/2}$".

If the respective comparisons between the real and imaginary parts of the equations [3] and [4] are made, the equations [1] and [2] are proved to be satisfied.

Next, if "$x=2\pi/N$" is substituted into the equations [1] and [2], the following equations are proved to be satisfied.

$$\sum_{k=1}^{N} \cos\left(\frac{2\pi}{N}k\right) = \sin\left(\frac{N}{2} \times \frac{2\pi}{N}\right)\cos\left(\frac{N+1}{2} \times \frac{2\pi}{N}\right) / \sin\left(\frac{1}{2} \times \frac{2\pi}{N}\right) \quad [5]$$

$$= \sin(\pi)\cos\left(\pi + \frac{\pi}{N}\right) / \sin\left(\frac{\pi}{N}\right)$$

$$= 0,$$

$$\sum_{k=1}^{N} \cos\left(\frac{2\pi}{N}k\right) = \sin\left(\frac{N}{2} \times \frac{2\pi}{N}\right)\sin\left(\frac{N+1}{2} \times \frac{2\pi}{N}\right) / \sin\left(\frac{1}{2} \times \frac{2\pi}{N}\right) \quad [6]$$

$$= \sin(\pi)\sin\left(\pi + \frac{\pi}{N}\right) / \sin\left(\frac{\pi}{N}\right)$$

$$= 0,$$

Similarly, if "$x=4\pi/N$" is substituted, the following equations are generated.

$$\sum_{k=1}^{N} \cos\left(\frac{4\pi}{N}k\right) = 0, \quad [7]$$

-continued $$\sum_{k=1}^{N} \sin\left(\frac{4\pi}{N}k\right) = 0, \qquad [8]$$

Next, the following equations are examined for an arbitrary phasor shift.

$$\sum_{k=1}^{N} \cos\left(\frac{2\pi}{N}k + \phi\right) = 0, \qquad [9]$$

$$\sum_{k=1}^{N} \sin\left(\frac{2\pi}{N}k + \phi\right) = 0, \qquad [10]$$

If $$\sum_{k=1}^{N} \cos((2\pi/N)k + \phi)$$

is transformed using an addition theorem, it will become:

$$\sum_{k=1}^{N} \cos\left(\frac{2\pi}{N}k + \phi\right) = \sum_{k=1}^{N} \left(\cos\left(\frac{2\pi}{N}k\right)\cos(\phi) - \sin\left(\frac{2\pi}{N}k\right)\sin(\phi)\right) \qquad [11]$$
$$= \cos(\phi)\sum_{k=1}^{N} \cos\left(\frac{2\pi}{N}K\right) -$$
$$\sin(\phi)\sum_{k=1}^{N} \sin\left(\frac{2\pi}{N}k\right).$$

If the equations [5] and [6] are substituted, the equation [11] will become the equation [9]. Similarly, if the following equation is calculated using an addition theorem, and the equations (5) and (6) are substituted, the equation (10) can be obtained.

$$\sum_{k=1}^{N} \sin\left(\frac{2\pi}{N}k + \phi\right) = \sum_{k=1}^{N} \left(\sin\left(\frac{2\pi}{N}k\right)\cos(\phi) + \cos\left(\frac{2\pi}{N}k\right)\sin(\phi)\right) \qquad [12]$$
$$= \cos(\phi)\sum_{k=1}^{N} \sin\left(\frac{2\pi}{N}k\right) +$$
$$\sin(\phi)\sum_{k=1}^{N} \cos\left(\frac{2\pi}{N}k\right),$$

In a similar manner, the following equations [13] and [14] can be obtained.

$$\sum_{k=1}^{N} \cos\left(\frac{4\pi}{K} + \phi\right) = 0, \qquad [13]$$

$$\sum_{k=1}^{N} \sin\left(\frac{4\pi}{N}k + \phi\right) = 0, \qquad [14]$$

Since the equations (9) and (10) are satisfied with an arbitrary $\phi$, they are also satisfied with "$\phi = -(2\pi/N)i$." Accordingly, $$\sum_{k=1}^{N} \cos\left(\frac{2\pi}{N}k - \frac{2\pi}{N}i\right) = \sum_{k=1}^{N} \cos\left(\frac{2\pi}{N}(i-k)\right) \qquad [15]$$
$$= 0,$$

$$\sum_{k=1}^{N} \sin\left(\frac{2\pi}{N}k - \frac{2\pi}{N}i\right) = -\sum_{k=1}^{N} \sin\left(\frac{2\pi}{N}(i-k)\right) \qquad [16]$$
$$= 0,$$

Additionally, since the equations (13) and (14) are satisfied with an arbitrary $\phi$, they are also satisfied with "$\phi = -(4\pi/N)i$."

$$\sum_{k=1}^{N} \cos\left(\frac{4\pi}{N}k - \frac{4\pi}{N}i\right) = \sum_{k=1}^{N} \cos\left(\frac{4\pi}{N}(i-k)\right) \qquad [17]$$
$$= 0,$$

$$\sum_{k=1}^{N} \sin\left(\frac{4\pi}{N}k - \frac{4\pi}{N}i\right) = -\sum_{k=1}^{N} \sin\left(\frac{4\pi}{N}(i-k)\right) \qquad [18]$$
$$= 0,$$

Based on the above described explanations, the following equation is developed.

$$h_i = \sum_{k=1}^{N} T_{ik}\left(u^{(n)}\cos\left(\frac{2\pi}{N}k + \phi^{(n)}\right) + b\right),$$

If $$T_{ik} = \frac{2}{N}\cos\left(\frac{2\pi}{N}(i-k)\right)$$

is substituted, the following equation is obtained.

$$h_i = \sum_{k=1}^{N} \frac{2}{N}\cos\left(\frac{2\pi}{N}(i-k)\right)\left(u^{(n)}\cos\left(\frac{2\pi}{N}k + \phi^{(n)}\right) + b\right) \qquad [19]$$
$$= u^{(n)}\sum_{k=1}^{N} \frac{2}{N}\cos\left(\frac{2\pi}{N}(i-k)\right)\cos\left(\frac{2\pi}{N}(i-k)\right)\cos\left(\frac{2\pi}{N}k + \phi^{(n)}\right) +$$
$$b\sum_{k=1}^{N} \frac{2}{N}\cos\left(\frac{2\pi}{N}(i-k)\right).$$

If the equation (15) is substituted, the second term (beginning with "b") on the right side disappears, and the equation will become:

$$h_i = u^{(n)}\sum_{k=1}^{N} \frac{2}{N}\cos\left(\frac{2\pi}{N}(i-k)\right)\cos\left(\frac{2\pi}{N}k + \phi^{(n)}\right), \qquad [20]$$

The equation [20] is transformed into the following equation [21].

$$h_i = u^{(n)}\sum_{k=1}^{N} \frac{2}{N}\cos\left(\frac{2\pi}{N}(i-k)\right)\cos\left(\frac{2\pi}{N}i + \frac{2\pi}{N}(k-i) + \phi^{(n)}\right) \qquad [21]$$

-continued $$= u^{(n)} \sum_{k=1}^{N} \frac{2}{N} \cos\left(\frac{2\pi}{N}(i-k)\right) \cos\left(\frac{2\pi}{N}(i-k) - \left(\frac{2\pi}{N}i + \phi^{(n)}\right)\right),$$

The addition theorem is then applied. As a result, the equation will be:

$$h_i = u^{(n)} \sum_{k=1}^{N} \frac{2}{N} \cos\left(\frac{2\pi}{N}(i-k)\right) \cos\left(\frac{2\pi}{N}(i-k)\right) \cos\left(\frac{2\pi}{N}i + \phi^{(n)}\right) + \quad [22]$$

$$u^{(n)} \sum_{k=1}^{N} \frac{2}{N} \cos\left(\frac{2\pi}{N}(i-k)\right) \sin\left(\frac{2\pi}{N}(i-k)\right) \sin\left(\frac{2\pi}{N}i + \phi^{(n)}\right)$$

$$= u^{(n)} \cos\left(\frac{2\pi}{N}i + \phi^{(n)}\right) \sum_{k=1}^{N} \frac{2}{N} \cos\left(\frac{2\pi}{N}(i-k)\right) \cos\left(\frac{2\pi}{N}(i-k)\right) +$$

$$u^{(n)} \sin\left(\frac{2\pi}{N}i + \phi^{(n)}\right) \sum_{k=1}^{N} \frac{2}{N} \cos\left(\frac{2\pi}{N}(i-k)\right) \sin\left(\frac{2\pi}{N}(i-k)\right),$$

This equation is further transformed using the following relational expressions.

$$2\cos^2(A) = 1 + \cos(2A),$$

$$2\sin(A)\cos(A) = \sin(2A),$$

The resultant equation will be:

$$h_i = u^{(n)} \cos\left(\frac{2\pi}{N}i + \phi^{(n)}\right) \sum_{k=1}^{N} \frac{1}{N}\left(1 + \cos\left(\frac{4\pi}{N}(i-k)\right)\right) + \quad [23]$$

$$u^{(n)} \sin\left(\frac{2\pi}{N}i + \phi^{(n)}\right) \sum_{k=1}^{N} \frac{1}{N} \sin\left(\frac{4\pi}{N}(i-k)\right),$$

Here, if the equations [17] and [18] are substituted, the equation will be:

$$h_i = u^{(n)} \cos\left(\frac{2\pi}{N}i + \phi^{(n)}\right), \quad [24]$$

That is, the equation (35) is proved to be satisfied.

As described above, the use of the weight of the recurrent connection provided by the equation (34) allows this connection to serve as a short time storage, and at the same time, it allows a bias to be removed. Among the eigenvalues of this connection weight matrix, the eigenvalue corresponding to $$\cos\left(\frac{2\pi}{N}i\right) \text{ and } \sin\left(\frac{2\pi}{N}i\right)$$

is "1".

On the contrary, the absolute values of other eigenvalues are smaller than "1". If a return vector signal includes a component at a frequency different from the frequency $2\pi/N$, the transformation using the recurrent connection results in a reduced mapping for the different component. Accordingly, that component disappears in the calculations repeated during the accumulation of return vectors. This means that noise is not accumulated.

Provided next is the explanation about the operations of the sense information processing unit 14, by referring to FIG. 11. The sense information processing unit 14 encodes a sensor signal into a sense signal, for example, according to an input of the sensor signal indicating the distance between a plurality of landmarks in a move space of a robot, and the robot itself.

The sense information processing unit 14 is implemented, for example, by a neural network. In its learning mode, an output layer neuron in which the difference between the weight vector in which weight from each input layer neuron is recognized to be each component of the vector, and the sense signal vector whose component is a signal input to each input layer neuron is the smallest, is considered to be a winner neuron; and the self-organizing learning which changes the weight of the winner neuron most significantly is performed. In this embodiment, the input weight vector after the learning is completed, that is, the weight vector of each output layer neuron, is called a prototype in a sense signal space.

For the self-organizing learning, a neural-gas algorithm and a growing cell structure exist in addition to a feature map algorithm according to Kohonen. The following documents refer to these algorithms.

Document 4: T. Kohonen: The Self-Organizing Map, Proc. IEEE, Vol.78, No.9, pp.1464–1480 (1990)

Document 5: T. M. Martinez et al.: Neural-Gas Network for Vector Quantization and its Application to Time-Series Prediction, IEEE Trans. on Neural Networks, Vol.4, No.4, pp.558–569 (1993)

Document 6: B. Fritzke, Growing Cell Structures—A Self-Organizing Network for Unsupervised and Supervised Learning, Neural Networks, Vol.7, No.9, pp.1441–1460 (1994).

After local linearization of a sensor signal using coordinate transformation, etc. is performed in step S11 in correspondence with the input of a sensor signal in FIG. 11, the sensor signal is discretized and localized using a radial base function such as a Gaussian function in step S12. As a result, a sense signal can be obtained. Even if the process of step S11 is not performed, the extension of the dimension of the sensor signal, which will be explained by referring to FIGS. 12 through 17, etc. is performed in step S12, so that the data can be handled as linearized data.

The radial base function is used as the base for approximation and interpolation of a function. A hyperbolic function is also one type of the radial base function in addition to the Gaussian function. Assuming that the radial base function is $g_i(x)$, an arbitrary function will be represented by the following equation.

$$f(\vec{x}) = \sum_{i=1}^{n} a_i g_i(\vec{x}) = \sum_{i=1}^{n} a_i g(\|\vec{x} - \vec{\omega}_i\|)$$

If an arbitrary real value function f(t) defined in t∈[0,1] can be written with a linear combination of a string of continuous functions $g_1(t), \ldots, g_n(t)$, $$\ldots \sum_{i=1}^{\infty} a_i g_i(t),$$

each $g_i(t)$ is called as a base function of the arbitrary real value function f(t). For example, $1, x, x^2, \ldots, x^n$ represents the arbitrary real value function in the following form. Approximation with a high accuracy can be implemented by the sum of the finite terms.

$$\sum_{i=1}^{\infty} a_i x^i(t)$$

Next, the distance between the vector of the sense signal obtained from the sensor signal and each current prototype candidate, that is, the input weight vector of each output layer neuron in the neural network, is compared in step S13. In step S14, the prototype candidate which is closest to the input sense signal vector is determined, and a learning signal is obtained. In step S15, each prototype candidate is updated by using the learning signal as the organizing learning according to an update rule. The details of the learning signal and the update rule will be described later.

In step S16, a learning schedule is evaluated in order to evaluate the result of the learning. For example, if the number of learning times does not exceed an upper limit, the sense information processing unit 14 waits for a signal input in order to learn the next sensor signal in step S17. The process in and after step S11 is repeated based on an input of a sensor signal. If the number of learning times exceeds the upper limit of the learning schedule evaluation in step S16, the learning of the sense information processing unit 14 is terminated and the prototype candidate at that time is recognized as the prototype of the sense signal.

Provided below is the explanation about the process for discretizing and localizing a sensor signal using a Gaussian function in step S12 of FIG. 11. The dimension of the sensor signal to be extended is determined depending on the type of a sensor, the number of sensors, and the range of the sensors. Assume that only an ultrasonic sensor is used as a sensor attached to a mobile object. Also assume that the number of ultrasonic sensors is four and each of the sensors measures the distance to an obstacle or a wall in each of four directions. The sensor signal space is four-dimensional at this time.

Assuming that each of the ultrasonic sensors possesses a measurement range from 0 to 3 meters, that is, the range, and the range is divided into three partial ranges using a filter, the encoded output signals of the filter shown in FIG. 12 can be obtained. One sensor signal can be represented by a three-dimensional vector by performing such encoding. As a result, the sensor signal space whose dimension is extended using the filter will be twelve-dimensional. Unlike FIG. 12, it is natural that the range can be divided so that the partial ranges overlap.

Figure 13:
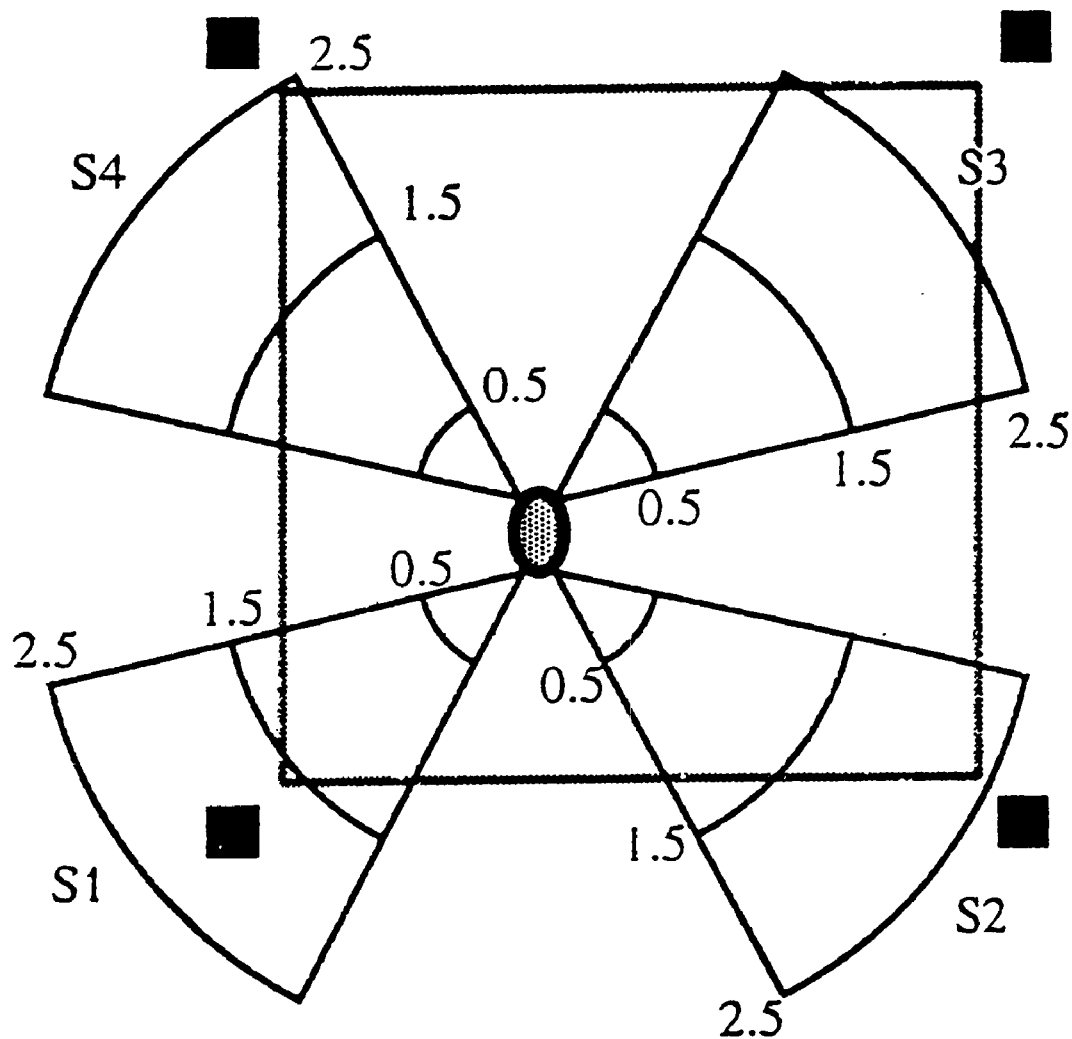
FIG. 13 is a schematic diagram explaining a state in which an ultrasonic wave sensor measures distances to obstacles.

Provided below is the further detailed explanation about the specific example of the dimension extension of a sensor signal, which depends on the distance between a robot and an obstacle, by referring to FIGS. 13 through 17. FIG. 13 shows the state in which four ultrasonic sensors S1 through S4 attached to a robot measure the respective distances between four obstacles and the robot. An ellipse represents the robot, and black squares represent the obstacles. The sensor S1 detects that the obstacle exists in the range between 1.5 to 2.5 meters, while the other sensors detect that the distance to the obstacles exceeds 2.5 meters.

Figure 14:
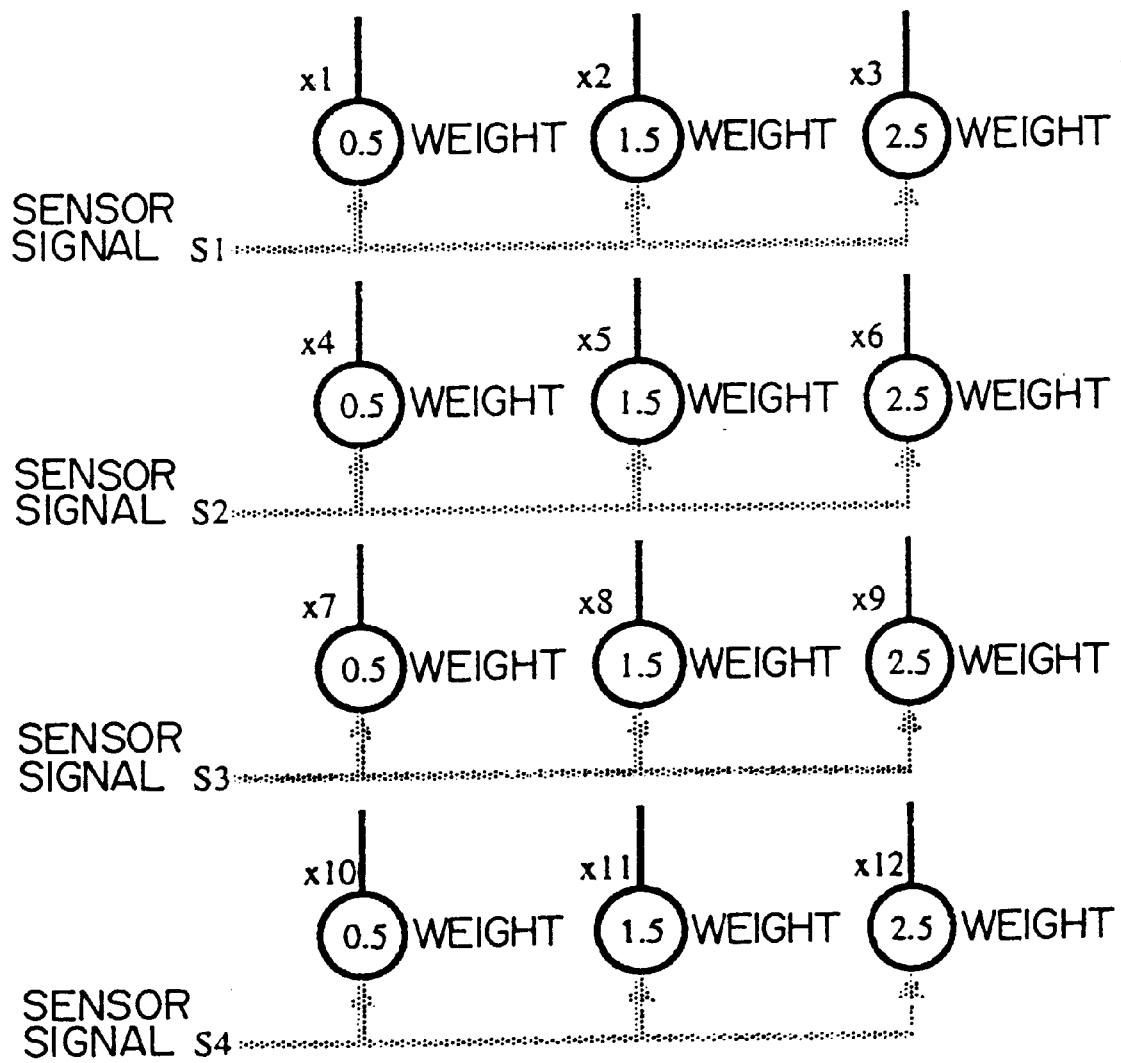
FIG. 14 is a schematic diagram explaining a neural network which extends the dimensions of an ultrasonic sensor signal.

FIG. 14 is a schematic diagram explaining a neural network in which each of the ranges of each of the sensor signals shown in FIG. 13 is divided by three neurons having Gaussian receptive fields in order to extend the dimension of each of the sensor signals. In this figure, each of the ranges is divided into three partial ranges by three neurons using respective 0.5, 1.5, and 2.5 meters as weights for a signal from one sensor, and the distance between each of the sensors and each of the obstacles is discretized and localized with an output intensity of each of the neurons. The output function of each of the neurons is assumed to be similar to that explained by referring to FIG. 6, and 0.5 meter is used as the value of variance.

Figure 15:
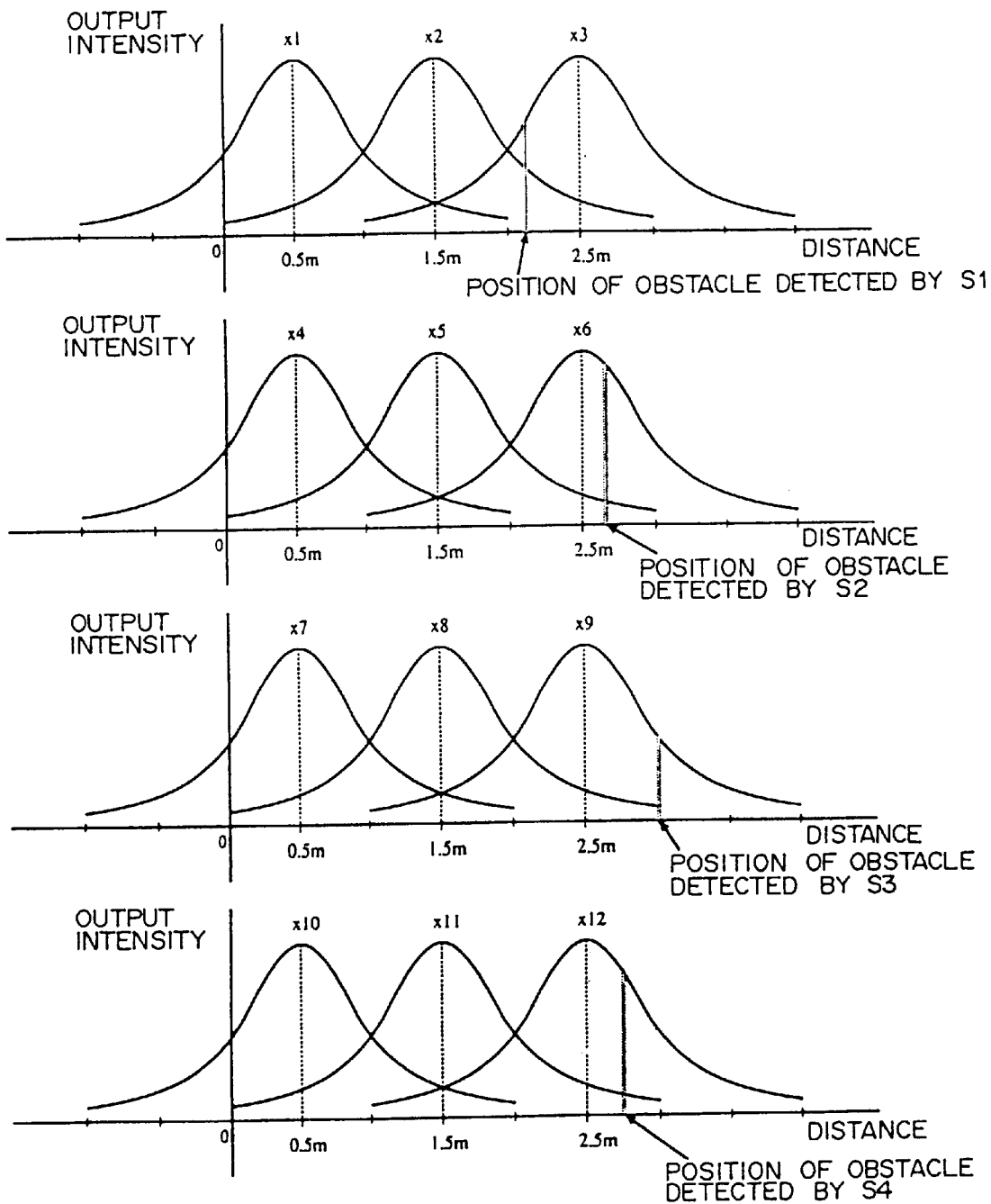
FIG. 15 is a schematic diagram showing an output intensity of each of the neurons in the neural network shown in FIG. 14.

FIG. 15 shows the output intensity of each of the neurons in the neural network shown in FIG. 14. The output intensity of each of the neurons is a gaussian function whose center is a weight. This figure shows the distance to each of the obstacles, which is detected by each of the sensors S1 through S4.

Figure 16:
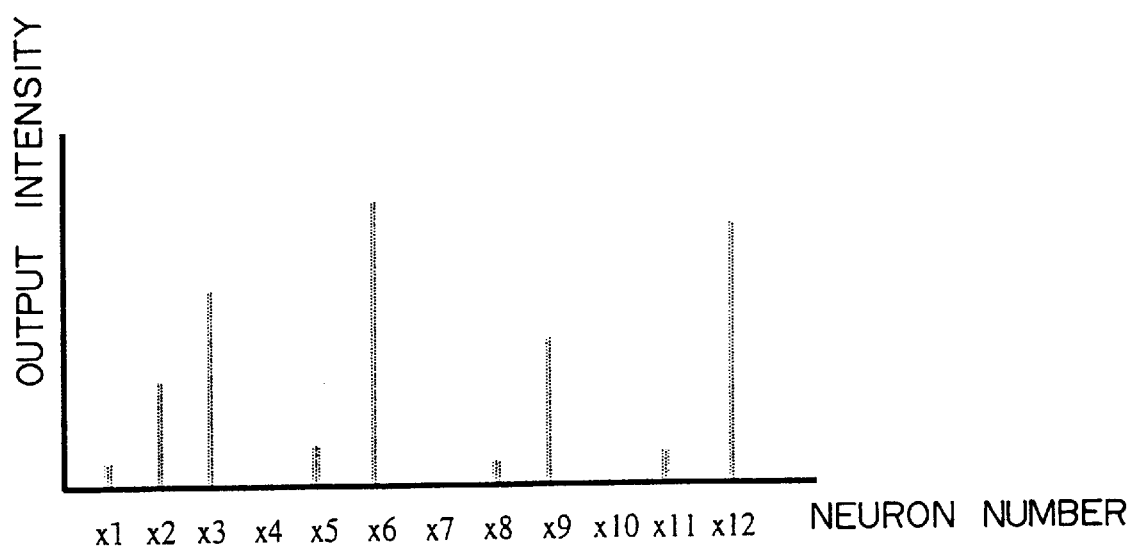
FIG. 16 is a graph showing output patterns of the neural network shown in FIG. 14.

FIG. 16 shows an output pattern of the neural network shown in FIG. 14. Each of neurons x1 through x12 provides an output depending on the position of each of the obstacles detected by each of the sensors shown in FIG. 15. If the number of neurons for each sensor is made larger and the variance of a receptive field is made smaller as described above, a neuron whose output is large is proved to be only an extremely small region of the entire neural network. Such an active region moves depending on the distance between a sensor and an obstacle. The values of most of the elements of the signal, which are transformed into multi-dimensional signals, will be close to "0", and there are an extremely small number of neurons which directly handle information.

FIG. 17 is a table showing each of the distances between each of the sensors and the corresponding obstacle, and the output intensity of each of the neurons.

Provided next is the explanation about a learning algorithm of the sense information processing unit 14.

Figure 18:
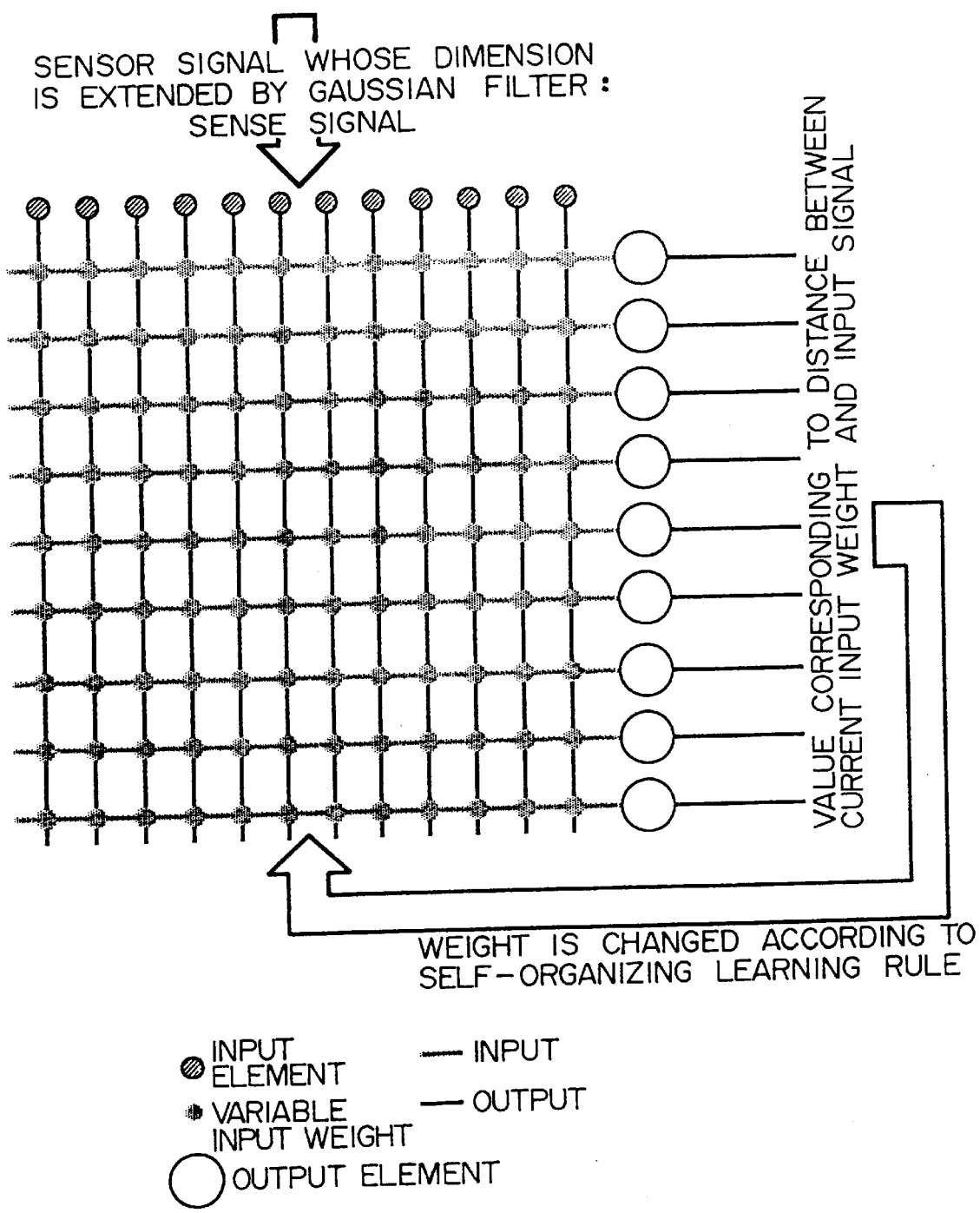
FIG. 18 is a schematic diagram showing an implementation of the sense information processing unit using the neural network in the learning mode.

FIG. 18 is a schematic diagram showing an implementation of a neural network as the sense information processing unit 14. The neural network is composed of twelve input layer neurons, that is, input elements, and nine output layer neurons, that is, output elements. The weight for a signal, which is provided to an output element by an input element, is variable. The weight is updated according to a organizing learning rule.

A sense signal provided to an input element, that is, a sensor signal whose dimension is extended by a Gaussian filter, is provided, for example, by the neural network shown in FIG. 14, and the number of input elements is therefore 12. In the meantime, the number of output elements corresponds to the number of prototypes in a sense signal space. Here, it is 9.

In the neural network shown in FIG. 18, the learning process for updating a weight is executed using the value depending on the distance between a sense signal vector and an input weight vector of each output element, according to the organizing learning rule, when the sense signal vector is input. With this learning process, a curved surface indicating a sense signal space "X" is quantized by the organizing algorithm.

This quantization is performed, for example, with a feature map algorithm, and is intended to place lattices as the above described prototypes on a curved surface "M" in the sense signal space so that they are evenly spaced, for example, with the feature map algorithm. If the curved surface "M" in the signal space is not totally umbilical (that is, not part of a plane surface or a spherical surface), it is difficult to generate a map without distortion. In this case, a map without distortion can be generated using a neural-gas algorithm or a growing cell structure. According to this embodiment, the neural gas algorithm which is easy to be applied is used to generate the prototype of a sense signal.

Assume that a mobile object, that is, a robot follows a random path in a move space. The random path is represented by the following equation.

$$h^{(t)} = u^{(t-1)}\cos(\omega k + \phi^{(t-1)}) + \Delta u^{(t-1)}\cos(\omega k + \Delta \phi^{(t-1)}) \qquad (36)$$

where $\Delta u^{(t-1)}$ is a predetermined extremely small amount, and $\Delta\phi^{(t-1)}$ is selected at random in a range from 0 to $2\pi$. $\omega k$ is a constant used for encoding.

Assume that a signal obtained from the sensor of the mobile object is is $\downarrow s(h^{(t)})$ (a vector is represented by attaching a downward arrow "$\downarrow$" in this specification). The dimension of the sensor signal is extended and the sensor signal becomes a signal $\downarrow(h^{(t)})$ on the curved surface "M" in the multi-dimensional sense signal space "X", as described above. This signal is hereinafter represented as $\downarrow x^{(t)}$ for ease of reference.

The input signal to the input elements in the neural network shown in FIG. 18 is a point $\downarrow x^{(t)}$ on the totally umbilical curved surface "M" in the sense signal space. The output from an output element is the value corresponding to the distance between a lattice point to be evenly spaced and placed in the sense signal space, that is, each candidate of the prototype (converged into the prototype by learning), and $\downarrow x^{(t)}$ as an input signal.

An output $y_i^{(t)}$ (i=1, 2, . . . , M) of each of the output elements corresponding to the input signal $\downarrow x^{(t)}$ is recognized to be provided by the following equation.

$$y_i^{(t)} = \xi\exp\left(-\frac{\|\vec{x}^{(t)} - \vec{\omega}_i^{(t)}\|}{\sigma_i}\right) \quad (37)$$

A total order $k_i$ when an input weight of each of the output elements is updated is determined according to the descending order of an output of each of the elements, that is, the order of the following inequality.

$$\xi_{i1}\exp\left(-\frac{\|\vec{x}^{(t)} - \vec{\omega}_{i1}^{(t)}\|}{\sigma_{i1}}\right) > \ldots > \xi_{iM}\exp\left(-\frac{\|\vec{x}^{(t)} - \vec{\omega}_{iM}^{(t)}\|}{\sigma_{iM}}\right),$$

The total order will be described later.

Assume that the upper limit of the number of learning times is $t_{max}$, schedule functions for the learning $\eta(t)$ and $K(t)$ are monotonously decreasing functions, and constants regarding the schedule have the following relationships.

$$\eta_1 > \eta_2 > 0, \lambda_1 > \lambda_2 > 0$$

Also assume that the size of a receptive field of each of the output elements $\sigma_i$ is positive and also a standardization constant $\xi$ is positive.

The process for generating a prototype with the neural network shown in FIG. 18 is performed according to the following steps (1) through (6).

(1) Initializing the neural network. Each of the (output) elements is distinguished by an identifier i=1, 2, 3, . . . , M. Initializing an input weight vector $\downarrow w_i^{(0)}$, (i=1, 2, . . . , M) by selecting a value which is random and very small.
(2) Starting learning by assigning "1" to "t".
(3) Reading the sense signal $\downarrow x^{(t)}$.
(4) Calculating an output of the element according to the sense signal $\downarrow x^{(t)}$ and each of the input weights, and calculating the total order $k_i$ of the elements based on the calculated outputs.
(5) Modifying the input weights based on the total order using the following modification amount.

$$\Delta\vec{\omega}_i^{(t)} = \eta^{(t)}\exp\left(-\frac{k_i - 1}{\lambda^{(t)}}\right)(\vec{x}^{(t)} - \vec{\omega}^{(t)})$$

-continued $$\eta(t) = \eta_1\left(\frac{\eta_2}{\eta_1}\right)^{\frac{t}{t_{max}}}$$

$$\lambda(t) = \lambda_1\left(\frac{\lambda_2}{\lambda_1}\right)^{\frac{t}{t_{max}}}$$

(6) Assigning "t+1" to "t", and terminating the learning if "t">$t_{max}$. Otherwise, going back to step (3).

If the input vector $\downarrow x^{(t)}$ can be generated according to a uniform distribution on a curved surface in a sense signal space, the prototypes $\{\downarrow w_1, \ldots \downarrow w_M\}$, which evenly cover the entire curved surface, can be obtained by using the algorithm for generating prototypes. If the sense signal curved surface is totally umbilical, these prototypes will totally quantize this curved surface, and correspond to representative points distributed in a move space of a robot one to one.

Figure 19:
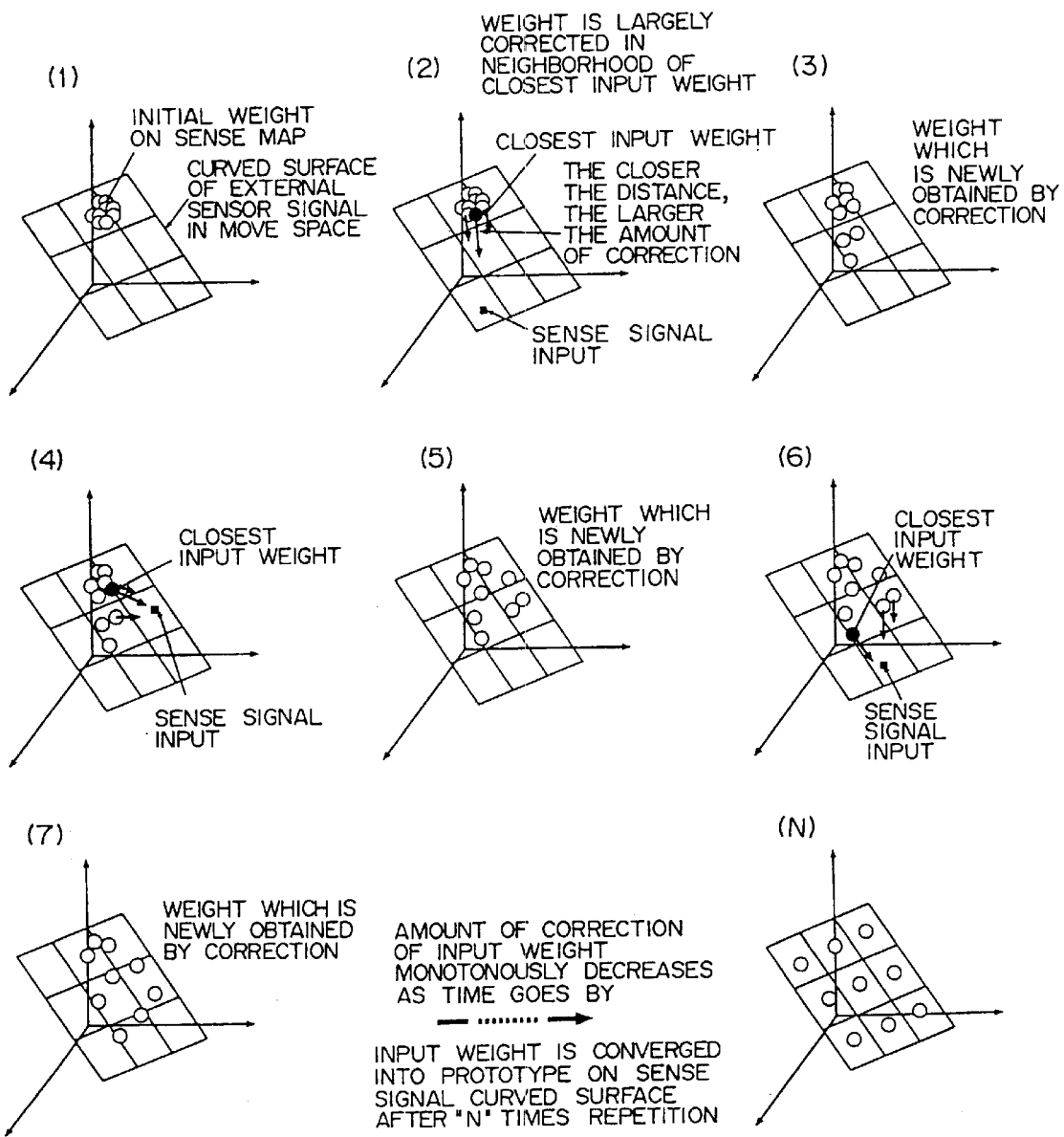
FIG. 19 shows a process for generating a prototype of a sense signal.

FIG. 19 is a schematic diagram showing the process for generating prototypes which entirely cover a curved surface in a sense signal space. In this figure, the three coordinate axes represent that the entire sense signal space is a multi-dimensional space whose dimensions are three or more. The large rectangle shown in this figure is the curved surface of a sense signal resulting from the extension of the dimension of a sensor signal. White circles represent the weights of output elements in a neural network. Provided below is the explanation about a process in which the white circles representing the input weights for the nine output elements shown in FIG. 18 become nine prototypes which entirely cover the entire sense signal curved surface. The nine small rectangles are the neighborhood of prototypes which are finally obtained.

First of all, the input weights are initialized according to random values. FIG. 19(1) shows the positions of the initial weights on the curved surface.

As described above, the robot moves in the entire move space while following a random path, and outputs a sensor signal. After its dimension is extended, the sensor signal is input to the neural network as a sense signal.

In FIG. 19(2), the input sense signal is represented by a black square. The distance between each of the weights and the input sense signal is calculated. Note that, however, the distance defined in the sense signal space is used for this calculation. The total order of the correction of each of the weights is determined based on the calculated distance, and the weights are modified based on that order.

At this time, the correction is made so that the weight with the highest order becomes closest to the input sense signal. The closer distance to a weight, the larger the amount of correction of the weight. The remaining weights are also modified in the direction of the input sense signal according to the order. The amount of correction is set so that it decreases in an exponential-function-like manner as the order descends. FIG. 19(3) shows the distribution of the weights which are newly obtained by such a correction.

In FIG. 19(4), a new sense signal is input. The total order of the weight correction is again calculated corresponding to the new signal input, and the weights are modified according to the order. As a result, the weight distribution shown in FIG. 19(5) can be obtained. Similarly, a new sense signal is input and the weight is modified in FIG. 19(6). Such a correction is processed so that its amount monotonously decreases as time goes by. Finally, the weights are converged into prototypes which entirely cover the sense signal curved surface as shown in FIG. 19(N).

FIG. 20 is a schematic diagram showing the effect of the use of the total order when weights are modified. Even if a singular point exists in a space, lattice points, that is, prototypes, can be properly placed to cover the entire signal curved surface by modifying the weights according to the total order.

If a normal Euclidean distance or a distance using an inner product is used, a severe condition is assigned to a space to be targeted. For example, it is required that no singular point exists, the entire space is composed of connected regions, or the curvature of the space is constant, etc. Accordingly, the organizing algorithm for genrating a prototype distance in a space including non-connected regions or a singular point.

FIG. 20A shows a signal curved surface to be targeted, which is distorted and C-shaped. A point "p" on the signal curved surface is assumed to be in the same distance from two points "a" and "b" when the Euclidean distance is used. However, the region which is not located on the signal curved surface exists between the points "p" and "b".

Accordingly, the neighborhood of the point "a" and that of the point "b" cannot be handled for the point "p" in a similar manner when the feature map algorithm is applied. This is because the neighborhood of an arbitrary point on a signal surface to be covered must be connective based on the Euclidean distance, according to the feature map algorithm. The distance from the point "b" to the point "p" is measured along the hole on the signal curved surface as shown in this figure.

FIG. 20B is a schematic diagram showing the result of the covering of the signal curved surface using prototypes when the feature map algorithm is used. Black small circles shown in this figure represent prototypes. The adjacent relationships between prototypes are represented as lattices linking the prototypes. It is evident from this figure that the entire signal curved surface cannot be evenly covered with the prototypes. Such a result can be verified by conducting an experiment.

FIG. 20C shows the result of covering using the neural gas algorithm. With this algorithm, a weight is modified according to the total order. Since the distance used for this correction is defined by the adjacent relationship between points, it is uniquely determined even if the region between the points is in any state. Accordingly, prototypes will cover the entire signal curved surface regardless of the shape of the signal curved surface.

According to the neural gas algorithm as described above, it is proved also by an experiment that the generation of prototypes does not depend on continuity and connectivity of a signal curved surface. Since the generation of prototypes and the embedding of the adjacent relationship are separately performed with this algorithm, a map will never be distorted. The desirable features in the prototyping according to this embodiment are to cover the entire signal curved surface, and to maintain the adjacent relationship. The easiest way to secure such features in a space including a non-connected region or a singular point is the correction of an input weight according to the total order.

Figure 21:
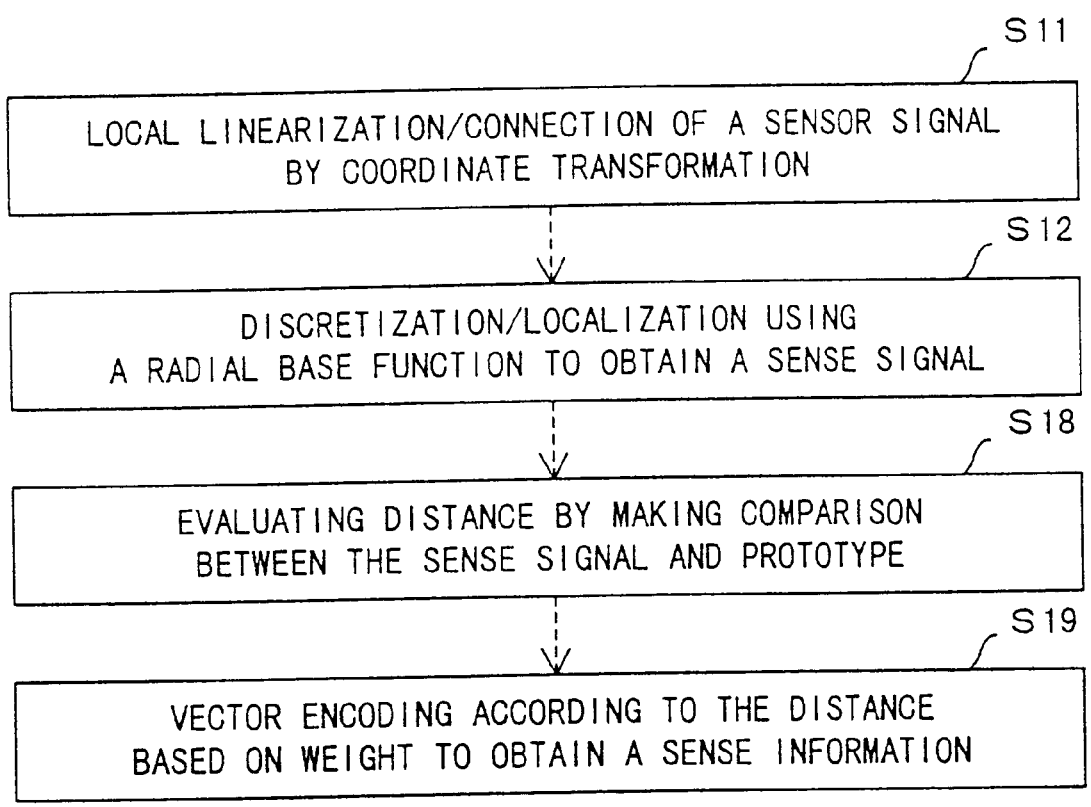
FIG. 21 is a flowchart showing the process of the sense information processing unit in an execution mode.
Figure 22:
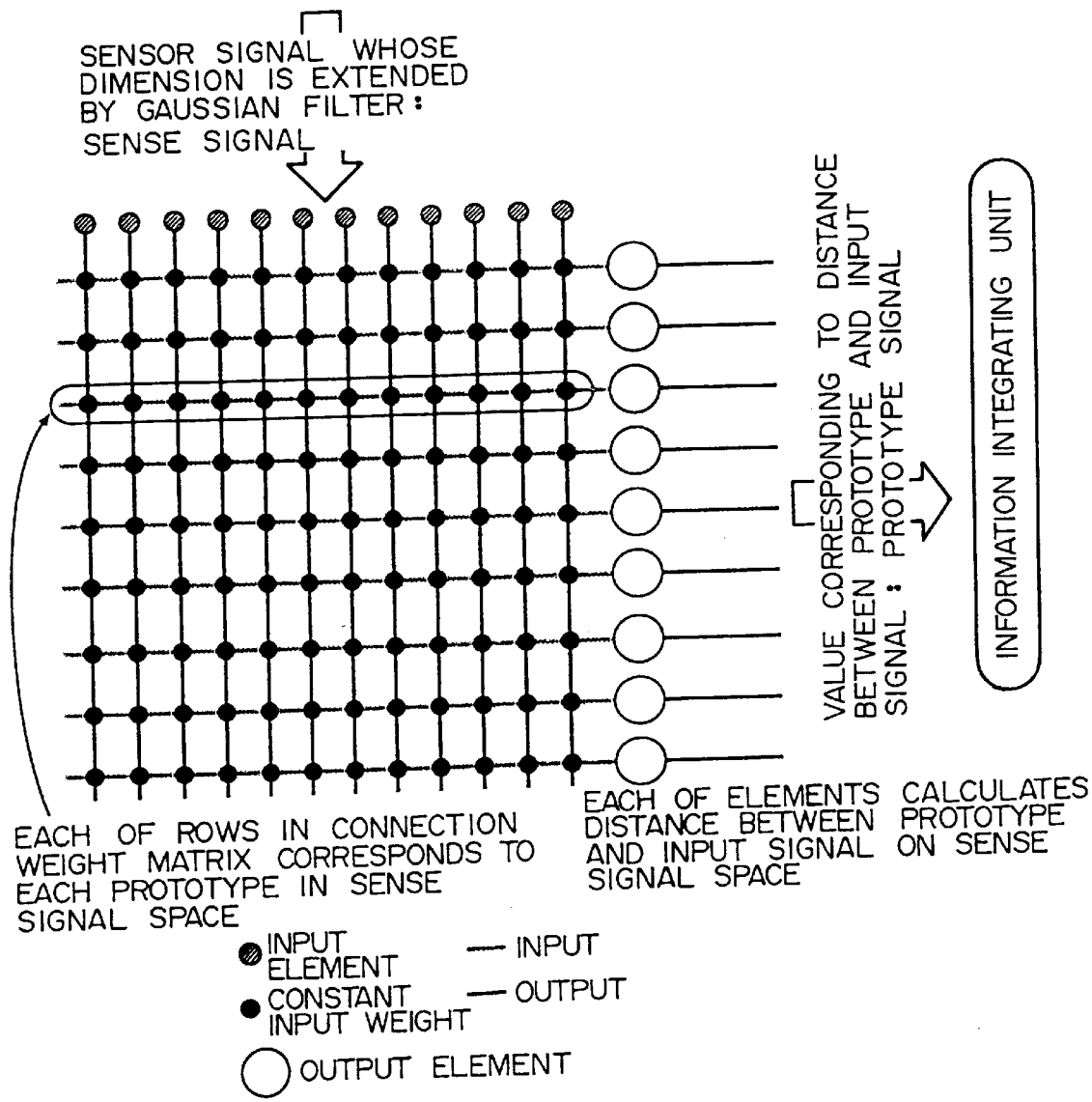
FIG. 22 is a schematic diagram showing an implementation of the sense information processing unit using the neural network in the execution mode.

FIG. 21 is a flowchart showing the process performed in the execution mode of the sense information processing unit 14. FIG. 22 is a schematic diagram showing an implementation of the sense information processing unit 14 using a neural network. After the learning is completed, the sense information processing unit 14 outputs the sense information which uniquely corresponds to an unknown arbitrary point based on the sense signal at the unknown arbitrary point in a move space. Namely, in the execution mode, for example, a robot does not move by itself. It is carried by an automobile, etc, and unloaded at the unknown arbitrary point in the move space. In such a case, the sense information output from the sense information processing unit 14 is provided to the information integrating unit 16. The information integrating unit 16 then outputs the position of the unknown point in the move space, which corresponds to the sense information, as the return information.

In FIG. 21, the operations of steps S11 and S12 are similar to those of steps S11 and S12 in FIG. 11. A sensor signal corresponding to an arbitrary point is transformed into a sense signal corresponding to a point on a signal curved surface in a sense signal space.

The sense signal, that is, the sensor signal whose dimension is extended by a Gaussian filter, is provided to the input elements in the neural network as shown in FIG. 22. The sense signal is then compared with the prototypes, and the distance between each of the prototypes, nine prototypes in FIG. 22, is evaluated in step S18 of FIG. 21. In step S19, vector encoding based on the weights is performed as the encoding depending on the distance, and the sense information, that is, the value corresponding to the distance between each of the prototypes and the input signal, is output to the information integrating unit 16.

In FIG. 22, the input weights for on the output elements corresponding to the nine prototypes, that is, each row of the connection weight matrix, corresponds to a prototype in the sense signal space, and each of the output elements calculates the value corresponding to the distance between each of the prototypes in the sense signal space and the input signal.

Figure 23:
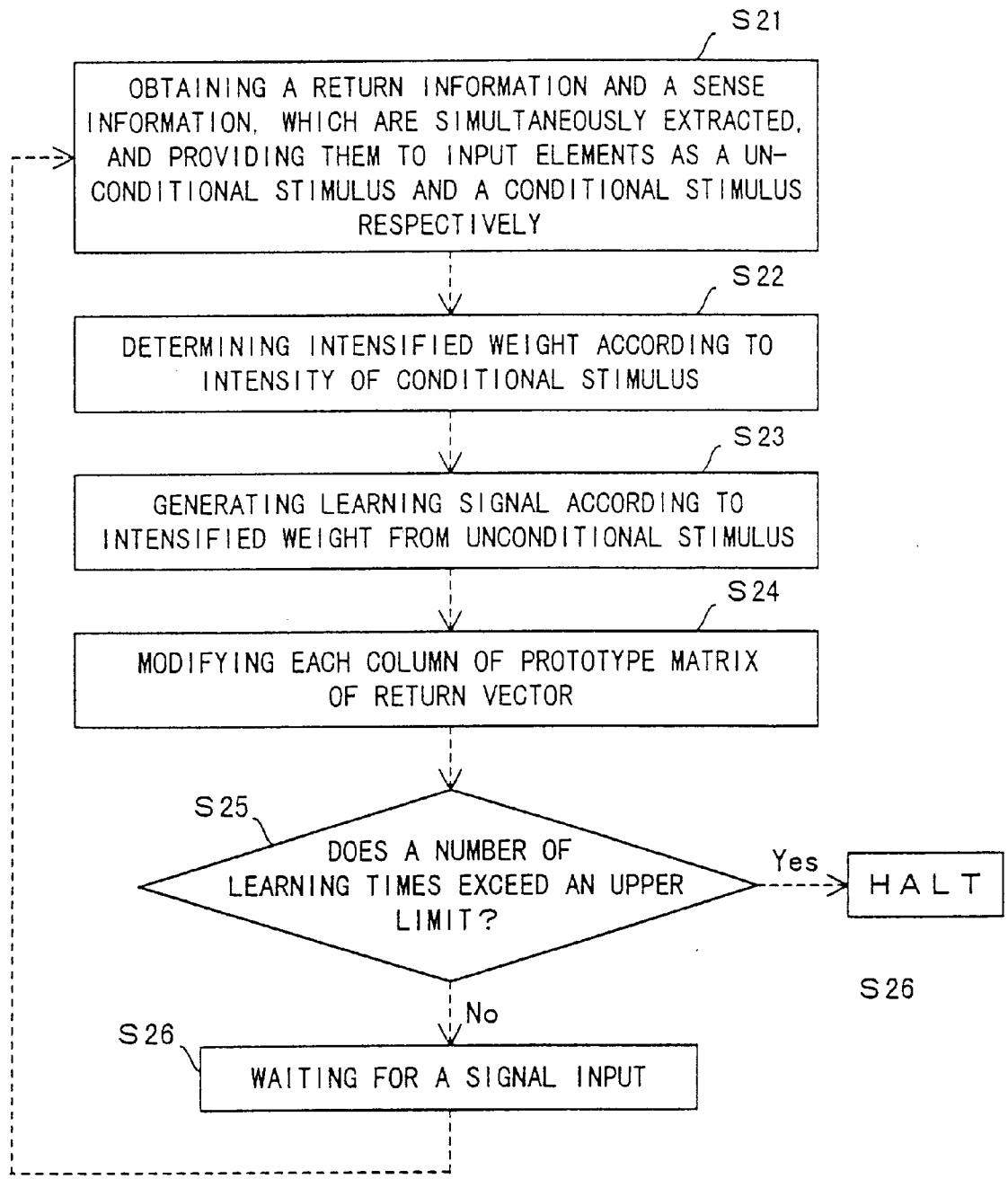
FIG. 23 is a flowchart showing a process of an information integrating unit in the learning mode.
Figure 24:
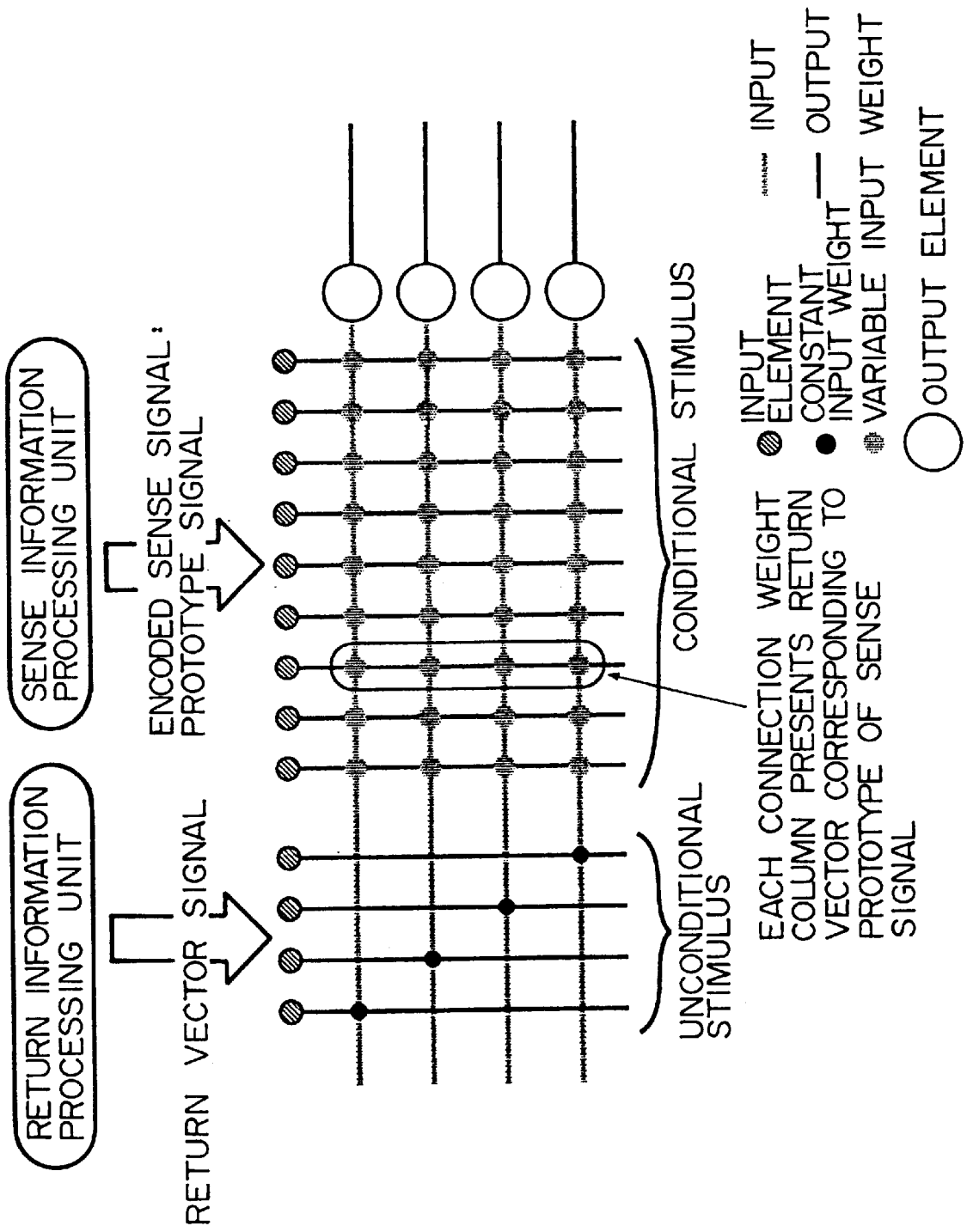
FIG. 24 is a schematic diagram showing an implementation of the information integrating unit using the neural network in the learning mode.

Provided next is the explanation about the operations of the information integrating unit 16. FIG. 23 is a schematic diagram explaining the process performed by the information integrating unit 16 in the learning mode. FIG. 24 is a schematic diagram explaining the implementation of the information integrating unit 16 using a neural network in the learning mode. The information integrating unit 16 integrates the sense information and the return information based on a correlation in terms of time. A set of prototypes in the sense information processing unit 14 corresponds to a set of representative points in a move space according to the sensor signal With the sense signal alone, however, the relationship between the distance information between prototypes and the relationship between a robot and a representative point in a move space cannot be determined. This is because the amount of a change of the sense signal cannot be calculated until the information about a move distance and a direction are generated.

A slight change of the sense signal is made correspondent to that of a motion of a robot, so that the continuity of the move space is realized. With this process, the location information in the space can be represented as return information. The robot can autonomously obtain the coordinate system of the move space when the return information and the sense information are integrated. As a result, a designer can be excluded from the process. When the coordinate system of the move space is generated, a conditional principle that there is a close relationship between signals of different sensors that the information integrating unit 16 receives at the same time, is used. This principle is called a "simultaneous principle" here. The two types of information are integrated according to this principle. As the method for generating the coordinate system of a move space, an interpolation calculation using a prototype is employed.

In FIG. 23, the information integrating unit 16 receives the return information and the sense information respectively from the return information processing unit 12 and the sense information processing unit 14 as inputs in step S21. These types of information are extracted at the same time. A return vector signal (return information) from the return information processing unit 12 is provided to the four input elements as an unconditional stimulus in FIG. 24. The input weights between the input elements and the output elements are constant. A prototype signal (corresponding to the distance between a prototype and a sense signal) as an encoded sense signal from the sense information processing unit 14 is provided to the nine input elements as a conditional stimulus. The number of input elements respectively corresponds to the numbers of output elements of the return information processing unit 12 and the sense information processing unit 14. The input weights between the nine input elements to which a signal from the sense information processing unit 14 is input and the output elements, are variable, and updated by learning. Each of the output elements has a linear output characteristic.

The terms "unconditional stimulus" and "conditional stimulus" were used when Grossberg implemented a behavior of a living creature which makes a predetermined response to a particular stimulus by learning, with a model using a neural network, in the 1960s. They are generally used for psychology or physiology.

For a conditional learning model used in this embodiment, the unconditional stimulus is a signal constantly input to a neural network. The learning of the neural network is not performed with the unconditional stimulus only. The neural network is not activated and its learning is not performed until the conditional stimulus is input. The activation state is determined depending on the size of the conditional stimulus, and the unconditional stimulus is learned as a weight of the neural network depending on the determined state at that time.

An intensified weight is determined depending on the intensity of the conditional stimulus in step S22 of FIG. 23. According to this embodiment, connection weights corresponding to the input element to which the signal having the maximum value among prototype signals (that is, the conditional stimulus) is input, that is, a connection weight column, is determined as intensified weights, as will be described later. In step S23, the learning signal corresponding to the intensified weight is generated according to the unconditional stimulus, that is, the return vector signal, and used as a learning signal for Grossberg-type learning. The Grossberg-type learning will be described later.

In step S24, the connection weight corresponding to the input elements to which the signal from the sense information processing unit 14 is input is modified in columns as the correction of each column of a matrix corresponding to prototypes of return vectors, which will be described later. The connection weight is updated so that the connection weight column represents the prototype of the return vector corresponding to the prototype of the sense signal. The information about the return vector corresponding to the sense signal prototype is then embedded into the network as a weight.

In step S25, for example, the learning schedule is evaluated as the result of the learning. If the number of learning times exceeds the upper limit, the learning is halted. If the number of learning times does not exceed the upper limit, the next signal input is waited in step S26. Then, the process in and after step S21 is repeated.

Figure 25:
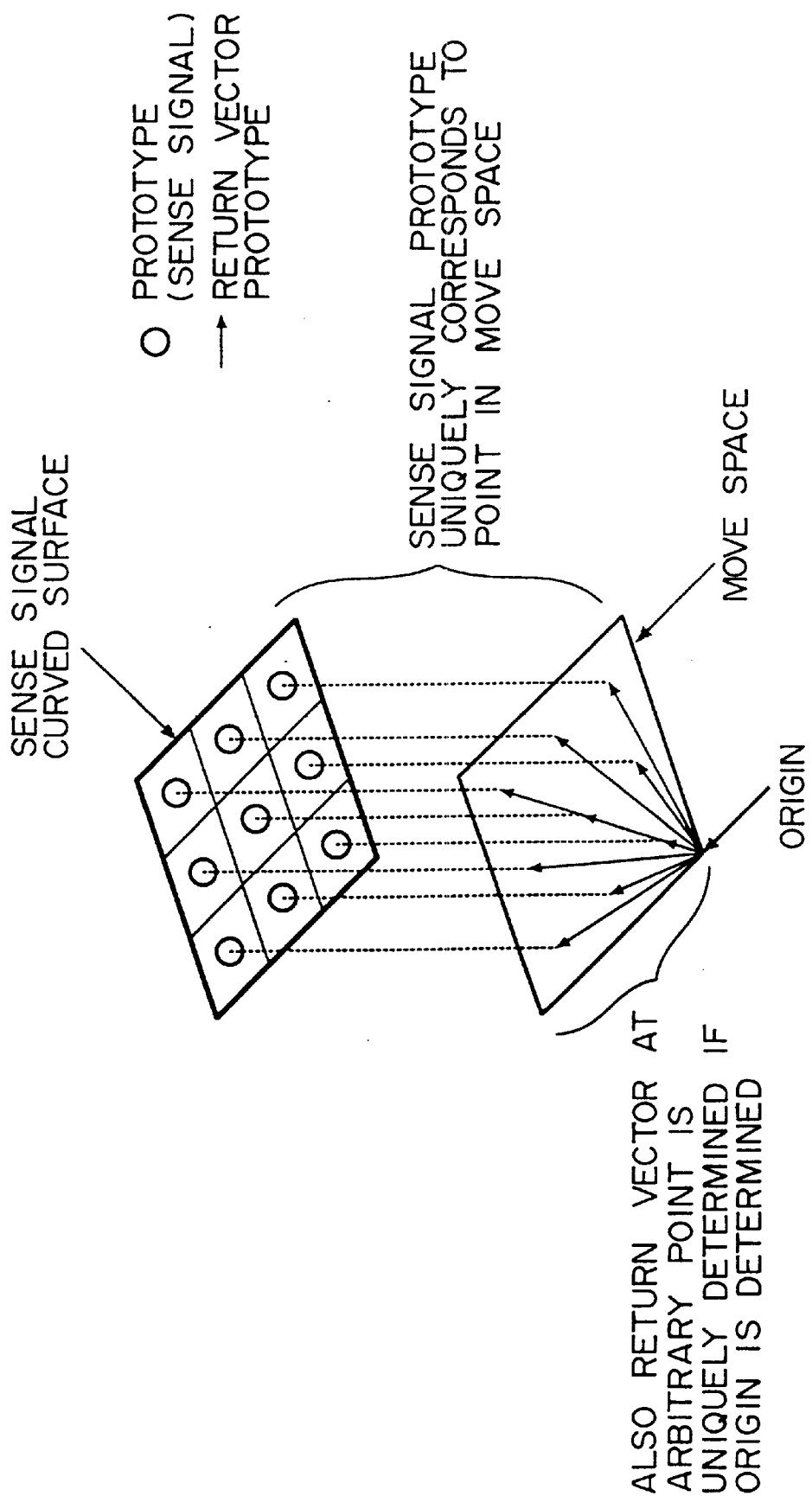
FIG. 25 is a schematic diagram explaining a correspondence between a sense signal prototype and a return vector.

FIG. 25 is a schematic diagram explaining relation of a sense signal prototype to a return vector. prototype, which are embedded into a neural network by learning of the information integrating unit.

As explained by referring to FIG. 19, the weight corresponding to a sense signal curved surface prototype is embedded into the neural network of the sense information processing unit 14 when the learning is terminated. The sense information processing unit 14 outputs the value corresponding to the distance between the prototype and an input signal. The sense signal prototype uniquely corresponds to a point in a move space of a robot. If the origin of the return vector of the corresponding point is determined, its coordinates are uniquely determined.

It is unknown which return vector a prototype that a robot autonomously obtains corresponds to until the learning of the information integrating unit 16 is performed. However, if the robot performs the Grossberg-type learning by respectively using a sense signal prototype and a return vector as conditional and unconditional stimuli while following a path in a move space, the correspondences shown in FIG. 25 are autonomously embedded into the neural network.

Provided below is the further explanation about the conditional learning algorithm of the information integrating unit 16. The neural network in the information integrating unit 16 comprises output elements whose number is equal to the dimensions of an encoded return vector. The encoded sense signal $\downarrow y^{(t)}$ as a conditional stimulus, and the return vector $\downarrow h^{(h)}$ as an unconditional stimulus, which are input to the neural network, are provided by the following equations.

$$\vec{y}^{(t)} = (y_1^{(t)}, \ldots, y_M^{(t)}) = \tag{38}$$
$$\left(\xi_1 \exp\left(-\frac{\|\vec{x}^{(t)} - \vec{\omega}_1\|}{\sigma_1}\right), \ldots, \xi_M \exp\left(-\frac{\|\vec{x}^{(t)} - \vec{\omega}_M\|}{\sigma_M}\right)\right),$$

$$\vec{h}^{(t)} = (h_1, \ldots, h_M). \tag{39}$$

The scheduling function of the learning is a monotonously increasing function, and is provided by the following equation.

$$\mu(t) = \mu_1 \left(\frac{\mu_2}{\mu_1}\right)^{\frac{t}{t_{\max}}} \tag{40}$$

A threshold "D" corresponding to this scheduling function is positive, and the upper limit of the number of learning times is "$t_{max}$". A learning constant "a" has the following range. $\mu(t)$ is intended to control the start of the learning. The learning is started when its value exceeds "D".

$$0 < \alpha < 1$$

An output of the neural network will be the prototype $\{\downarrow V_1, \ldots, \downarrow V_M\}$ of the return vector which uniquely corresponds to the prototype of the sense signal. The conditional learning of the information integrating unit 16 is performed according to the following steps (1) through (7).
(1) Initializing the neural network. Each (output) element is distinguished by an identifier i=1, 2, ..., N. Initializing a variable input weight vector $\downarrow u_i^{(o)}$ (i=1, 2, ..., N) by selecting a value which is random and very small.
(2) Starting the learning by assigning "1" to "t".
(3) Executing (4) if $\mu(t)$>D. Otherwise, skipping to (7).
(4) Reading the conditional stimulus $\downarrow y^{(t)}$, and the unconditional stimulus $\downarrow h^{(t)}$.
(5) Finding an index $j_{mp}$ of the maximum element $y_{jmax(t)}$ of the conditional stimulus.
(6) Updating the $j_{max}$ component of the input weight of each element "i" (i=1, 2, ..., N) by applying the following learning rules according to Grossberg. The component $u_{it}$ (1≠$j_{max}$), however, is not updated.

$$\Delta u_{ij_{max}}^{(t)} = a\left(h_i^{(t)} - u_{ij_{max}}^{(t)}\right)$$

$$u_{ij_{max}}^{(t)} = u_{ij_{max}}^{(t-1)} + \Delta u_{ij_{max}}$$

(7) Assigning "t+1" to "t", and terminating the learning if t>$t_{max}$. Otherwise, going back to (3).

Provided next is the explanation about the operations of the information integrating unit 16 in the execution mode. In the execution mode, the information integrating unit 16 which terminates the learning outputs the return vector at an arbitrary point, according to the correspondence between a point on a curved surface in the sense signal space, which corresponds to the sense information, and the point in a move space of a robot, based on the sense information output from the sense information processing unit 14 in correspondence with the sensor signal. The information integrating unit 16 uses interpolation to output the return information.

With the interpolation, a convex hull based on a prototype is used and approximation using a radial basis function is performed in this embodiment. The following document refers to the approximation using the radial basis function.

Document 7: M. T. Musavi et al. On the Training of Radial Basis Function Classifiers, Neural Networks, Vol.4, pp.593–603 (1992)

In the process using the convex hull, the sense information processing unit 14 sets a Gaussian receptive field in an output element corresponding to each prototype, and performs a calculation of a weight according to the distance between the sense signal ↓x and a prototype. Note that the equation (37) as an output of an output element of the sense information processing unit 14 is a general equation, and the following equation (41) is a specific equation at the time of robot control.

$$a_i = \frac{e^{\frac{-\|\bar{x} - \bar{w}_i\|}{\sigma_i}}}{\sum_{j=1}^{M} e^{\frac{-\|\bar{x} - \bar{w}_j\|}{\sigma_j}}} \quad (41)$$

($\sigma_i$ and $\sigma_j$ are adjusted depending on an experimental environment.)

Since the information integrating unit 16 stores the return vector corresponding to each prototype of the sense signal as a weight of a neural network, it approximates the return information corresponding to an input signal by obtaining the following convex hull according to the weight obtained by the above described equation. That is, "$a_i$" in the equation (41) will be an input to the information integrating unit 16.

$$\bar{h} = \sum_{j=1}^{N} a_j \vec{h}_j \quad (42)$$

$$= \sum_{j \in V(i_0)} a_j \vec{h}_j \quad (43)$$

With these equations, smooth approximation can be realized in a signal space. "$V(i_o)$" in the equation (43) represents the neighborhood of the closest prototype ↓$w_{io}$ of the sense signal. That is, the approximation using the neighborhood information makes the interpolation calculation faster.

Figure 26:
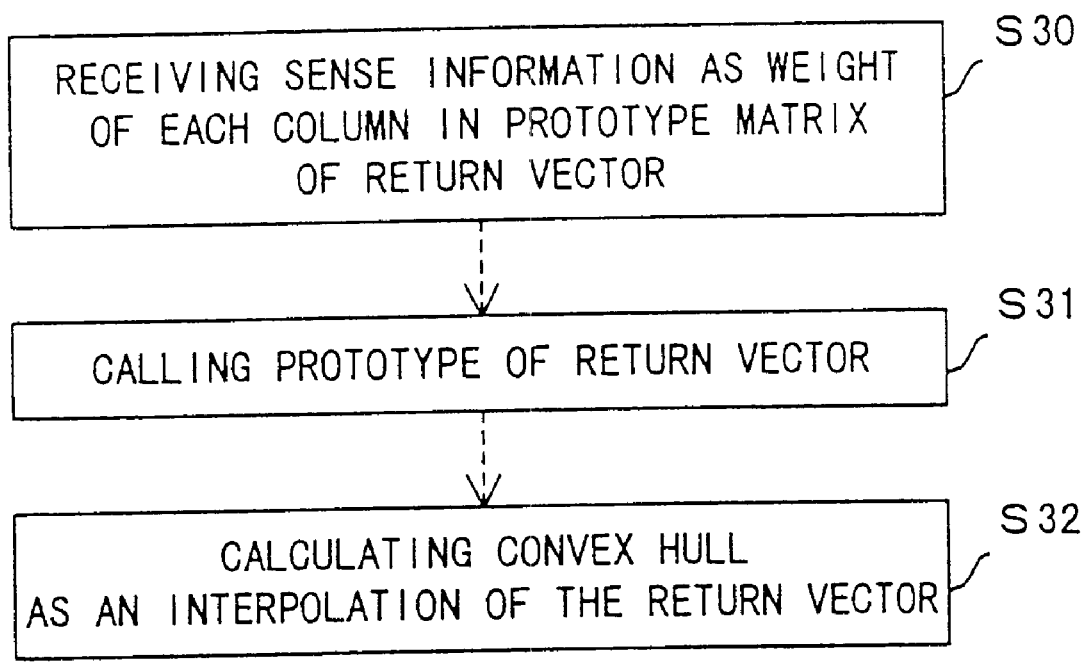
FIG. 26 is a flowchart showing the process of the information integrating unit in the execution mode.

FIG. 26 is a flowchart showing the process performed by the information integrating unit 16 in the execution mode. In this figure, the sense information is received as a weight of each column of a prototype matrix of the return vector in correspondence with the input of the sense information in step S30. In step S31, a prototype of the return vector is inferred as a call of the prototype of the return vector. In step S32, a convex hull is calculated as the interpolation of the return vector, and the return information is output. This process sequence is executed by a neural network once.

Figure 27:
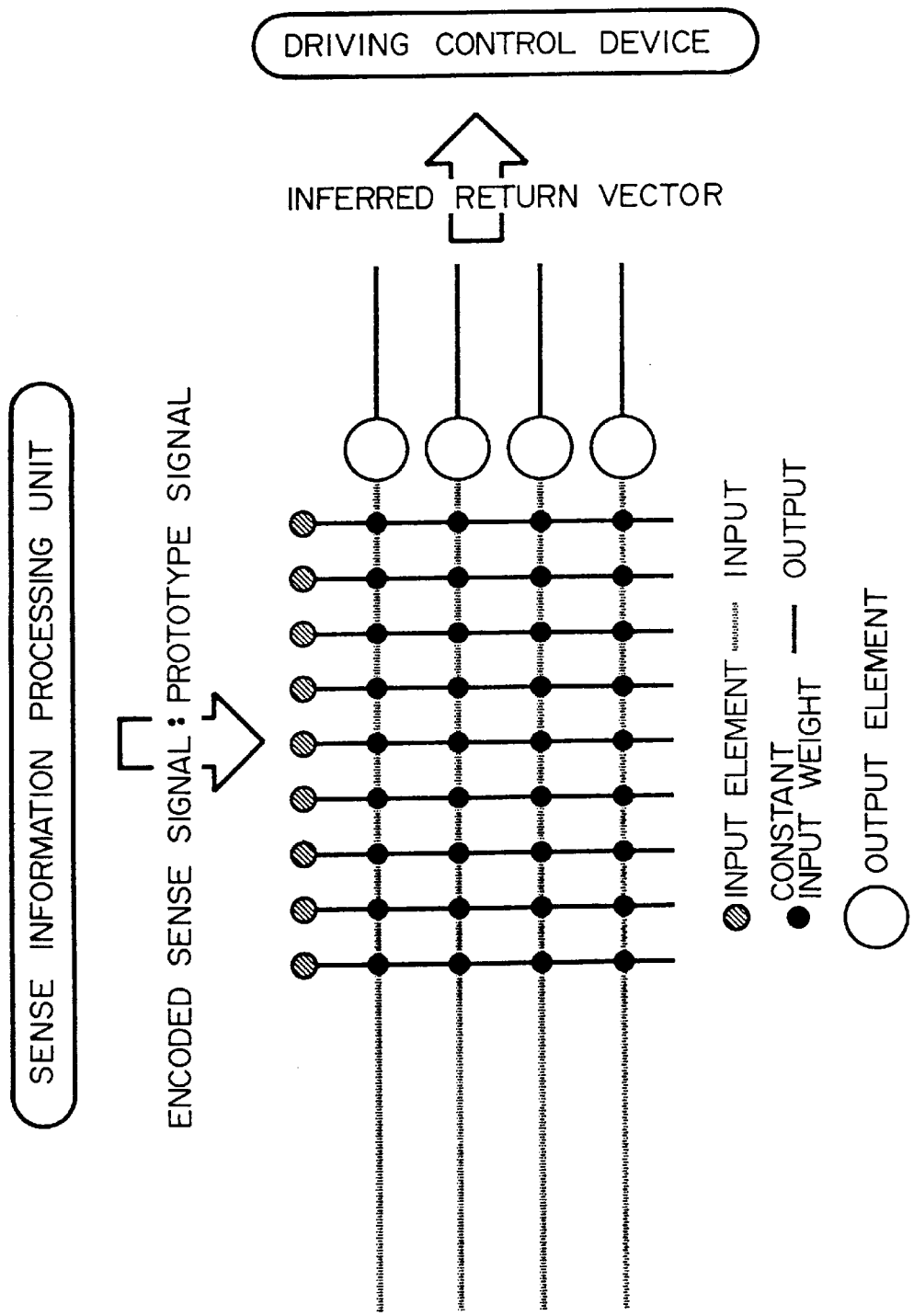
FIG. 27 is a schematic diagram showing an implementation of the information integrating unit using the neural network in the execution mode.

FIG. 27 is a schematic diagram explaining the implementation of the information integrating unit 16 using a neural network in the execution mode. In the execution mode, an encoded sense signal, that is, a prototype signal, is input from the sense information processing unit 14, an output element infers the return vector corresponding to the sense signal using an input weight which is made constant as the result of learning, and its output is provided to the driving control device of a robot.

In short, the information integrating unit 16 uses the return information at a representative point in a move space, which corresponds to the representative point in each partitioned region in a quantized sense signal space, that is, the return vector, as a basis; and generates the return vector corresponding to an arbitrary position by interpolation using the value corresponding to the distance between the sense information at the arbitrary position in a move space, that is, the sense signal obtained based on the observation result of the environment of a mobile object, and the above described representative point in each of the partitioned regions, as the weight corresponding to the basis.

The information integrating unit 16 infers the return vector (homing vector: HV) from an encoded sense signal output from the sense information processing unit 14, that is, a prototype signal (sensory prototype: SP), as described above. The inferred return vector is provided to the driving control device 15 of the robot. As a result, it allows the robot to generate a coordinate system and determine the position. Provided next, therefore, is the explanation about the generation of a return path of a robot when it returns from an arbitrary point to the origin using a return vector.

Figure 28A:
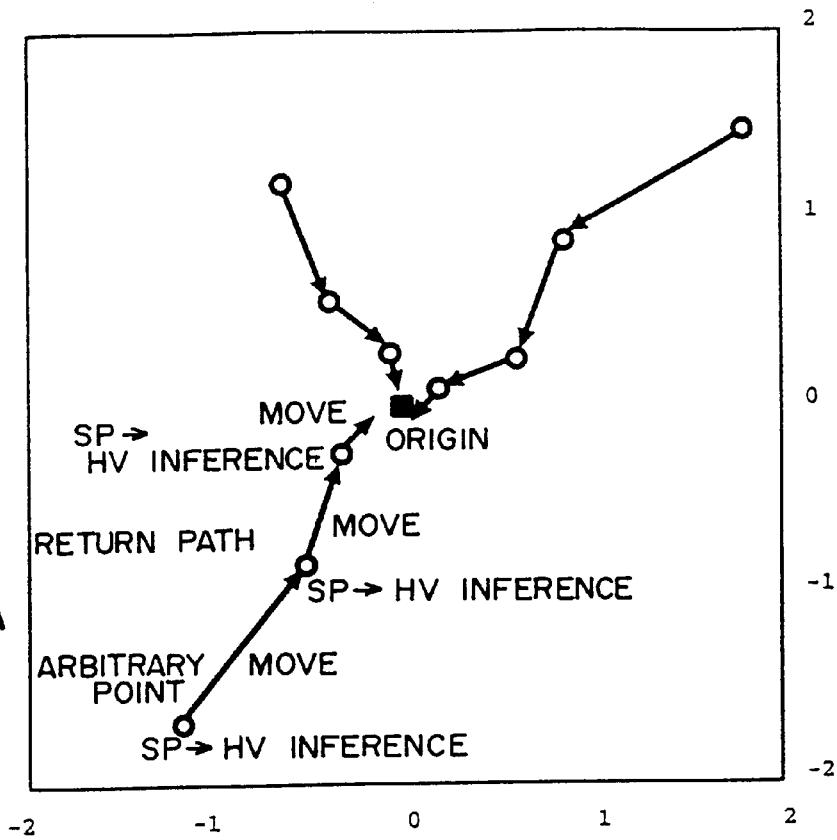
FIGS. 28A and 28B are schematic diagrams showing an example in which a mobile object returns to the origin using an inferred return vector.

FIG. 28A is a schematic diagram explaining the case in which the information integrating unit 16 repeatedly infers the return vector, and a robot draws nearer and nearer to the origin. The robot searches the environment, sequentially generates control information required to return from the arbitrary point to the origin, and draws nearer to the origin. Assuming that the number of times of inference of return vectors in a return behavior is "t", the return behavior is executed according to the following steps (1) through (5).

(1) Inferring the return vector ↓$h^{(t)}$ at the current point using the SP→HV inference in the information integrating unit 16.

(2) Detecting an element $i_{max}$ corresponding to a maximum value element $h_{imax}^{(t)}$ of the inferred return vector.

(3) Halting the behavior if $h_{imax}^{(t)}$ is equal to or smaller than a certain small value. Otherwise, executing (4).

(4) Moving the mobile object by $u^{(t)} = c(t) \|\downarrow h^{(t)}\|$ in the direction $\phi^{(t)} = (2\pi/N) i_{max}$. Here, 0<c(t)<1 is the monotonously decreasing function of "t".

(5) Assigning "t+1" to "t", and going back to (2).

The robot draws nearer to the origin according to the thus generated control information, that is, "$u^{(t)}$" indicating the distance and the azimuth $\phi^{(t)}$, while sequentially inferring the return vector.

Figure 28B:
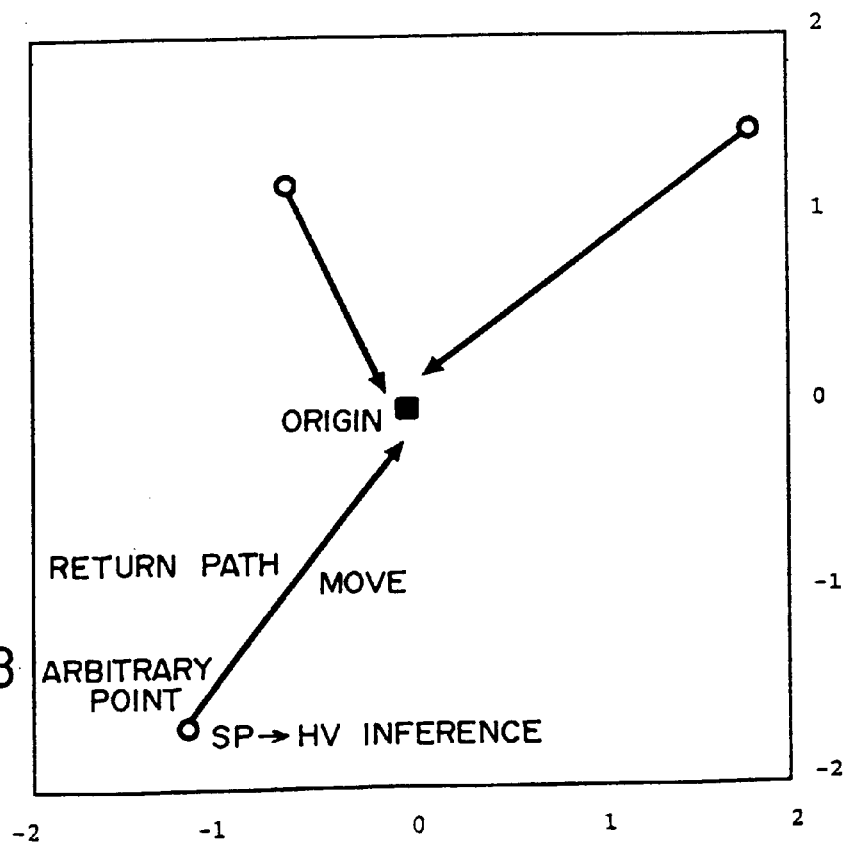

In the meantime, FIG. 28B is a schematic diagram explaining the case in which the control information required to return from an arbitrary point to the origin is obtained once. The return behavior to return to the origin once is performed according to the following steps (1) through (4).

(1) Generating the return vector Ih at the arbitrary point using the SP→HV inference.
(2) Finding the element $i_{max}$ corresponding to the maximum element of $\downarrow$h.
(3) Calculating the direction from the return vector to the origin $$\phi = \tan^{-1}\left(\frac{h_{imax+1}/h_{imax} - \cos\left(\frac{2\pi}{N}\right)}{\sin\left(\frac{2\pi}{N}\right)}\right) - \frac{2\pi}{N}i_{max},$$

and the distance to the origin, $$u = \frac{h_{imax}}{\cos\left(\frac{2\pi}{N}i_{max} + \phi\right)}.$$

(4) The mobile object moves by the distance "u" in the direction $\phi$, and stops.

Provided below is the explanation about the calculation method of the angle $\phi$ as the direction of the origin in step (3). Assume that the index of the element having the maximum value among the elements of the return vector is $i_{max}$. The direction of the origin $\phi$ is obtained using the component $h_{imax}$ and the component $h_{imax+1}$ which is adjacent to the element having the maximum value $h_{imax}$. Normally, $\phi$ can be obtained by using not only the element adjacent to the element having the maximum value element, but also two different components. However, the calculation becomes complicated in this case.

The maximum value element and the element adjacent to the maximum value element are represented as follows.

$$h_{imax} = u\cos\left(\frac{2\pi}{N}i_{max} + \phi\right),$$

$$h_{imax+1} = u\cos\left(\frac{2\pi}{N}(i_{max} + 1) + \phi\right),$$

If $h_{imax+1}$ is developed by using an addition theorem:

$$h_{imax+1} = u\cos\left(\frac{2\pi}{N}i_{max} + \phi + \frac{2\pi}{N}\right)$$

$$= u\left(\cos\left(\frac{2\pi}{N}i_{max} + \phi\right)\cos\left(\frac{2\pi}{N}\right) - \sin\left(\frac{2\pi}{N}i_{max} + \phi\right)\sin\left(\frac{2\pi}{N}\right)\right),$$

If both sides of this equation are divided by the maximum element, the following equation can be obtained.

$$\frac{h_{imax+1}}{h_{imax}} = \cos\left(\frac{2\pi}{N}\right) - \tan\left(\frac{2\pi}{N}i_{max} + \phi\right)\sin\left(\frac{2\pi}{N}\right),$$

If this equation is solved regarding $\phi$, the equation will become:

$$\phi = \tan^{-1}\left(\frac{h_{imax+1}/h_{imax} - \cos(2\pi/N)}{\sin\left(\frac{2\pi}{N}\right)}\right) - \frac{2\pi}{N}i_{max},$$

Note that, however, if $i_{max}$ is equal to "N", "1" is used as "$i_{max}+1$".

Provided next is the explanation about the inference of the sense signal using the return information as a key, which is performed by the information integrating unit 16 shown in FIG. 2. The capability for inferring a sense prototype signal (SP) from a return vector (HV) can be used, when a high level capability based on the coordinate system obtained according to the return vector, is necessary. It is used, for example, when a signal sequence of motion control for avoiding an obstacle beforehand is generated by inferring the information about the obstacle according to the current relative position of the robot.

In the meantime, the capability for inferring an SP from an HV is available for correcting an error accumulation in the calculation of the return vector as a more primitive level. The correction is performed, for example, by inferring, for example, the prototype of the sense signal $\downarrow$s'(t) from the return vector signal $\downarrow$h'(t) obtained by accumulating motion information, and making a comparison between the prototype $\downarrow$s'(t) and the prototype $\downarrow$s(t), which is actually calculated from the sensor signal, and making a replacement of $\downarrow$h'(t) using the return vector $\downarrow$h(t) inferred by using $\downarrow$s(t) as a key, if the error between the prototypes is large. With this method, however, the inferred return vector must have no error.

Figure 29:
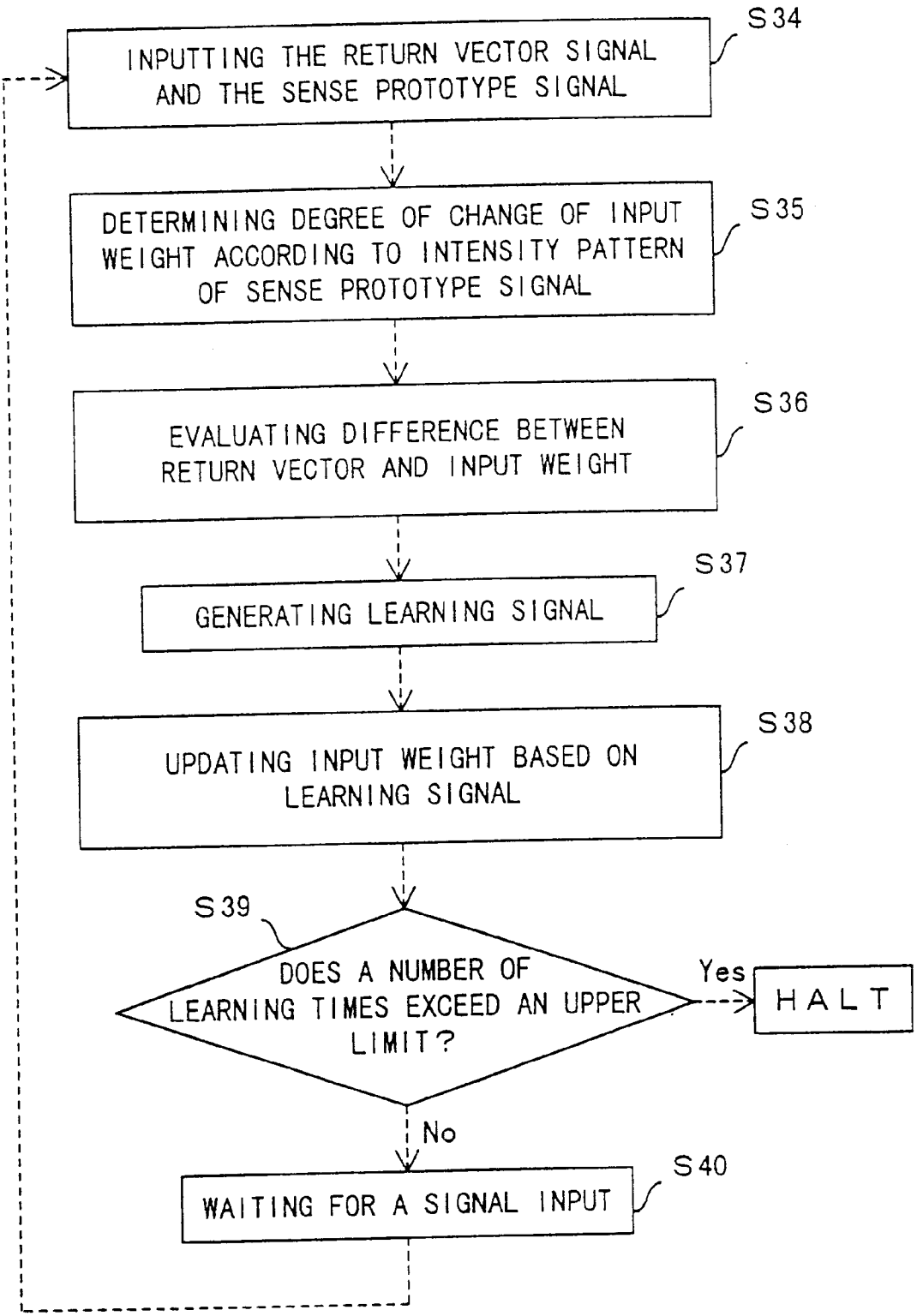
FIG. 29 is a flowchart showing a learning process for inferring a sense prototype signal from a return vector in the information integrating unit.
Figure 30:
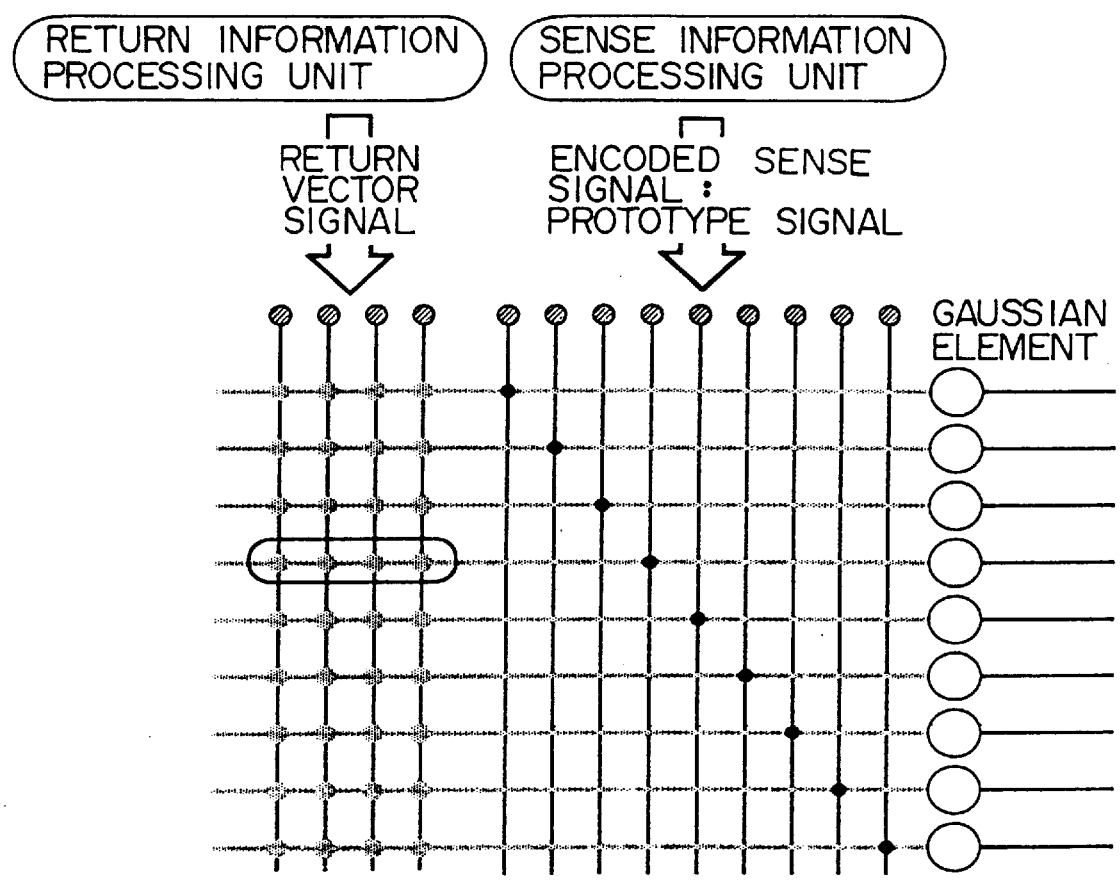
FIG. 30 is a schematic diagram showing an implementation of the information integrating unit using a neural network, which is intended for performing the learning process shown in FIG. 29.

Provided next is the explanation about the operations for inferring a sense prototype signal from the return vector, which is performed by the information integrating unit 16, by referring to FIGS. 29 through 32. FIG. 29 is a flowchart showing the process for implementing the operations inferring an SP from an HV in the learning mode. FIG. 30 is a schematic diagram explaining the implementation of the information integrating unit 16 using a neural network in the learning mode.

In the learning mode shown in FIG. 29, return vector and sense prototype signals are simultaneously input to the neural network shown in FIG. 30, and the learning is performed so that output layer neurons output the same output pattern as that of the sense prototype signal by using the return vector signal as a key. Although this learning seems to be supervised, the entire system is considered to be a self-organizing type system. This is because the system generates a supervisor signal for the portion inferring an SP from an HV in the information integrating unit 16, and a neural network generating the sense prototype signal corresponding to the supervisor signal is configured in an organizing manner.

In FIG. 30, the weight in the potion of the neural network to which the return vector signal is input is variable, while the weight in the portion to which the sense prototype signal is input is constant.

In FIG. 29, the return vector and sense prototype signals are input in step S34. In step S35, the degree of a change of the input weight for the output elements in the neural network is determined depending on the intensity pattern of the sense prototype signal. Basically, a Kohonen-type learning rule is applied to prototyping of the return vector signal space. The neuron which fires strongest is determined by the sense prototype signal, and the input weight is updated so that the amount of a weight update corresponding to that neuron will be a maximum. With this process, the sense prototype signal pattern and the output pattern of the neural network can be matched.

In step S36, the difference between the return vector and the input weight is evaluated. In step S37, the amount of an update of the input weight, that is, the learning signal, is generated. In step S38, the input weight is updated based on the learning signal.

The return vector signal is an N-dimensional signal $h_1, \ldots, h_N^{(t)}$, while the sense prototype signal is an M-dimensional signal $y_1^{(t)}, \ldots, y_M^{(t)}$. The output element is not a linear element as shown in FIG. 24, but a neuron having a Gaussian receptive field. The number of elements is equal to that in the neural network generating the sense signal prototypes. A "j-th" input weight $w_{ij}^{(t)}$ of an "i-th" neuron(i=1,2,3, ..., M, j=1, 2, ..., N) in the output layer at the number of learning times "t" is updated using the following learning rules.

$$\Delta w_{ij}(t) = \mu(t)(h_j(t) - w_{ij}(t))y_i(t) \quad (44)$$

$$w_{ij}(t+1) = w_{ij}(t) + \Delta w_{ij}(t). \quad (45)$$

In step S39, the learning schedule is evaluated, and the learning is stopped after it is performed a suitable number of times. If the learning is not performed the suitable number of times, signal inputs are waited for in step S40. The process in and after step S34 is repeated each time the signals are input.

Shaded circles shown in FIG. 30 represent input layer neurons, to which return vector and sense prototype signals are input. Large hollow circles represent output elements which infer a sense prototype signal. The number of output elements is equal to the dimensions of the sense prototype signal. Small gray circles represent the input weights for the output elements corresponding to the return vector signal. Their values are variable. Small black circles represent the input weights for the sense prototype signal, and their values are constant.

The learning process of the information integrating unit 16 is performed based on the assumption that the upper limit of the number of learning times is $t_{max}$, and the schedule function of the learning is the monotonously decreasing function $\mu(t)$. The following relationship exists between the schedule constants.

$$\mu_1 > \mu_2 > 0$$

The learning process is performed according to the following steps (1) through (6).

(1) Initializing the neural network. Each of the (output) elements is distinguished by an identifier i=1,2, ..., M. Initializing the input weight $\downarrow w_i^{(0)}$ (i=1, 2, ..., M) of each of the elements by selecting a value which is random and very small.
(2) Assigning "1" to "t", and starting the learning.
(3) Reading the return vector signal $\downarrow h^{(t)}$ and the sense prototype signal $\downarrow y^{(t)}$.
(4) Generating a learning signal based on the difference between the return vector $\downarrow h^{(t)}$ and each input weight, depending on the intensity of each of the elements of the sense prototype signal $\downarrow y^{(t)}$.

$$\Delta w_{ij}^{(t)} = \mu(t)\left(h_j^{(t)} - w_{ij}^{(t)}\right)y_i^{(t)}$$

$$(i = 1, 2, \cdots, M, j = 1, 2, \cdots N)$$

-continued $$\mu(t) = \left(\mu_1\left(\frac{\mu_2}{\mu_1}\right)\right)^{\frac{t}{tmax}}$$

(5) Modifying the input weight $\downarrow w_i^{(t)} = (w_{i1}^{(t)}, \ldots, w_{iN}^{(t)})$ for each neuron by assuming $\Delta\downarrow w_i^{(t)} = (\Delta w_{i1}^{(t)}, \Delta w_{i2}^{(t)}, \ldots, \Delta w_{iN}^{(t)})$, (i=1, 2, ..., M).

$$\downarrow w_i^{(t+1)} = \downarrow w_i^{(t)} + \Delta\downarrow w_i^{(t)} \quad (i=1,2,\ldots,M)$$

(6) Assigning "t+1" to "t", and terminating the learning if $t > t_{max}$. Otherwise, going back to (3).

Figure 31:
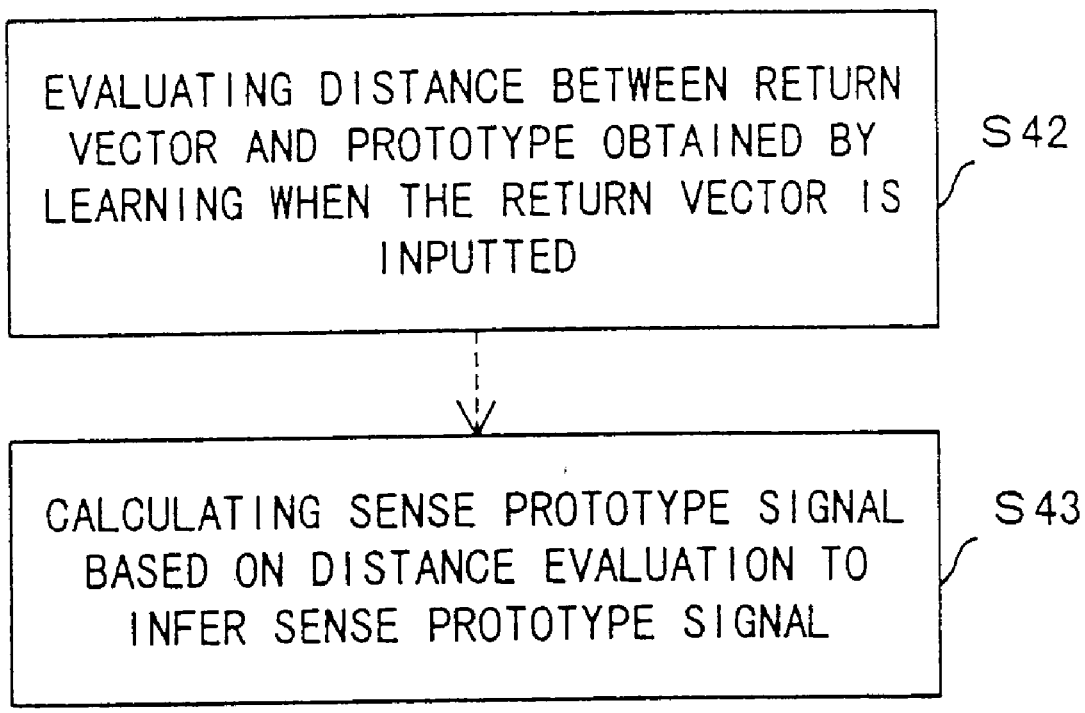
FIG. 31 is a flowchart showing a process in the execution mode, which infers a sense prototype signal is inferred from a return vector in the information integrating unit.
Figure 32:
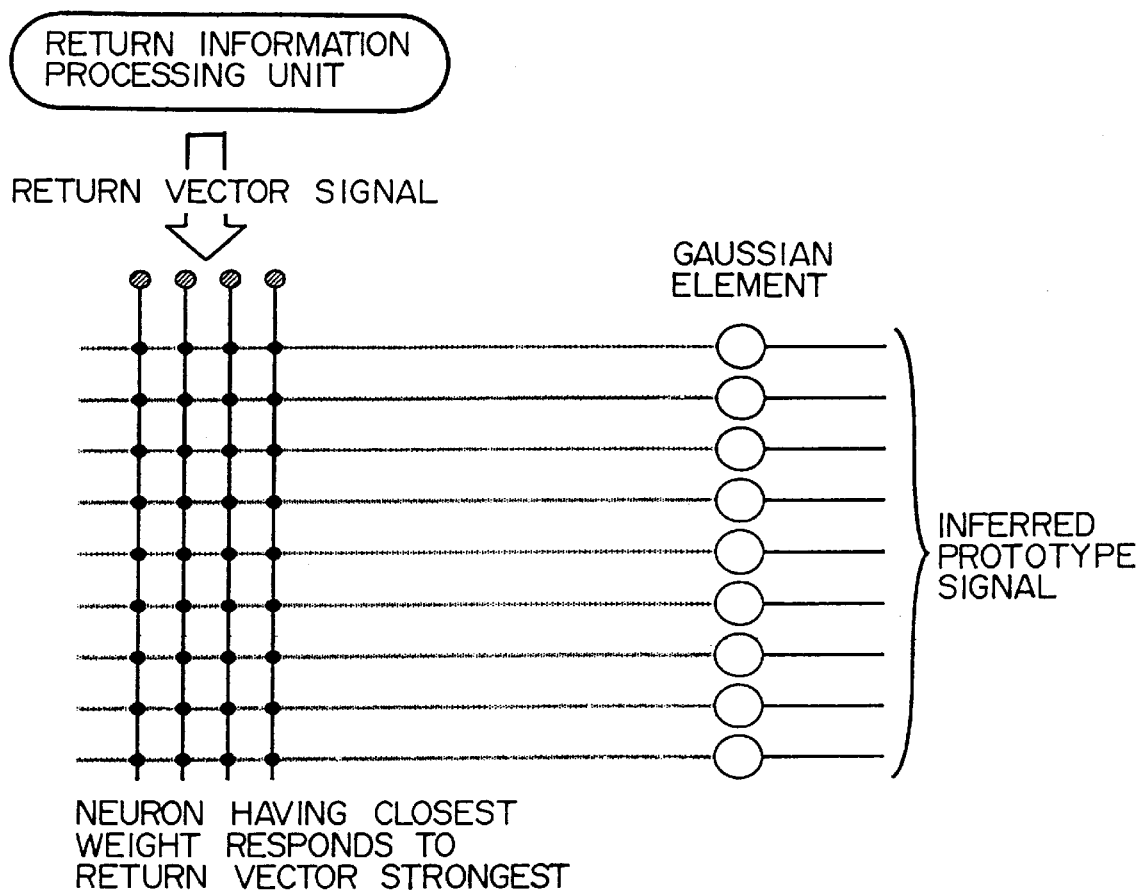
FIG. 32 is a schematic diagram showing an implementation of the information integrating unit using a neural network in the execution mode shown in FIG. 31.

FIG. 31 is a flowchart showing the process for inferring an SP from an HV, which is performed by the information integrating unit 16 in the execution mode. FIG. 32 is a schematic diagram showing the implementation of the information integrating unit 16 using a neural network. In the execution mode, the input weight for the element to which the sense prototype signal is input is set to "0", and the weight obtained by learning for the element to which the return vector is input is made constant, in order to infer an SP from an HV after the learning. The process shown in FIG. 31 is then performed. That is, when the return vector is input, the distance between the return vector and the prototype obtained by the learning, that is, the value of the input weight is evaluated in step S42. In step S43, the prototype of the sense signal is calculated based on the evaluation of the distance, and its result is output as the result of the inference of the sense prototype signal.

In FIG. 32, the output of the output layer neurons is a function having a Gaussian receptive field whose center is the prototype of the return vector signal corresponding to the prototype of the sense signal space. Specifically, the input weight for the i-th neuron in the output layer is assumed to be $\downarrow w_i = (w_{i1}, \ldots, w_{iN})$, and the return vector signal is assumed to be $\downarrow h = (h_1, \ldots, h_N)$. The output of the neurons at this time is obtained by the following equation.

$$z_i = e^{-\frac{\|\vec{h} - \vec{w}_i\|}{\sigma_i}} \quad (46)$$

With this process, the prototype of the sense signal corresponding to the return vector signal will be output from the output layer neurons. The value of variance $\sigma_i$ in the neuron output equation is assumed to be a constant multiple (a multiple of "d") of the variance corresponding to the neurons generating the prototype of the sense signal, that is, the output elements shown in FIG. 22. The value of "d" is determined so that an error between the sense prototype signal output from the sense information processing unit 14 after the learning of an input weight and the prototype signal inferred in FIG. 32 will be a minimum.

In short, the sense information as the value corresponding to the distance between a representative point in each region partitioned in a quantized sense signal space and the sense signal at the representative point in the move space corresponding to a representative point in a return information space, that is, the sense information corresponding to the representative point in the return information space, is used as a basis; and the sense information corresponding to an arbitrary point, that is, the prototype signal, is obtained with interpolation by using the return information corresponding to the arbitrary point in a move space as a weight.

As described above, the information integrating unit 16 comprises two dedicated neural networks for inferring an HV from an SP and vice versa. The signals used when the return information and the sense information are integrated, however, are simultaneously input to the two neural networks, which are learned in the same period. Accordingly, the information integrating unit 16 can use the integrated information, and perform the execution process by respectively using the dedicated neural networks when the HV is inferred from the SP, and when the SP is inferred from the HV.

Figure 33:
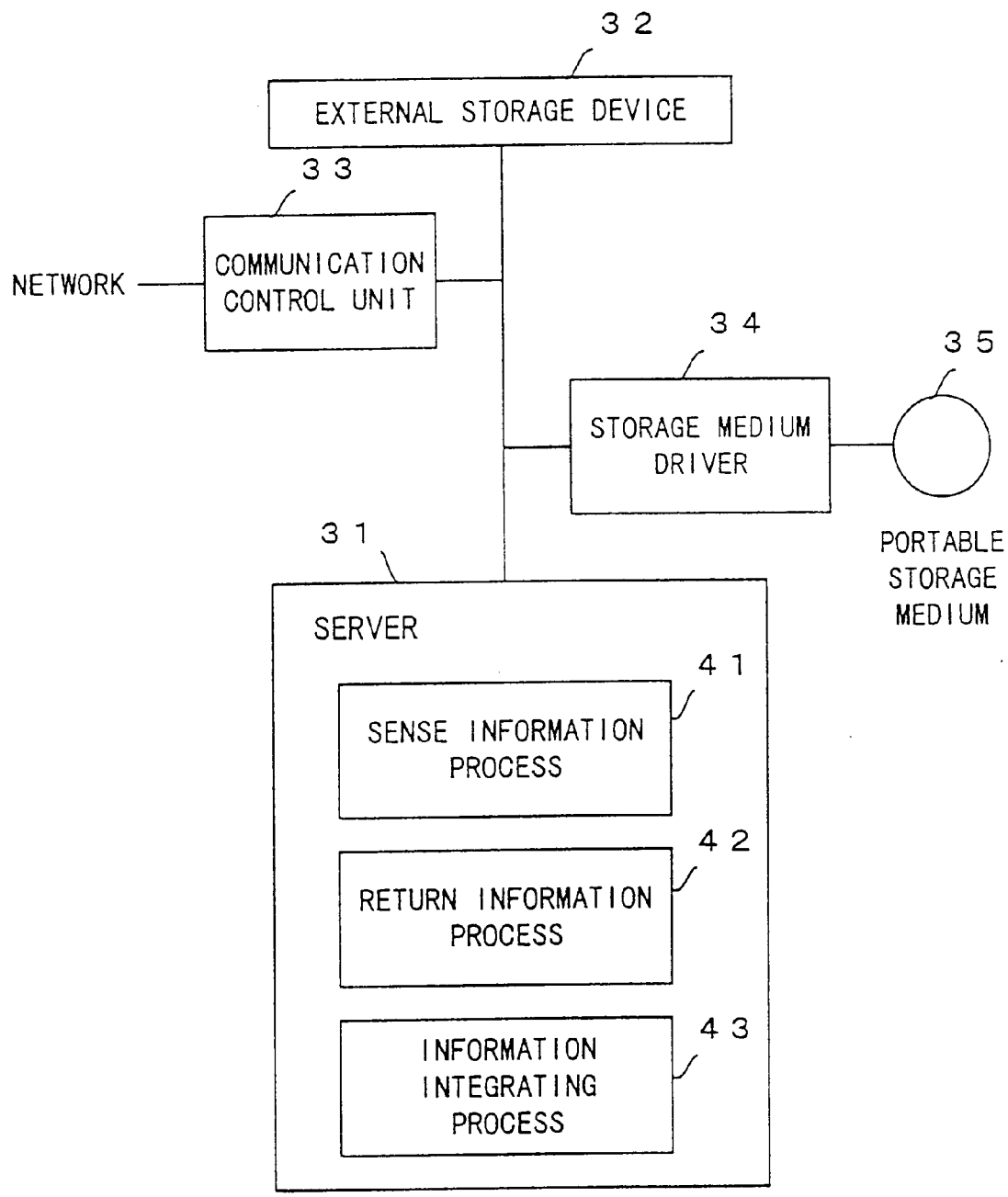
FIG. 33 is a schematic diagram showing the system configuration of a learning type position determining device in a computer environment.

FIG. 33 is a block diagram showing the configuration of a computer system for implementing a learning type position determining device according to the present invention in a computer environment. In this figure, the system is composed of a mobile robot 30, a server 31 for providing a self-position determining capability to the mobile robot 30, an external storage device 32 connected to the server 31, a communication control unit 33, and a storage medium driver 34.

The external storage device 32 is, for example, a secondary storage device such as a magnetic disk, optical disk, and a magneto-optical disk. It can also store a program with which the server 31 provides the position determining capability to the mobile robot 30. The communication control unit 33 is intended to control a communication between a network and the server 31.

The storage medium driver 34 is intended to drive a portable storage medium 35. The portable storage medium 35 is, for example, a floppy disk, a CD-ROM (Compact Disk-Read Only Memory), optical disk, magneto-optical disk, etc. It can store also a program with which the server 31 provides the self-position determining function to the mobile robot 30.

The mobile robot 30 and the server 31 are linked by, for example, a dedicated communications path. Sensor data collected by the mobile robot 30 is transferred to the server 31 as a sense data signal and a motion data signal. A sense prototype signal and a return vector signal, which are obtained by the server 31, are transferred to the mobile robot 30. As a result, the return control capability of the mobile robot is implemented.

In the server 31, three processes such as a sense information process 41, a return information process 42, and an information integrating process 43 cooperatively operate while mutually communicating, so that the self-position determining capability is implemented.

The sense information process 41 is intended to perform the processes of the flowcharts shown in FIGS. 11 and 21 in correspondence with an input of a sense data signal transmitted from the mobile robot 30. The operations of the neural network shown in FIGS. 18 and 22 are simulated as its method.

The return information process 42 is intended to perform the process of the flowchart shown in FIG. 4 in correspondence with the input of the motion data signal transmitted from the mobile robot 30. The operations of the neural network shown in FIG. 10 are simulated as its method.

The information integrating process 43 is intended to infer and output a return vector in correspondence with the result of an output of the sense information process 41 after it integrates the outputs of the sense information process 41 and the return information process 42, when it infers the HV from the SP. For this implementation, it performs the processes of the flowcharts shown in FIGS. 23 and 26. It simulates the operations of the neural network shown in FIGS. 24 and 27 as its method.

In the meantime, when the SP is inferred from the HV, the information integrating process 43 infers a sense prototype in correspondence with an output of the return information process 42 after it integrates the outputs of the sense information process 41 and the return information process 42. For this implementation, it performs the processes of the flowcharts shown in FIGS. 29 and 31, and simulates the operations of the neural network shown in FIGS. 30 and 32 as its method.

Provided last is the explanation about the return navigation (simulation) of a robot. With the return navigation, the robot searches a move space for a predetermined amount of time and learns the state of the move space based on return information and sense information after it is firstly placed at the origin of the return behavior, that is, an arbitrary home position. The robot is then positioned at an arbitrary point, and it is determined whether or not the robot properly returns to the origin. The information about the location of the origin and the size of the move space are not provided to the robot.

Figure 34:
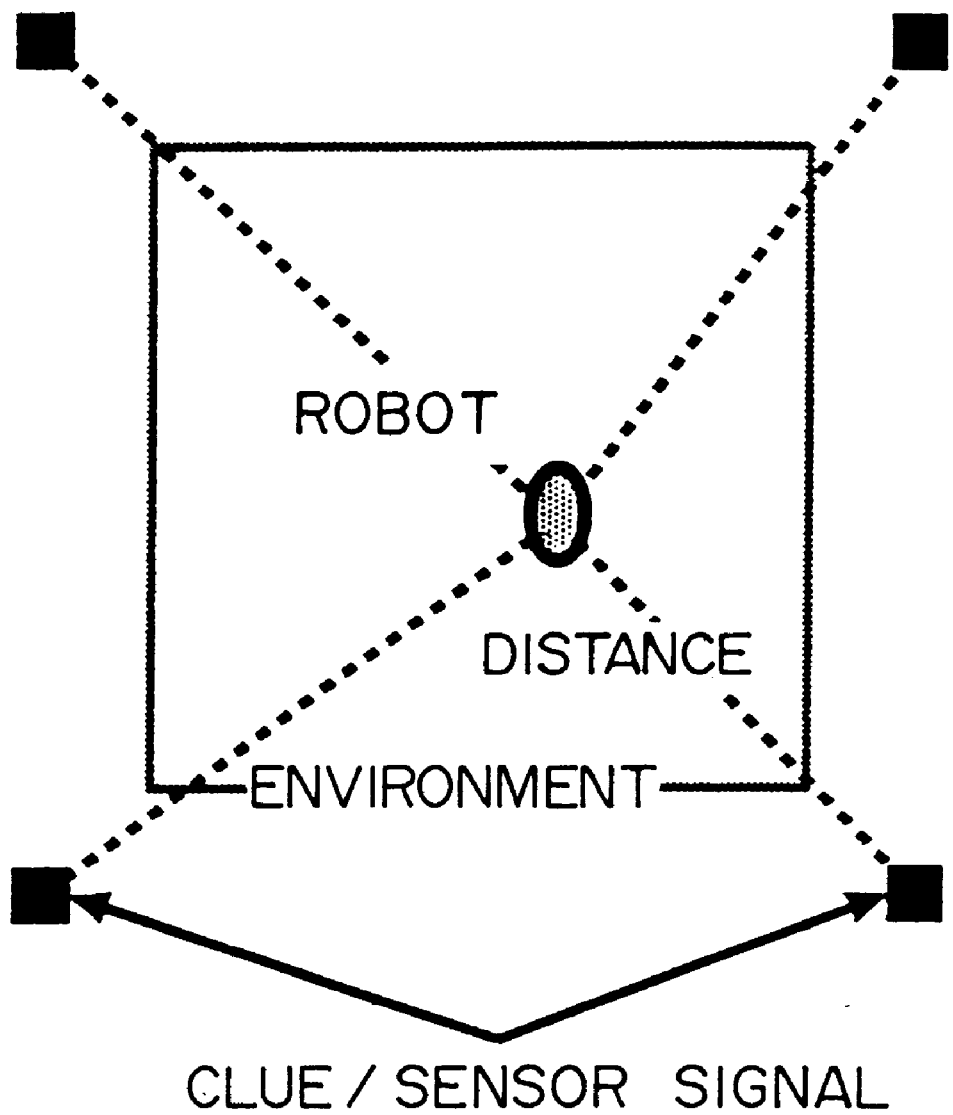
FIG. 34 is a schematic diagram showing a correlation between a robot and an external sensor signal in return navigation.

FIG. 34 is a schematic diagram explaining the relationship between a robot and an external sensor signal. Assume that the robot moves, for example, in a square move space with 2-meter sides, and an ultrasonic sensor is used as a sensor. In this case, a signal proportional to the distance from an obstacle is provided as a sensor signal. The sensor signal can be regarded as a clue stimulus arranged outside the move space. For the sake of convenience, the sensor signal is assumed to be obtained as a value which does not depend on the direction of the body of the robot. For example, if sensors are arranged in all directions, it means that the distance information from landmarks in all directions can be used.

In FIG. 34, the robot accumulates motion information, calculates each return vector, and collects a sense signal while following a random path in the move space. The robot generates the prototype of the sense signal space in a organizing manner during that period, and obtains a sense signal map corresponding to the move space. Additionally, it integrates the sense and return information by performing organizing learning according to the simultaneous principle.

Figure 35:
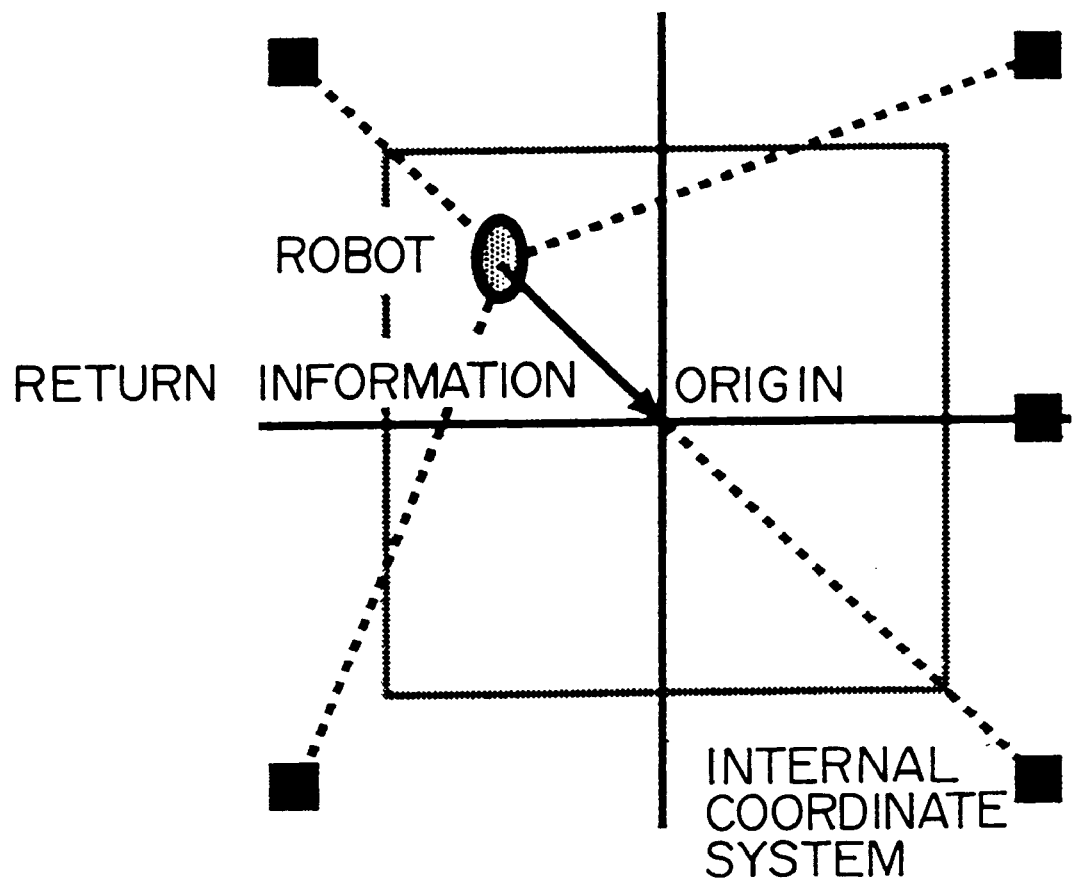
FIG. 35 is a schematic diagram explaining a position determination of a robot after learning is terminated.

FIG. 35 is a schematic diagram showing the position determination of a robot after learning is completed. A return vector can be inferred in a sense signal space corresponding to a move space by integrating return and sense information. Accordingly, the return vector which is the position information of the robot at an arbitrary point can be obtained by using the sense signal as a key, and the position of a space point relative to the position of the origin can be determined, thereby autonomously generating the coordinate system of the move space by using plural return vectors.

For this navigation, a neural network similar to that explained by referring to FIG. 10, can be used as the return information processing unit 12. The prior application filed by the same applicant (Document 2) discloses its outline as a vector operation device.

The return information processing unit 12 accumulates a motion signal for one motion path, and provides the return information to the information integrating unit 16 as a 31-dimensional cosine vector. The sense information processing unit 14 and the information integrating unit 16 are configured by the above described neural network. The sense information processing unit 14 represents a prototype which partitions a sense signal space using 25 neurons. Its output is a function (Gaussian function) of the distance between a prototype and a sensor signal.

The information integrating unit 16 performs learning using 31 neurons. The input weight for each of the neurons serves as a prototype corresponding to a return information signal. A robot moves and searches in a move space by following a random path, generates the return and sense information on a path covering the entire move space, and performs the necessary learning based on signals which are sequentially input to the sense information processing unit 14 and the information integrating unit 16 as an on-line process.

Provided below is the explanation about the result of the return simulation by referring to FIGS. 36 through 38. This is the result of the case in which 10,000 learning samples, each of which is a pair of the return information and the sense information, are used. This learning is performed by an on-line process in the learning mode. The term "on-line process" is often used in the field of a machine learning theory. The learning by the on-line process is performed by applying a learning rule in correspondence with an input of one sample, and updating the weight in a neural network when needed. As a learning type different from that of the one-line process, a badge process can be cited. With the badge process, a linear or non-linear optimization method is applied to the entire set of the samples, and optimal hypotheses are selected once.

For the generation of a prototype in the sense information processing unit 14 and the integrating of the return and sense information in the information integrating unit 16, respective learning rules are applied once to an input of a pair of the return information and the sense information.

Figure 36:
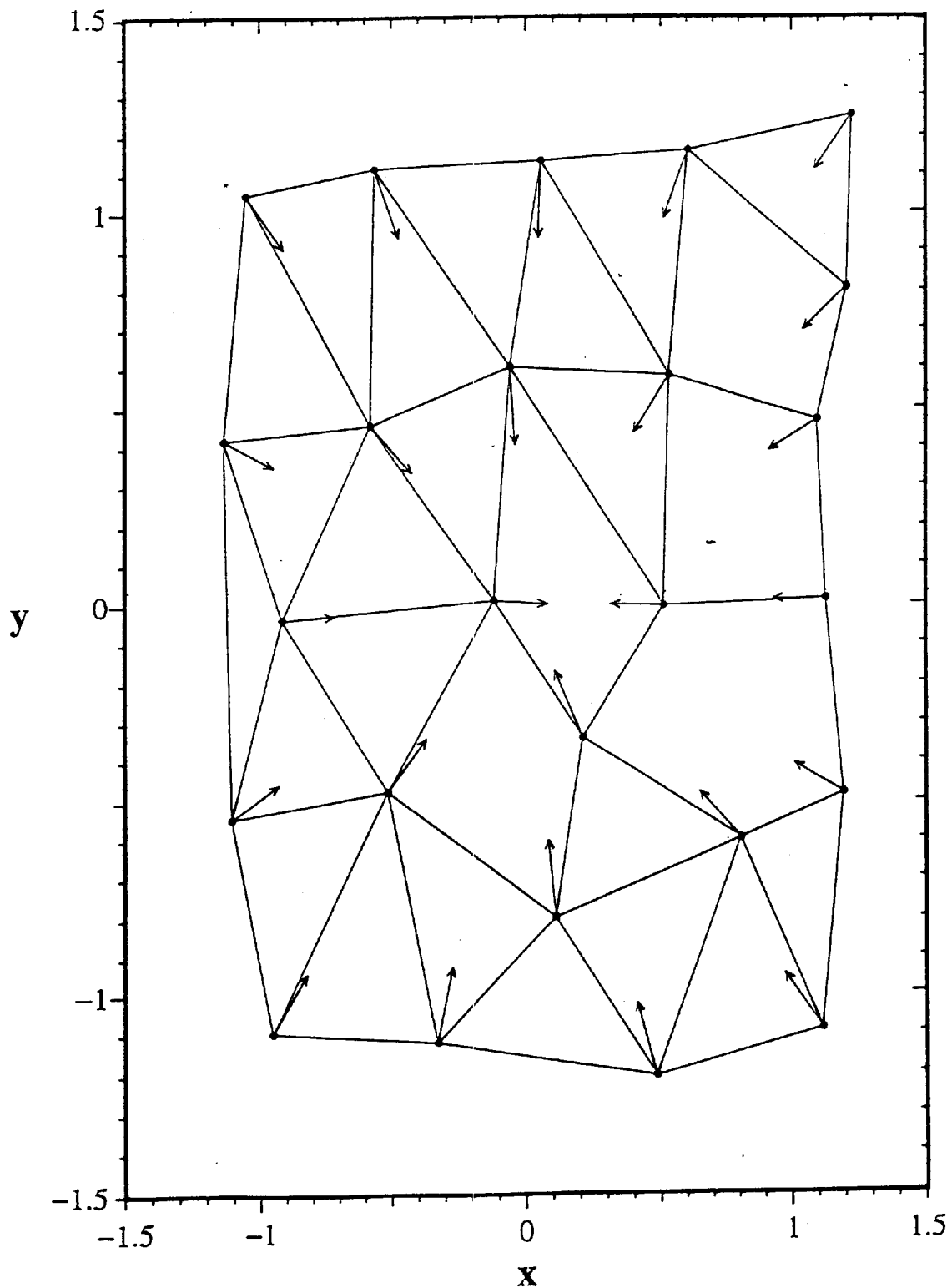
FIG. 36 is a schematic diagram showing a return vector field as a result of integration by the information integrating unit.

FIG. 36 is a schematic diagram showing a return vector field generated in correspondence with the prototype of the sense signal space when the return and sense information are integrated by learning in the information integrating unit 16. In this figure, black dots represent lattice points, while arrows represent return vectors.

Figure 37:
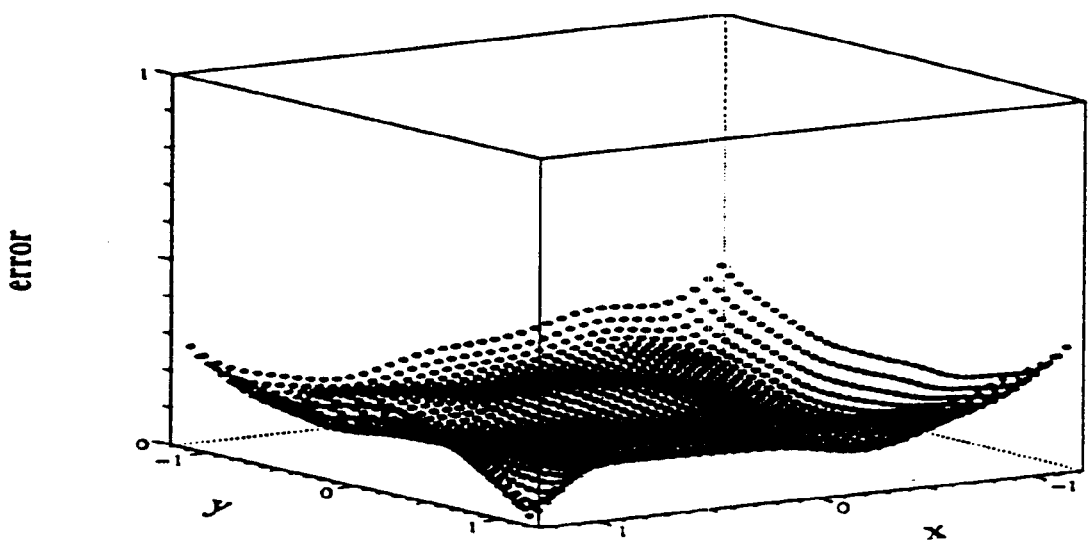
FIG. 37 is a schematic diagram showing return errors from arbitrary points to the origin.

FIG. 37 is a schematic diagram showing errors when a robot returns from an arbitrary point to the origin in the vector field shown in FIG. 36. Since the number of elements and the number of learning times are small, some errors arise. However, it is proved that the error is almost the same degree at any point, and the coordinate system as a move space is smoothly reproduced.

Figure 38:
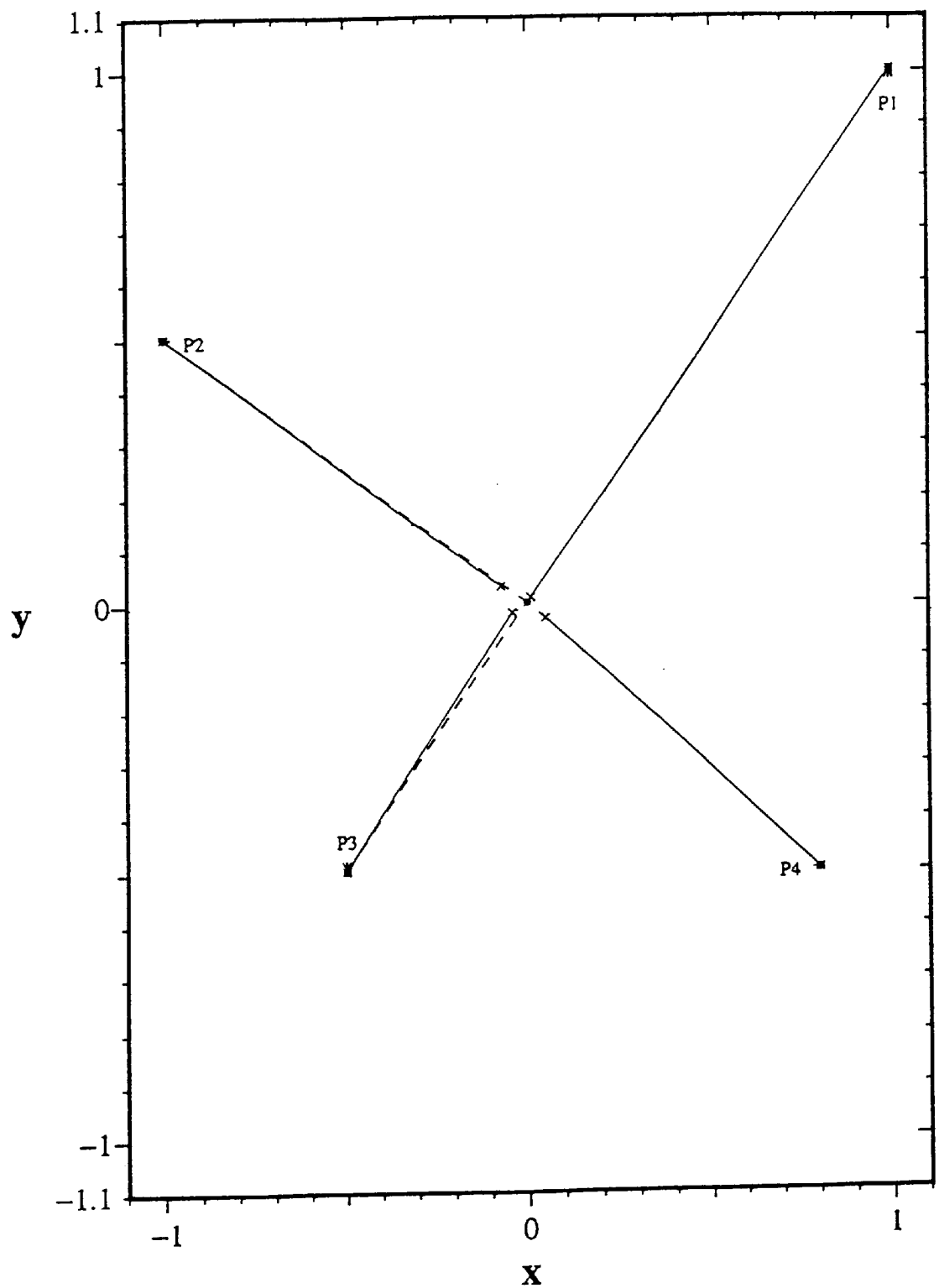
FIG. 38 is a schematic diagram showing a comparison between correct return information and a motion of a robot for four points.

FIG. 38 is a schematic diagram showing the result of a comparison between specifically inferred return information by selecting four arbitrary points P1 through P4 and accurate return information. In this figure, a broken line represents the accurate return information, while solid lines represent motions of a robot in this simulation. It is known from this figure that the learning type self-position determining device according to the present invention autonomously calculates the information of the self-position.

As described above in detail, the position of a mobile object can be autonomously determined by integrating the return information resulting from the accumulation of motion information of the mobile object along a path, and the sense information based on a sensor signal indicating an environment state of the mobile object. With the conventional triangulation method, encoding of a signal space, and embedding of a phase, that is, a distance, into an encoded space are performed once, and a system designer has to correlate them. With the learning type position determining device, such operations are detached from the system designer, and the mobile object itself can autonomously perform such operations. It significantly contributes to the achievement of the autonomy of motions of a mobile object.

What is claimed is:

1. A learning type position determining device of a mobile object having first and second sensors, for determining position of the mobile object in a move space, comprising:

return information processing means for generating return information corresponding to a relative position of the mobile object from an origin in the move space according to a first sensor signal from the first sensor;

sense information processing means for generating sense information corresponding to an environment state surrounding the mobile object at the relative position according to a second sensor signal from the second sensor;

information integrating means for inferring return information corresponding to the sense information input from said sense information processing means, and for outputting the inferred return information after learning a correlation between the return information and the sense information and integrating the return information and the sense information.

2. The learning type position determining device according to claim 1, wherein said return information processing means sequentially accumulates the first sensor signal indicating a motion state of the mobile object, and obtains the return information on a move path of the mobile object.

3. The learning type position determining device according to claim 2, wherein said return information processing means sequentially accumulates a signal obtained by discretizing and localizing the first sensor signal as the motion signal in correspondence with the first sensor signal indicating a distance and a direction from the origin.

4. The learning type position determining device according to claim 1, wherein said sense information processing means outputs a value corresponding to a distance between a sense signal obtained based on a result of an observation of the environment surrounding the mobile object at an arbitrary point in the move space, and a representative point in each region partitioned in a quantized sense signal space, to said information integrating means, as the sense information.

5. The learning type position determining device according to claim 1, wherein said sense information processing means recognizes a sense signal obtained by discretizing and localizing the second sensor signal in correspondence with an input of the second sensor signal indicating the environment state.

6. The learning type position determining device according to claim 4, wherein said sense information processing means is composed of a neural network having output layer neurons and learning in a self-organizing manner, and wherein said neural network outputs the sense information at the arbitrary point to said information integrating means after performing learning by maximizing an amount of an update of a vector of a connection weight, having a distance shortest among distances between a vector of the sense signal corresponding to a representative point in the move space and vectors of a connection weight of the output layer neurons in the neural network.

7. A learning type position determining device of a mobile object having first and second sensors, for determining position of the mobile object in a move space, comprising:

return information processing means for generating return information corresponding to a relative position of the mobile object from an origin in the move space according to a first sensor signal from the first sensor;

sense information processing means for generating sense information corresponding to an environment state surrounding the mobile object at the relative position according to a second sensor signal from the second sensor, the sense information including a value corresponding to a distance between a sense signal obtained based on a result of an observation of the environment surrounding the mobile object at an arbitrary point in the move space and a representative point in each region partitioned in a quantized sense signal space;

information integrating means for inferring return information corresponding to the sense information input from said sense information processing means, and for outputting the inferred return information after learning a correlation between the return information and the sense information and integrating the return information and the sense information, said information integrating means learning, in correspondence with inputs of the sense information as respective values corresponding to respective distances between a representative point in respective partitioned regions, and the sense signal at the arbitrary point in the move space, a value of the return information, which corresponds to the arbitrary point, as a weight of a connection to which a maximum value among the respective values is input instead of said information integrating means, when said information integrating means integrates the return and sense information.

8. A learning type position determining device of a mobile object having first and second sensors, for determining position of the mobile object in a move space, comprising:

return information processing means for generating return information corresponding to a relative position of the mobile object from an origin in the move space according to a first sensor signal from the first sensor;

sense information processing means for generating sense information corresponding to an environment state surrounding the mobile object at the relative position according to a second sensor signal from the second sensor, the sense information including a value corresponding to a distance between a sense signal obtained based on a result of an observation of the environment surrounding the mobile object at an arbitrary point in the move space and a representative point in each region partitioned in a quantized sense signal space;

information integrating means for inferring return information corresponding to the sense information input from said sense information processing means, and for outputting the inferred return information after learning a correlation between the return information and the sense information and integrating the return information and the sense information, said information integrating means recognizing the return information at a representative point in the move space, which corresponds to the representative point in each partitioned region, as a basis, and obtains the return information corresponding to the arbitrary point with interpolation, by using the sense information at the arbitrary point in the move space, as a weight for the basis.

9. A learning type position determining device of a mobile object having first and second sensors, for determining position of the mobile object in a move space, comprising:

return information processing means for generating return information corresponding to a relative position of the mobile object from an origin in the move space according to a first signal from the first sensor;

sense information processing means for generating sense information corresponding to an environment state surrounding the mobile object at the relative position according to a second signal from the second sensor; and information integrating means for inferring sense information corresponding to the return information input from said return information processing means, and for outputting the inferred sense information after integrating the return information and the sense information in learning of a correlation between the return and sense information.

10. A learning type position determining device of a mobile object having first and second sensors, for determining position of the mobile object in a move space, comprising:

return information processing means for generating return information corresponding to a relative position of the mobile object from an origin in the move space according to a first sensor signal from the first sensor;

sense information processing means for generating sense information corresponding to an environment state surrounding the mobile object at the relative position according to a second sensor signal from the second sensor;

information integrating means for inferring sense information corresponding to the return information input from said return information processing means, and for outputting the inferred sense information after integrating the return information and the sense information in learning of a correlation between the return and sense information, said information integrating means recognizing the sense information, which is the sense information corresponding to a representative point in a return information space, as a value corresponding to a distance between a representative point in each partitioned region in a quantized sense signal space and the sense signal at a representative point in the move space, which corresponds to the representative point in the return information space, as a basis, and obtains the sense information corresponding to the arbitrary point with interpolation by using the return information corresponding to the arbitrary point in the move space as a weight.

11. A learning type position determining method for making a mobile object determine position in a move space, the mobile object including first and second sensors, said method comprising of:

generating return information corresponding to a relative position of the mobile object from an origin in the move space according to a signal from the first sensor;

generating sense information corresponding to an environment state surrounding the mobile object at the relative position according to a signal from the second sensor;

integrating the return information and the sense information in learning of a correlation between the return information and the sense information; and inferring return information corresponding to sense information at an arbitrary position in the move space, and outputting the inferred return information, whereby the mobile object can autonomously determine the position.

12. A learning type position determining method for making a mobile object determine position in a move space, the mobile object including first and second sensors, said method comprising of:

generating return information corresponding to a relative position of the mobile object from an origin in the move space;

generating sense information corresponding to an environment state surrounding the mobile object at the relative position according to a signal from the second sensor;

integrating the return information and the sense information in learning of a correlation between the return information and the sense information; and inferring return information corresponding to sense information at an arbitrary position in the move space, and outputting the inferred sense information.

13. A computer-readable storage medium storing a program used in a position determining device for making a mobile object determine position in a move space, wherein the mobile object including first and second sensors the program used to make a computer perform the steps of:

generating return information corresponding to a relative position of the mobile object from an origin in the move space according to a signal from the first sensor;

generating sense information corresponding to an environment state surrounding the mobile object at the relative position according to a signal from the second sensor; and inferring return information corresponding to the sense information obtained when the mobile object is present at an arbitrary position in the move space, and outputting the inferred return information, after learning a correlation between the return information and the sense information and integrating the return and sense information.

14. A computer-readable storage medium storing a program used in a position determining device of a mobile object for determining a position in a move space of the mobile object which includes first and second sensors, the program used to make a computer perform the method of:

generating return information corresponding to a relative position of the mobile object from an origin in the move space according to a signal from the first sensor;

generating sense information corresponding to an environment state surrounding the mobile object at the relative position according to a signal from the second sensor; and inferring sense information corresponding to the return information obtained when the mobile object is present at an arbitrary position in the move space, and outputting the inferred sense information, after learning a correlation between the return information and the sense information and integrating the return and sense information.

* * * * *